(12) United States Patent
Sundel

(10) Patent No.: US 12,051,021 B2
(45) Date of Patent: Jul. 30, 2024

(54) CLOUD-BASED SYSTEM AND METHOD TO TRACK AND MANAGE OBJECTS

(71) Applicant: WORLDPAK INC., McLean, VA (US)

(72) Inventor: Michael B. Sundel, Falls Church, VA (US)

(73) Assignee: WORLDPAK INC., McLean, VA (US)

( * ) Notice: Subject to any disclaimer, the term of this patent is extended or adjusted under 35 U.S.C. 154(b) by 0 days.

(21) Appl. No.: 18/114,721

(22) Filed: Feb. 27, 2023

(65) Prior Publication Data
US 2023/0267391 A1    Aug. 24, 2023

Related U.S. Application Data

(63) Continuation-in-part of application No. 17/635,303, filed as application No. PCT/US2020/046166 on
(Continued)

(51) Int. Cl.
*G06F 16/00* (2019.01)
*G06Q 10/0631* (2023.01)

(52) U.S. Cl.
CPC ........... *G06Q 10/06312* (2013.01); *G06Q 10/063112* (2013.01); *G06Q 10/063114* (2013.01); *G06Q 10/063118* (2013.01)

(58) Field of Classification Search
CPC .............. G06F 16/24578; G06F 16/24575
See application file for complete search history.

(56) References Cited

U.S. PATENT DOCUMENTS 7,849,066 B2 * 12/2010 Onodera ............... G06Q 10/10
                                                     379/265.06
8,108,299 B1 *  1/2012 Waelbroeck .......... G06Q 40/04
                                                          705/37
(Continued)

FOREIGN PATENT DOCUMENTS

CN         10538870 A    3/2016
EP        2916270 A1    9/2015
(Continued)

OTHER PUBLICATIONS

EP Examination Report Ser. No. 17786523.5 dated Aug. 5, 2017 (Aug. 5, 2019).
(Continued)

*Primary Examiner* — Noosha Arjomandi
(74) *Attorney, Agent, or Firm* — Carlos R. Villamar; The Villamar Firm PLLC

(57) ABSTRACT

A system, method and computer program product for time management includes a cloud-based server, user device, automated devices, and an AI engine. The user device, with a gamified interface, enables data entry and display. The automated devices, connected to the database, perform data collection and actions. The AI engine monitors various factors, assigns tasks, and provides operation management advice. The AI engine includes an automated time management framework that partitions the day into blocks and treats tasks as a collection. The AI engine periodically balances these blocks, ranks uncompleted tasks based on various factors, and reshuffles tasks based on their rank until the day concludes. The AI engine also provides lenses for users, allowing them to customize task lists based on their preferences.

15 Claims, 58 Drawing Sheets

Environmental/Sensor Input

Related U.S. Application Data

Aug. 13, 2020, now Pat. No. 11,593,390, which is a continuation-in-part of application No. 16/094,773, filed as application No. PCT/US2017/028281 on Apr. 19, 2017, now Pat. No. 11,593,724.

(60) Provisional application No. 62/886,908, filed on Aug. 14, 2019, provisional application No. 62/372,593, filed on Aug. 9, 2016, provisional application No. 62/324,532, filed on Apr. 19, 2016.

(56) References Cited

U.S. PATENT DOCUMENTS

| | | | |
|---|---|---|---|
| 8,719,831 B2* | 5/2014 | Radmilac | G06F 9/5083 |
| | | | 718/100 |
| 8,831,972 B2 | 9/2014 | Angell et al. | |
| 9,143,809 B2* | 9/2015 | Lipscomb | H04L 67/1001 |
| 10,489,451 B2* | 11/2019 | Fujita | G10L 15/08 |
| 10,628,764 B1* | 4/2020 | Kaplan | G06Q 10/063112 |
| 11,431,660 B1* | 8/2022 | Leeds | G10L 15/22 |
| 11,481,735 B1* | 10/2022 | Schemers | G06Q 10/1093 |
| 11,520,461 B2* | 12/2022 | Wald | G06F 3/0482 |
| 2004/0059622 A1 | 3/2004 | Mueller | |
| 2006/0074714 A1* | 4/2006 | Aziz | G16H 40/20 |
| | | | 705/2 |
| 2007/0168337 A1* | 7/2007 | Onodera | G06Q 10/10 |
| 2009/0204471 A1* | 8/2009 | Elenbaas | G06Q 10/06 |
| | | | 726/28 |
| 2009/0210282 A1 | 8/2009 | Elenbaas et al. | |
| 2012/0215578 A1 | 8/2012 | Swierz, III et al. | |
| 2014/0013252 A1 | 1/2014 | Ehrler et al. | |
| 2014/0171039 A1 | 6/2014 | Bjontegard | |
| 2014/0222521 A1 | 8/2014 | Chait | |
| 2014/0278640 A1 | 9/2014 | Galloway et al. | |
| 2015/0213058 A1* | 7/2015 | Ambardekar | G06F 18/285 |
| | | | 707/723 |
| 2016/0086121 A1 | 3/2016 | Heilbrunn et al. | |
| 2017/0308587 A1* | 10/2017 | Nagel | G06F 3/04886 |
| 2018/0232413 A1 | 8/2018 | Eshwar et al. | |
| 2018/0232693 A1 | 8/2018 | Gillen et al. | |
| 2019/0086882 A1* | 3/2019 | Okita | G05B 15/02 |
| 2019/0213509 A1* | 7/2019 | Burleson | G06N 20/00 |
| 2019/0340579 A1* | 11/2019 | Krystek | G06N 5/022 |
| 2020/0273000 A1* | 8/2020 | Li | G06Q 30/02 |
| 2021/0399911 A1* | 12/2021 | Jorasch | H04L 12/1822 |
| 2022/0343155 A1* | 10/2022 | Mitra | G06F 18/29 |
| 2022/0365882 A1* | 11/2022 | Edwards | G06F 12/127 |
| 2022/0365937 A1* | 11/2022 | Sundel | G06F 16/24578 |

FOREIGN PATENT DOCUMENTS

| | | |
|---|---|---|
| IT | BO20130218 A1 | 11/2004 |
| WO | 0244854 A2 | 6/2002 |
| WO | 2006020890 A2 | 2/2006 |
| WO | 2014145149 A1 | 9/2014 |

OTHER PUBLICATIONS

CA Office Action Ser. No. 3,021,724 dated Jul. 7, 2020 (Jul. 7, 2020).

PCT ISR and WO Ser. No. PCT/US2017/028281 dated Jul. 26, 2017 (Jul. 26, 2017).

International Search Report and Written Opinion, PCT/US2020/046166, Dec. 9, 2020, Dec. 9, 2020.

* cited by examiner

Environmental/Sensor Input

Inventory Adjustments

Action Assignment Process

Lexicon Neural Network

Sample Tablet Conversation

Activity List Preparation

Activity List Preparation – Machine Actor

Start Activity – Human Actor

Start Activity – Machine Actor

Record Reading – Human / Machine Actor

Record Reading – Automatic Sensor Actor

FIG. 13 Get Education on a Work Step / Activity – Human Actor

FIG. 14 Give Feedback on a Work Step / Activity – Human Actor

Update a Profile – Human Actor

FIG. 16 Kiosk Greeting and Conversation - Human Actor

General Question – Human Actor

FIG. 18 Specific Item Question – Human Actor

Play a Game – Human Actor

FIG. 20 View Business Offerings – Human Actor

FIG. 21 Generate Demographics – Human Actor

Receive Inventory Items – Human Actor

Expiring Inventory – Machine Actor

Create Sound File – Machine Actor

Booking an Event – Human Actor

Event Sign In – Human Actor

Report Incident – Human Actor

Report Incident – Machine Actor

Give Feedback – Human Actor

Human Actor Start

Employee Interaction

Volunteer Interaction

Visitor Interaction – at Kiosk

Visitor Interaction – Server Functions

Retrieve Activity

Retrieve Activity

Execute Activity – on Tablet

Execute Activity – Server functions

Volunteer Sign-up – at Kiosk

Volunteer Sign-up – Server functions

Kiosk Conversation – at Kiosk

Kiosk Conversation – at Server functions

Send Feedback

AI Structure

Greeter

Weather

Facility Information

Product and Services Information

FIG. 44 Time Management: Creating Sked Templates

FIG. 45 Time Management: Adding Tasks to Task Lists

FIG. 46 Time Management: Reprioritization Process

Lenses - Display Control

Lenses - Display Control Interface

Lenses - Display Render

Lenses - Activity List Display

Projects - Completion Tracking

Project Gamification - Challenges

Project Gamification - Rewards

CLOUD-BASED SYSTEM AND METHOD TO TRACK AND MANAGE OBJECTS

CROSS REFERENCE TO RELATED APPLICATIONS

The present invention is a continuation-in-part application of U.S. patent application Ser. No. 17/635,303 of SUNDEL, entitled "CLOUD BASED SYSTEM AND METHOD TO TRACK AND MANAGE OBJECTS," filed on Feb. 14, 2022, now allowed, which claims priority to PCT Patent Application Serial No. PCT/US20/46166 of SUNDEL, entitled "CLOUD BASED SYSTEM AND METHOD TO TRACK AND MANAGE OBJECTS," filed on Aug. 13, 2020, now inactive, which claims priority to U.S. Provisional Patent Application Ser. No. 62/886,908 of SUNDEL, entitled "CLOUD BASED SYSTEM AND METHOD TO TRACK AND MANAGE OBJECTS," filed on Aug. 14, 2019, now inactive, which is a continuation-in-part of U.S. patent application Ser. No. 16/094,773 of SUNDEL et al., entitled "CLOUD BASED SYSTEM AND METHOD TO TRACK AND MANAGE OBJECTS," filed on Oct. 18, 2018, now allowed, which claims priority to PCT Patent Application Serial No. PCT/US2017/028281 of SUNDEL et al., entitled "CLOUD BASED SYSTEM AND METHOD TO TRACK AND MANAGE OBJECTS," filed on Apr. 19, 2017, now inactive, which claims priority to U.S. Provisional Patent Application Ser. No. 62/324,532 of SUNDEL et al., entitled "CLOUD BASED SYSTEM AND METHOD TO TRACK AND MANAGE OBJECTS," filed on Apr. 19, 2016, now inactive, and U.S. Provisional Patent Application Ser. No. 62/372,593 of SUNDEL et al., entitled "CLOUD BASED SYSTEM AND METHOD TO TRACK AND MANAGE OBJECTS," filed on Aug. 9, 2016, now inactive, the entire disclosures of all of which are hereby incorporated by reference herein.

BACKGROUND OF THE INVENTION

Field of the Invention

The present invention generally relates to object management systems and methods, and, more particularly, to a cloud-based system and method for managing animate and inanimate objects, and the like.

Discussion of the Background

In recent years, various systems and methods for object management have been devised. However, such systems and methods are not robust with respect to managing animate and inanimate objects involved in different business processes in an integrated manner, and the like.

SUMMARY OF THE INVENTION

Therefore, there is a need for a method and system that addresses the above and other problems. The above and other problems are addressed by the illustrative embodiments of the present invention, which provide a robust and efficient cloud-based system and method for managing animate and inanimate objects, and the like. For example, a system, method and computer program product automating time management, can include an automated time management framework using an AI engine to for making trade-offs among tasks as unexpected events occur. Each day is divided into blocks of time called Skeds. Once a Sked has begun, scheduled tasks and tasks that have been manually or automatically added to the Sked are treated as a collection. It is determined if the Sked is balanced based on total available labor minutes compared time to perform uncompleted tasks. If not, a score is calculated for each uncompleted task based on its ratings, including priority, movability, optionality, difficulty, and/or unpleasantness of the task. The uncompleted tasks are ranked using the scores, and abandoned or moved to later Skeds based on the ranking until the Sked is balanced. The balancing process is repeated until the Sked is balanced and, if not, until an end thereof.

Accordingly, in illustrative aspects of the present invention there is provided a system, method, and computer program product for automated time management of tasks performed by or at an entity, including an individual or a business enterprise, including a cloud-based server having a database and configured for running computer programs thereon, and a website; a user device, including one of a smartphone, tablet, and personal computer (PC) running an application or software, including a gamified user interface (UI) configured to connect to the database directly or through the website and function as a data entry and display device; automated devices, including at least one of a sensor, electronic switch, a pump, and a hydroponic dosing device connected to the database and configured to collect and transmit data or to react to received commands; an Artificial Intelligence (AI) powered engine configured to monitor statuses of animate and inanimate objects associated with the entity, as well as external conditions and actors that affect the entity, and based on analysis of the statuses, configured to task at least one of individuals, and the automated devices of the entity, and configured to employ cognitive reasoning to provide the entity with advice on managing operations of the entity; and an automated time management framework employed by the AI engine configured to automate a process by which the individuals continually make trade-offs among potential tasks as unexpected events that affect the tasks occur, including dividing each day into predetermined blocks of time called Skeds, once a Sked has begun, considering scheduled tasks and tasks that have been manually or automatically added to the Sked as a collection, at a predetermined frequency, determining whether the Sked is balanced in terms of its total available labor minutes compared to the total time still needed to perform uncompleted tasks remaining in the collection, and, if not, calculating a score for each uncompleted task based on its ratings, including at least one of priority, movability, optionality, difficulty, and unpleasantness of the task, ranking the uncompleted tasks based on their relative scores, and at least one of abandoning one or more of the uncompleted tasks, and moving one or more of the uncompleted tasks to later Skeds based on the ranking until the Sked is balanced; and repeating the determining of whether the Sked is balanced and, if not, bringing the Sked into balance until an end of the Sked.

Still other aspects, features, and advantages of the present invention are readily apparent from the following detailed description, by illustrating a number of illustrative embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which.

DETAILED DESCRIPTION OF THE PREFERRED EMBODIMENTS

Figure 42:
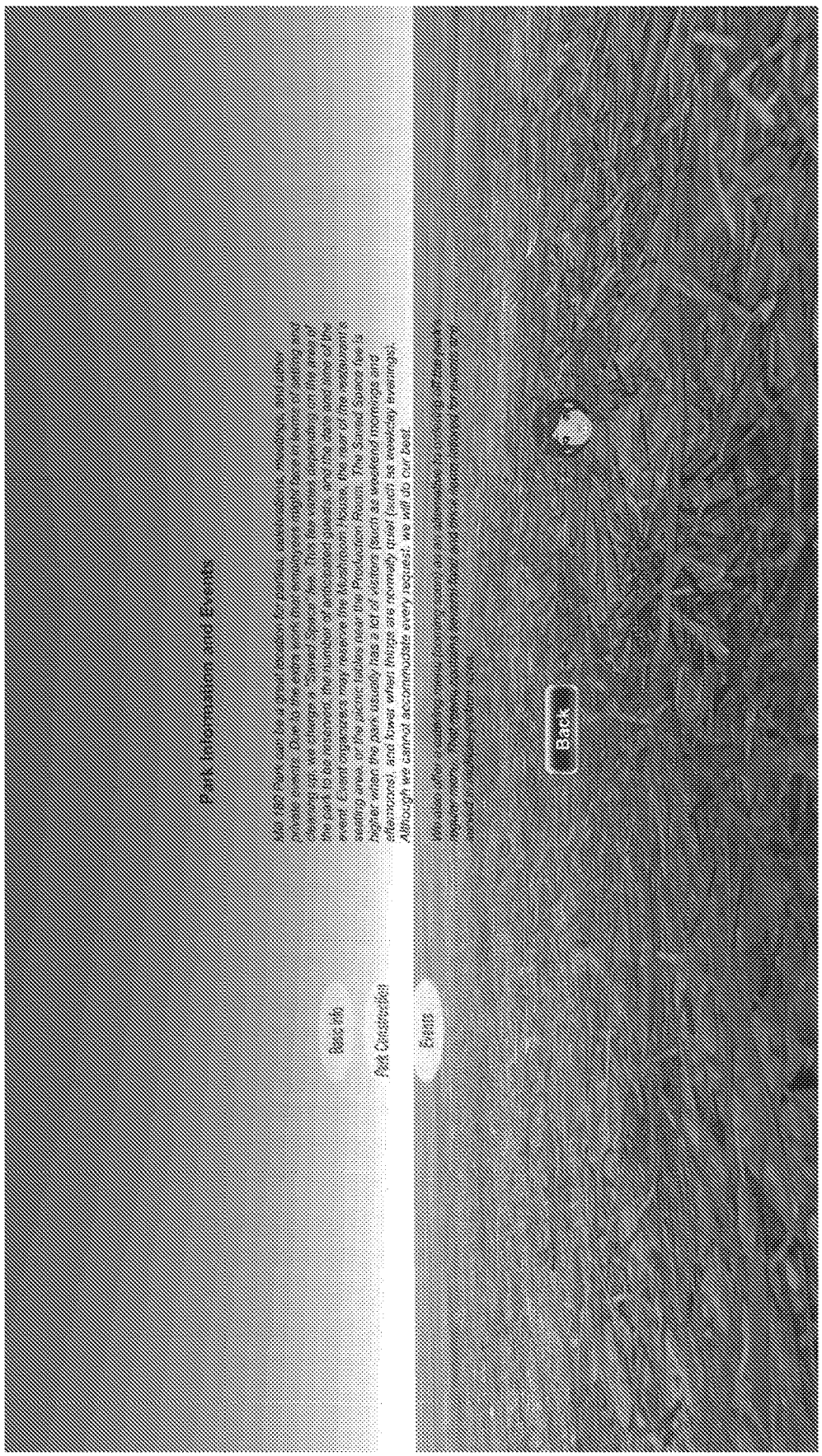
Figure 43:
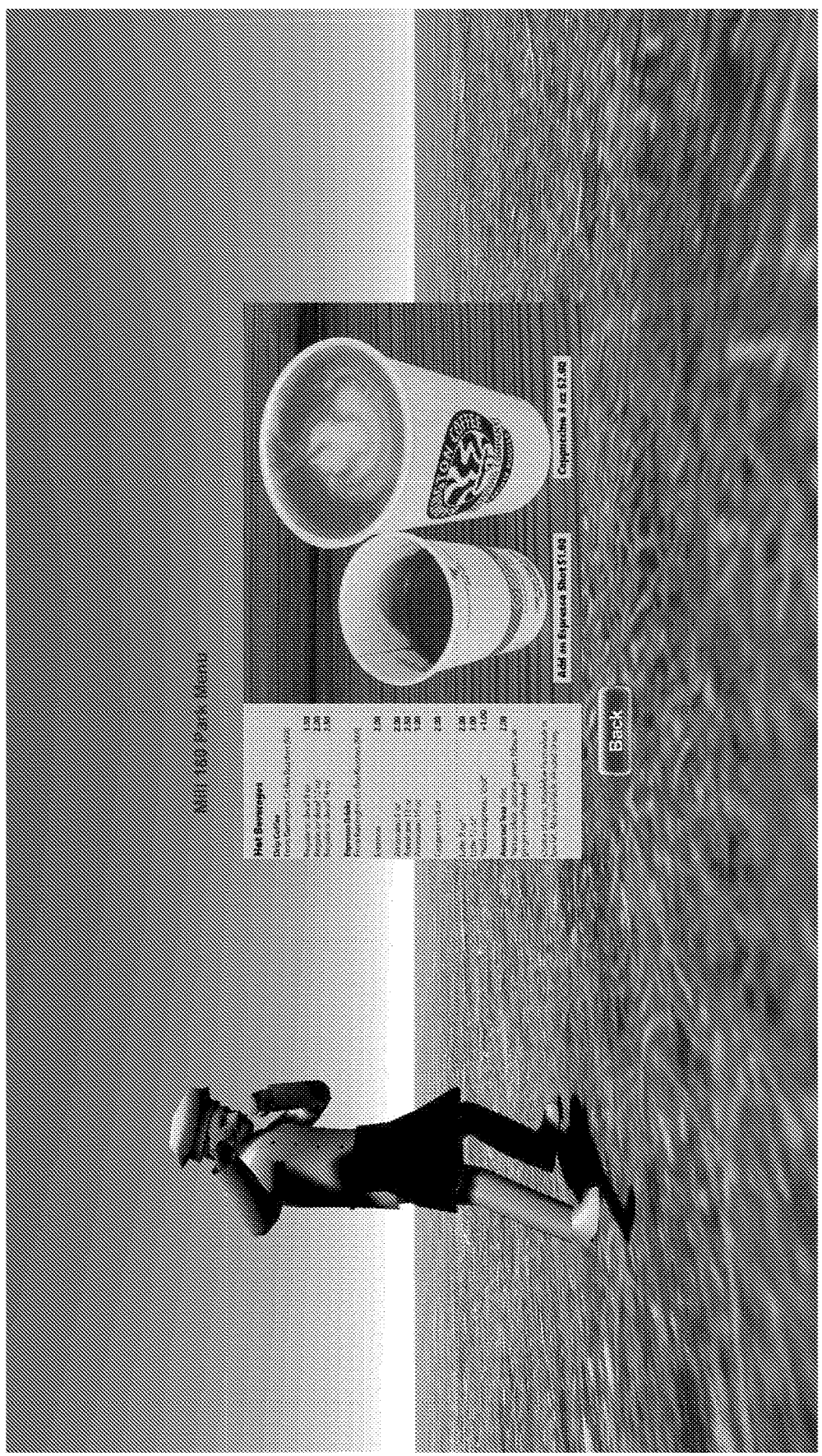
Figure 44:
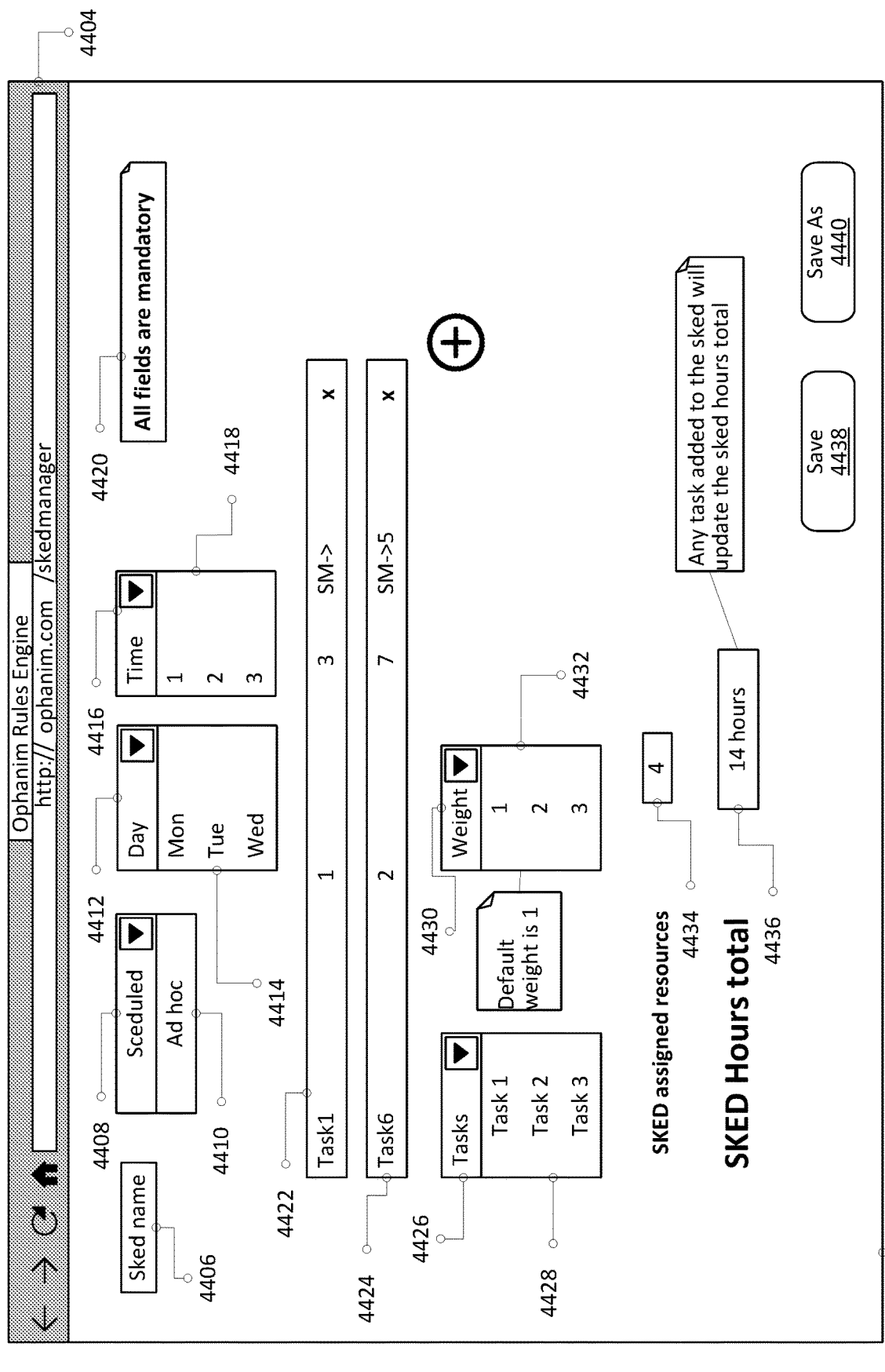
FIGS. 44-46 are illustrative diagrams for time management features for the cloud-based system and method to track and manage objects.
Figure 45:
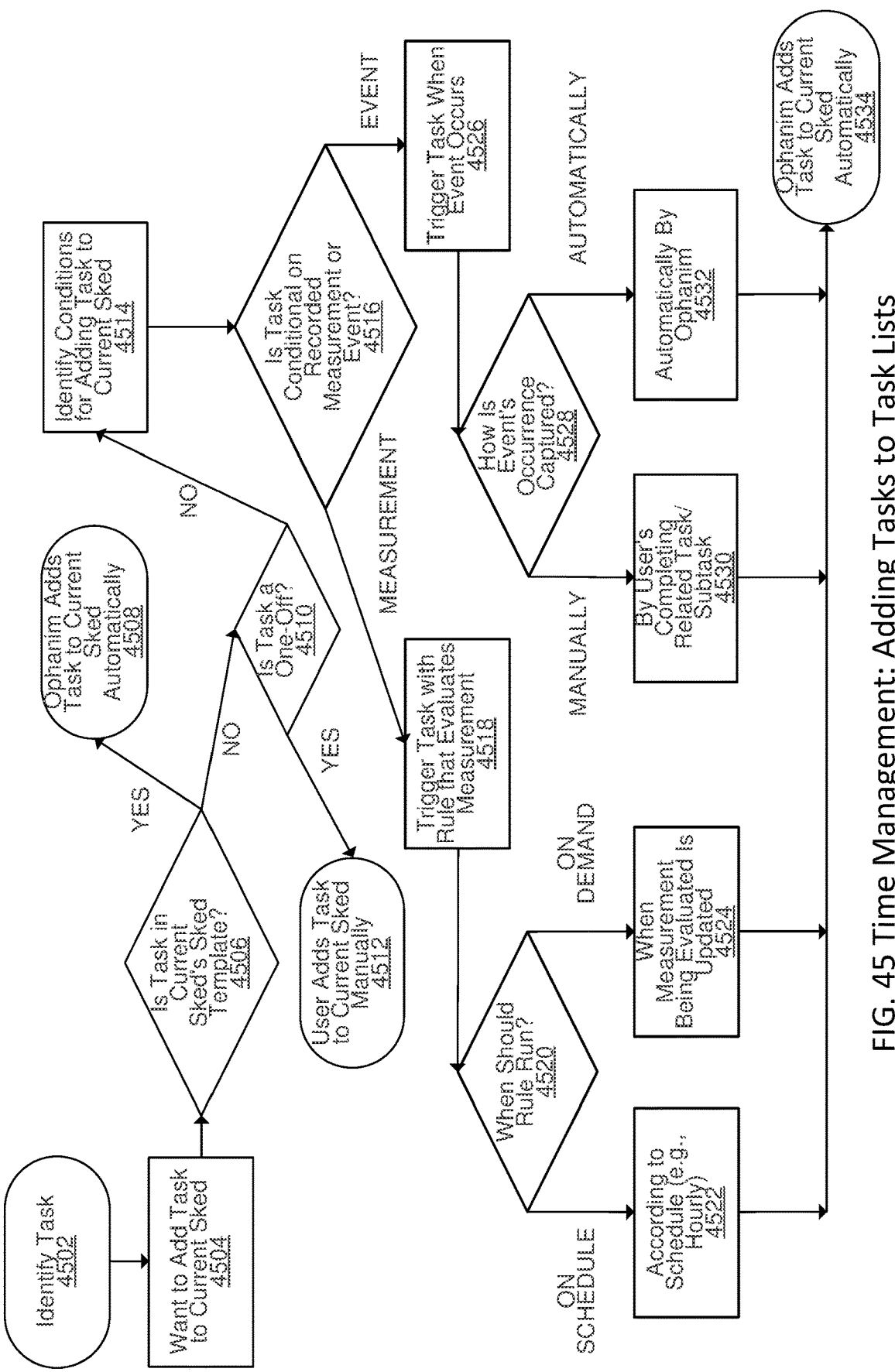
Figure 46:
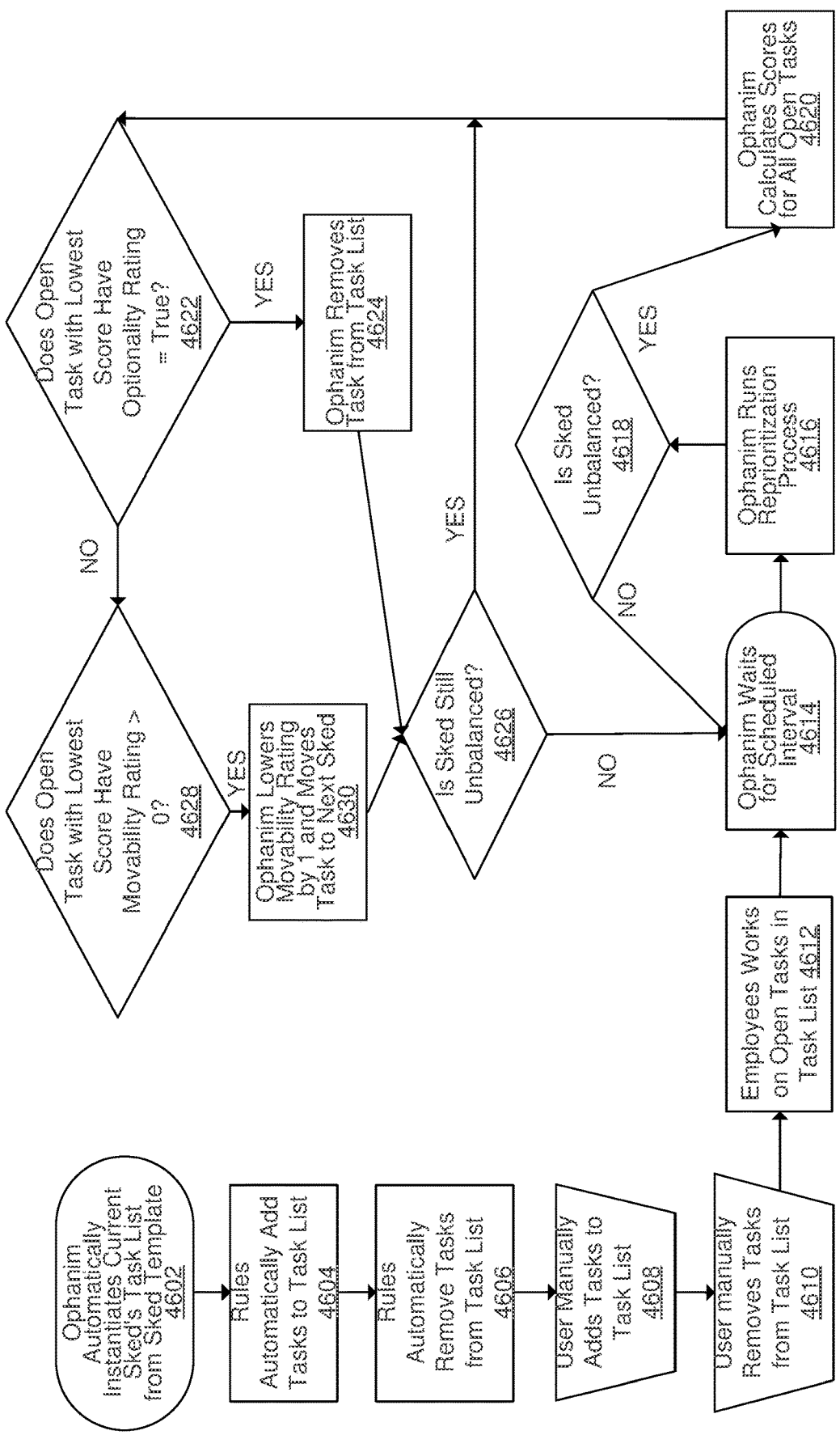

Referring now to the drawings, wherein like reference numerals designate identical or corresponding parts throughout the several views, and more particularly to FIGS. 1-46 thereof, there is illustrated a cloud-based system and method to track and manage objects, including the cloud-based system and method of FIGS. 1-6, Use Cases of FIGS. 7-29, Activity Diagrams of FIGS. 30-38, real-world example diagrams of FIGS. 39-43, and time management features of FIGS. 44-46. In FIGS. 1-6, Use Cases (FIGS. 7-29), Activity Diagrams (FIGS. 30-38), real-world example diagrams (FIGS. 39-43), and time management features (FIGS. 44-46), the system and method can include software and/or hardware (referred to as "Ophanim"), including an integrated suite of smartphone and tablet apps and programs running on cloud-based servers that (i) monitors all aspects of the enterprise, (ii) provides employees with interactive activity lists and instructions via online displays, in-program messages, and SMS and email messages, (iii) directs automated devices to perform actions to supplement the employees' efforts, and (iv) creates a community consisting of the enterprise and entities with which it interacts. Combined with sensors and other automated data input devices; smartphones, tablets, laptops, and other personal data entry and display devices; electronic switches, pumps, dosers, and other automated devices that can react to commands; and the employees or other humans who use the software, a given instance of Ophanim creates an enterprise-wide Ophanim Ecosystem.

Accordingly, Ophanim can include various novel aspects, such as its functionality that allows managing all suitable operations of an enterprise in an integrated manner, the user experience, how it is written (including the data model), Artificial Intelligence (AI)-powered management and advice, and the like. Advantageously, what ties everything together and contributes to differentiating Ophanim from other business software is the humanizing of the user experience, including the AI aspect.

A gamification expert has noted that gamification is the craft of deriving all the fun and addicting elements found in games and applying them to real-world or productive activities. This is what is called "Human-Focused Design" as opposed to "Function-Focused Design." It is a design process that optimizes for the human in the system, as opposed to pure efficiency of the system.

Ophanim does this through the metaphor of a novel, with the AI engine's operating like a novel's omniscient narrator (e.g., being able to manage the story of the enterprise and to further the story on its own). In addition, the data model follows the metaphor of a novel to make it understandable to users. In other words, to the extent possible, the database stores information about all of the enterprise's objects—human, other animate, and inanimate—in a similar way.

For a variety of reasons—ranging from cost, to lack of technical expertise, to the pressure to act reactively rather than strategically—small and medium-size businesses typically do not take advantage of modern software, in general, and AI, in particular. Ophanim addresses this situation by creating fun-to-use and easy-to-understand software that provides enterprise-level management support and that provides AI-powered management tools that will enable any size business to confront its day-to-day challenges with expert guidance.

Ophanim is unique in various ways. For example, unlike typical commercial software that focuses on a specific function (such as scheduling staff, managing inventory, or directing maintenance) or a small number of related functions, Ophanim manages all aspects of a business's operations in an integrated fashion.

In addition, unlike typical commercial software, Ophanim is designed to be understandable to users. In order to accomplish this, Ophanim manages the business using the metaphor of a novel, with:

Author=the person running Ophanim.

Setting=the environment being managed, such as a for-profit bakery, a non-profit boarding school, a logistics company, a for-profit farm, a household, or a high-school student's schedule.

Scene=a discrete business operation within the overall Setting, such as maintenance, inventory management, or retail sales.

Plot=the time frame and ultimate goal of the Author, such as long-term profit maximization, short-term cost minimization, nine-month stress minimization, or long-term employee happiness.

Characters=the people who will be managed, such as employees, customers, family members, visitors, or students.

External Agents=entities existing outside of the Setting that interact with Characters.

Plot Devices=automated processes that create Events.

Things=the non-human objects that will be managed.

Proper Nouns=Characters and Things that are unique instances of specific types of objects.

Common Nouns=Characters and Things that are not unique instances of specific types of objects.

Internal Events=occurrences brought about by the Characters or Plot Devices that affect other Characters or Things.

External Events=occurrences brought about by people or natural events outside of the Setting that affect Characters or Things.

Immutable Adjuncts=defining Adjuncts of Characters and Things that cannot change and that determine how Events affect them.

Mutable Adjuncts=defining Adjuncts of Characters and Things that can be changed and that might determine how Events affect them.

Families=collections of Characters and Things that share certain key Adjuncts.

Actions=Discrete tasks to be performed by Characters and certain Proper Nouns.

Activities=Groups of related Actions or single self-contained Actions.

Omniscient Narrator=Ophanim's AI engine that continuously monitors Characters and Things' Mutable Adjuncts, Internal Events, and External Events, and assigns Actions and Activities to Characters in furtherance of the Plot.

Further, unlike traditional commercial software, Ophanim is written in such a way that it stores and manipulates data similarly to how management uses information to operate the business. This approach helps to make Ophanim usable by entities operating in a very wide range of industries and environments.

Further, unlike traditional commercial software, Ophanim invites entities with which the enterprise interacts to act communally, either by becoming a fellow Ophanim subscriber or, in the case of a supplier, by exchanging order, delivery, and invoicing information online via the enterprise's Ophanim Website.

Finally, in order to overcome the problem that small and medium-size businesses often cannot benefit from AI systems due to the lack of enough data for effective data mining and decision analysis, Ophanim collects data from participating businesses, scrubs it to remove confidential information, and combines it to form a large volume of data. Ophanim thereby makes it possible for users to take advantage of AI-based guidance based on data mining.

Common reasons for business failures include:
Insufficient cash flow.
Offering products that are not in demand.
Ineffective marketing.
Lack of required skills to run the business.
Inability to build a team.
Inability to create the systems necessary to run the business.

In sum, businesses often lack the managerial skill and bandwidth that they need to succeed. AI models could be helpful, as they could guide such businesses to overcome the challenges noted above. However, AI models commonly require a vast amount of data for machine learning, which is something that often is not readily available.

Ophanim software is different from existing task management software in advantageous ways. These advantages can be illustrated in the context of a deployment to operate an indoor hydroponic-based park, as the software treats the park enterprise as a whole even though widely different activities with no apparent connection to each other (such as farming, food service, and visitor education) are taking place. One benefit of this approach is that park employees can be directed to perform functions outside of their comfort zones, thereby making staffing more efficient and empowering the employees. For instance, a given employee might be measuring the height of a pepper plant growing in a hydroponic display and then, 10 minutes later, making a cappuccino for an espresso bar customer.

Second, Ophanim software keeps track of every animate or inanimate object introduced into the enterprise in terms of the object's original status, any changes in that status, and, if relevant, the object's final status. The specific data elements stored for a given object vary depending on the object's nature. For instance, "Edible" is a required field for plants but not for kitchen equipment. Nevertheless, conceptually, Ophanim treats all objects similarly. One way to think of this approach is that Ophanim makes traditional inventory control software unnecessary by extending task management to all of the enterprise's objects, not just its employees.

Third, Ophanim software is interactive and fun to use. Instead of simply being instructed to perform certain repetitive functions, employees might be reacting to politely-phrased directions sent to them on their personal devices, and then providing feedback that affects what they and their colleagues are requested to do. This makes the employees active participants in the enterprise's success. For instance, if the employee measuring the plant's height notices that a nearby plant looks wilted, they can enter an observation into their smartphone and thereby change the park's entire staffing plan for the next hour. Depending on how the other employees are currently occupied, they might be requested to measure the pH of the reservoir associated with the wilted plant, while another employee with customer-facing experience is asked to move from the kitchen to the espresso bar and a third employee is shifted from the greenhouse to the kitchen.

Fourth, the Ophanim Ecosystem is constantly developing new skills. Typical task management software consists of a database and a user interface. Over time, the database grows increasingly populated, but the software's core functionality does not improve. In contrast, a given enterprise's Ophanim Ecosystem functionality keeps improving. That is due to learning on the part of both the software itself and the employees who are using it. Ophanim software encourages employees to learn how to perform new Activities by assigning the employees to Activities that are slightly beyond their current levels of competence, and then helping the employees to gain the necessary skills. An example of this "stretching" would be the Ophanim AI Engine's directing an employee to staff the park's espresso bar for the first time and simultaneously making available a YouTube video that demonstrates the use of the espresso bar's automated espresso machine.

Fifth, the Ophanim Ecosystem is designed so that all of the enterprise's objects are used as efficiently as practicable. In the case of an employee, this means that Activities are assigned in a way that strengthens the employee's motivation. For instance, rather than assigning the employee first one Action, then a second one once the employee completes the first one, and then a third Action after that, the Ophanim AI Engine might send the employee a list of three Actions to be completed within a certain amount of time and leave it to the employee to decide the order in which to complete them. The Ophanim AI Engine might also provide constructive feedback regarding the manner in which the employee reacted to the Activity list. In the case of non-human objects, the Ophanim Ecosystem similarly will endeavor to maximize their usefulness to the enterprise. For instance, the Ophanim AI Engine might determine that there are four gallons milk set to expire the next day, and that, based on historical consumption patterns, the espresso bar will use only one of them in time. Therefore, the Ophanim AI Engine might task two kitchen employees to make three of the gallons into yogurt by closing time.

Structure and Approach

The Ophanim Ecosystem has the following illustrative components:

Integrated SQL and non-SQL databases (the Ophanim Database) running on cloud-based servers.

Data collectors, including automated sensors, humans using the Ophanim App on their personal devices, and humans logged onto the Ophanim Website, which transmit information about relevant data elements to the Ophanim Database.

The Ophanim AI Engine running on cloud-based servers, which uses Artificial Intelligence to analyze the relevant information stored in the Ophanim Database in order to create Activity lists or otherwise to direct Actions.

The Ophanim App, which allows an authorized user to configure the Ophanim Database, record values, and/or manage an Activity list.

The Ophanim Website, which, depending on permissions, allows an authorized user to access some or all features of the Ophanim software.

Ophanim software approaches the challenge of managing the enterprise through a framework based on the metaphor of a novel, which Dictionary.com defines as follows:

A fictitious prose narrative of considerable length and complexity, portraying characters and usually presenting a sequential organization of action and scenes.

Numerous Actions are taking place in the enterprise's facility at any one time, with some Actions proceeding independently and others being affected by or affecting still more Actions. Both Characters such as employees and certain Things such as the HVAC system react to these Actions, usually, but not always, sequentially. Some Scenes are apparent to people at the facility, while others run in the background—including outside of the facility. The Ophanim AI Engine is akin to a novel's omniscient narrator: it is aware of everything taking place and, building on what has occurred, it directs future Actions in an internally logical manner. For instance, based on what day it is (e.g., a school holiday) and the current local weather (e.g., cold and wet), the Ophanim AI Engine might request two employees to come to work an hour early to deal with the unusually large number of visitors anticipated that day.

In FIGS. 1-6, the following tables describe the various components of the system and method.

| FIG. | Element | Description |
| --- | --- | --- |
| 1 | 101 | Weather Company Web Service - retrieves current weather conditions for the space |
| 1 | 102 | Temperature Sensor - both handheld and stationary broadcast |
|   | 103 | CO2 Sensor |
| 1 | 104 | Light Sensor to capture ambient, foot candles and color spectrums |
| 1 | 106 | Processing Cloud |
| 1 | 107 | Internet Network |
| 1 | 108 | Readings Process - accepts the input from any device and applies the value before triggering another Action assessment |
| 1 | 109 | Trigger queue that is input to the Al Activity analysis |
| 1 | 110 | Readings Database - used to track readings and Actions that occur with respect to certain Proper Nouns |
| 1 | 111 | Weight sensor |
| 1 | 112 | RFID Reader - locates inventory items as they move through the space |
| 1 | 113 | Water level sensor |
| 1 | 114 | pH Sensor - both handheld and stationary broadcast |
| 1 | 115 | Electrical Connectivity (EC) Sensor - both handheld and stationary broadcast |
| 1 | 116 | Humidity Sensor |

| FIG. | Element | Description |
| --- | --- | --- |
| 2 | 201 | Laptop - for input from a user |
| 2 | 202 | Tablet - for input from mobile employees |
| 2 | 203 | Bar Code Scanner - for inventory item selection |
| 2 | 204 | Video Camera - stationary cameras for watching inventory or mobile for collecting Adjuncts |
| 2 | 205 | Data Message Processor - receives data from the laptop and tablet and validates it |
| 2 | 206 | Natural Language Processor - interprets user comments and converts them to data messages |
| 2 | 207 | Photo Analyzer - interprets photos and creates Adjunct updates |
| 2 | 208 | Video Analyzer - interprets video sequence and creates Adjunct updates |
| 2 | 209 | Readings Database - used to track readings and Actions that occur with respect to certain Proper Nouns |
| 2 | 210 | Readings Process - accepts the input from any device and applies the value before triggering another Action assessment |
| 2 | 211 | Lexicon Neural Network - defines the relationship between all data items |
| 2 | 212 | Trigger queue that is input to the Al Activity analysis |
| 2 | 213 | Processing Cloud |

| FIG. | Element | Description |
| --- | --- | --- |
| 3 | 301 | Receipt Printer |
| 3 | 302 | Restaurant/Kitchen Management System |
| 3 | 303 | Manufacturing Management System (ERM/CRM) |
| 3 | 304 | Activity Management Software Running on a tablet or Laptop |
| 3 | 305 | Bar Code Scanner - for inventory item selection |
| 3 | 306 | Bar Code Label Printer - for inventory tags |
| 3 | 308 | Readings Database - used to track readings and Actions that occur with |

| FIG. | Element | Description |
|---|---|---|
| | | respect to certain Proper Nouns |
| 3 | 309 | Lexicon Neural Network - defines the relationship between all data items |
| 3 | 310 | Readings Process - accepts the input from any device and applies the value before triggering another Action assessment |
| 3 | 311 | Adjustment Process - updates the Adjuncts of Proper Nouns |
| 3 | 312 | Data Message Processor - restructures messages from other management processes |
| 3 | 314 | Trigger queue that is input to the Al Activity analysis |
| 3 | 315 | Time Related Action Process - reviews each Proper Noun |
| 3 | 316 | Processing Cloud |

| FIG. | Element | Description |
|---|---|---|
| 4 | 401 | Proper Noun Time Assessment - reviews each Proper Noun to determine if it has expired or requires an Action to be performed |
| 4 | 402 | Proper Noun Reading Assessment - reviews the readings for the Proper Noun and adjusts the Actions |
| 4 | 403 | Adjunct Change - process for handling changes to Adjunct values |
| 4 | 404 | Action Feedback - will assess the feedback from the Character and alter Proper Noun-related Actions or Adjuncts |
| 4 | 405 | Proper Noun Change Queue - list of changes to be applied |
| 4 | 406 | Lexicon Neural Network - defines the relationship between all data items |
| 4 | 407 | Proper Noun Action Assessment - reviews the Actions to be performed for a Proper Noun to determine what is required |
| 4 | 408 | Currently Logged In database |
| 4 | 409 | Noun Rules for applying the Adjunct values for creating the Activity list |
| 4 | 410 | Action Distribution - determines which current Character is available and skilled enough to perform the Action |
| 4 | 411 | Tablet or laptop application that displays the Activity list for the day for this Character |

| FIG. | Element | Description |
|---|---|---|
| 5 | 501 | Family - represents a list of related Proper or Common Nouns |
| 5 | 502 | Nouns |
| 5 | 503 | Proper Nouns |
| 5 | 504 | Verbs |
| 5 | 505 | Family - represents a list of related Nouns |
| 5 | 506 | Nouns |
| 5 | 507 | Proper Nouns |

| FIG. | Element | Description |
|---|---|---|
| 6 | 601 | Display of an Action to be done |
| 6 | 602 | Display of the list of Actions after an Action has been completed |
| 6 | 603 | Done button - tells the System that the Action has been completed |
| 6 | 604 | Processing Cloud |
| 6 | 605 | Natural Language Processor - interprets user comments and converts them to data messages |
| 6 | 606 | Message Parser to interpret new messages from the tablet or laptop application |
| 6 | 607 | Action Completion Process - marks the Action as complete and triggers the Action assignment process that it can reassess the Proper Noun-related Actions for the next Action |
| 6 | 608 | Fuzzy Logic model that uses probabilities of skill level, performance on previous Actions, and other user feedback to select Characters for given Actions |

According to illustrative embodiments, FIGS. 7-29 include use cases, which illustrate possible implementations of the as-described software and/or hardware, and with integrated diagrams and/or detailed descriptions thereof.

One implementation of an Ophanim Ecosystem can be in an indoor park or similar facility. Described below are the various interactions (use cases) that will occur among actors and the various server processes in such a case. Although this is a specific implementation of an Ophanim Ecosystem, conceptually it is similar to any other implementation in that there are multiple server processes operating and multiple actors (both human and non-human) interacting with those processes.

The illustrated use cases are broken up by the system that will be supporting them. The processes implicated include the following:

Activity Management,
Information Kiosk and Visitor Interactions,
Inventory Management,
Sound System Management,
Corporate Event Management, and
General Management.

Each use case can include the interaction from each actor (usually a human but at times a sensor or other automated device) and the system. Additionally, the interaction between the System and the server-based information is also outlined.

The age of the actor will affect the content of any response and selection list for games and other activities.

Activity Management

The following use cases are related to production of Activity lists for employees, volunteers, and automated devices. An activity can include any Action that is required by any operation.

1. Retrieve Activity List

The Activity list is personalized for each actor depending on Adjuncts such as when they are available or the certifications and skill level necessary for the various Actions.

Actors:
Employee
Volunteer
Server Process or Service
Preconditions

The actor must be known to the system as someone or something that can receive Activities.

Basic Flow

Figure 1:
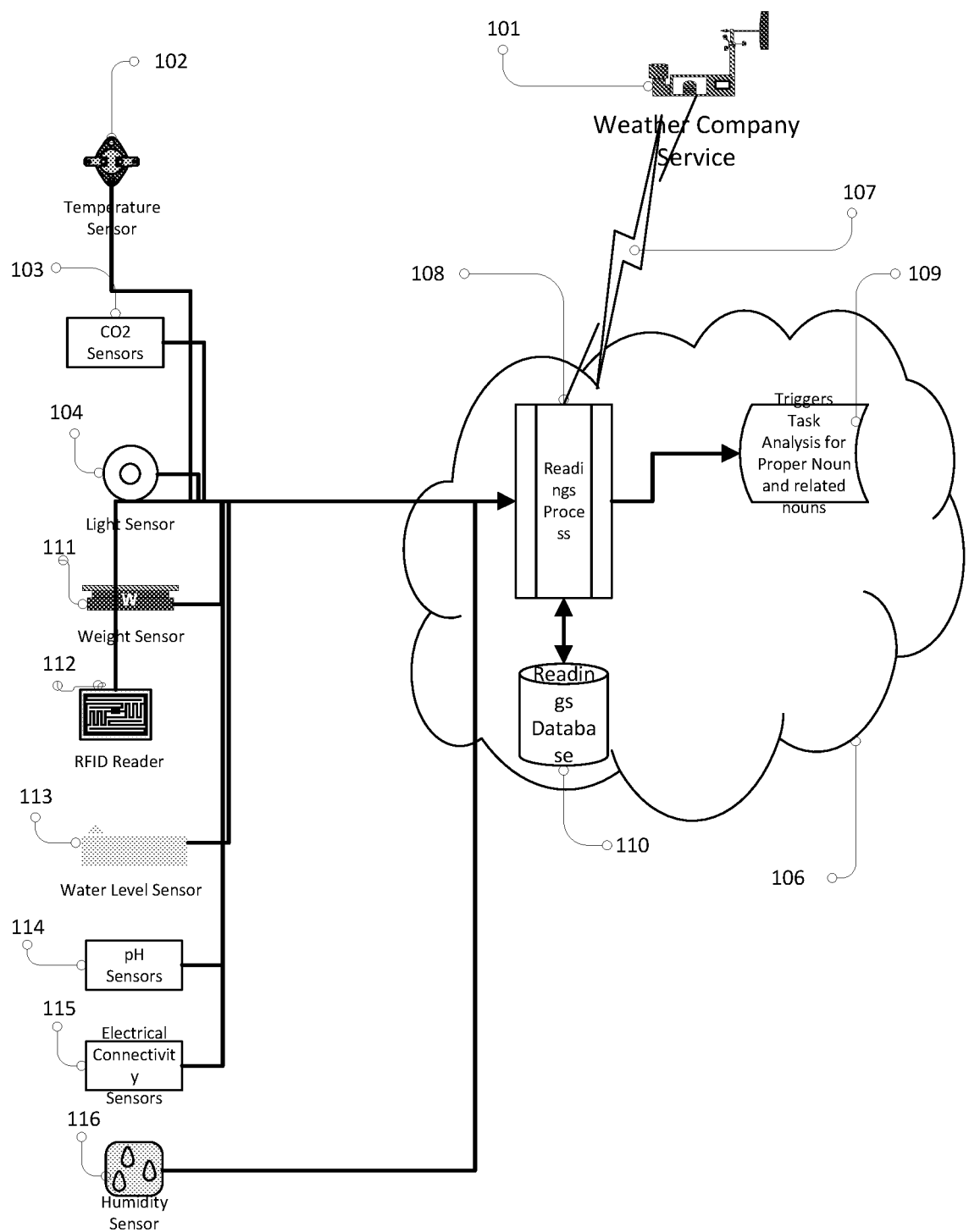
FIGS. 1-6 are illustrative diagrams of a cloud-based system and method to track and manage objects.
Figure 2:
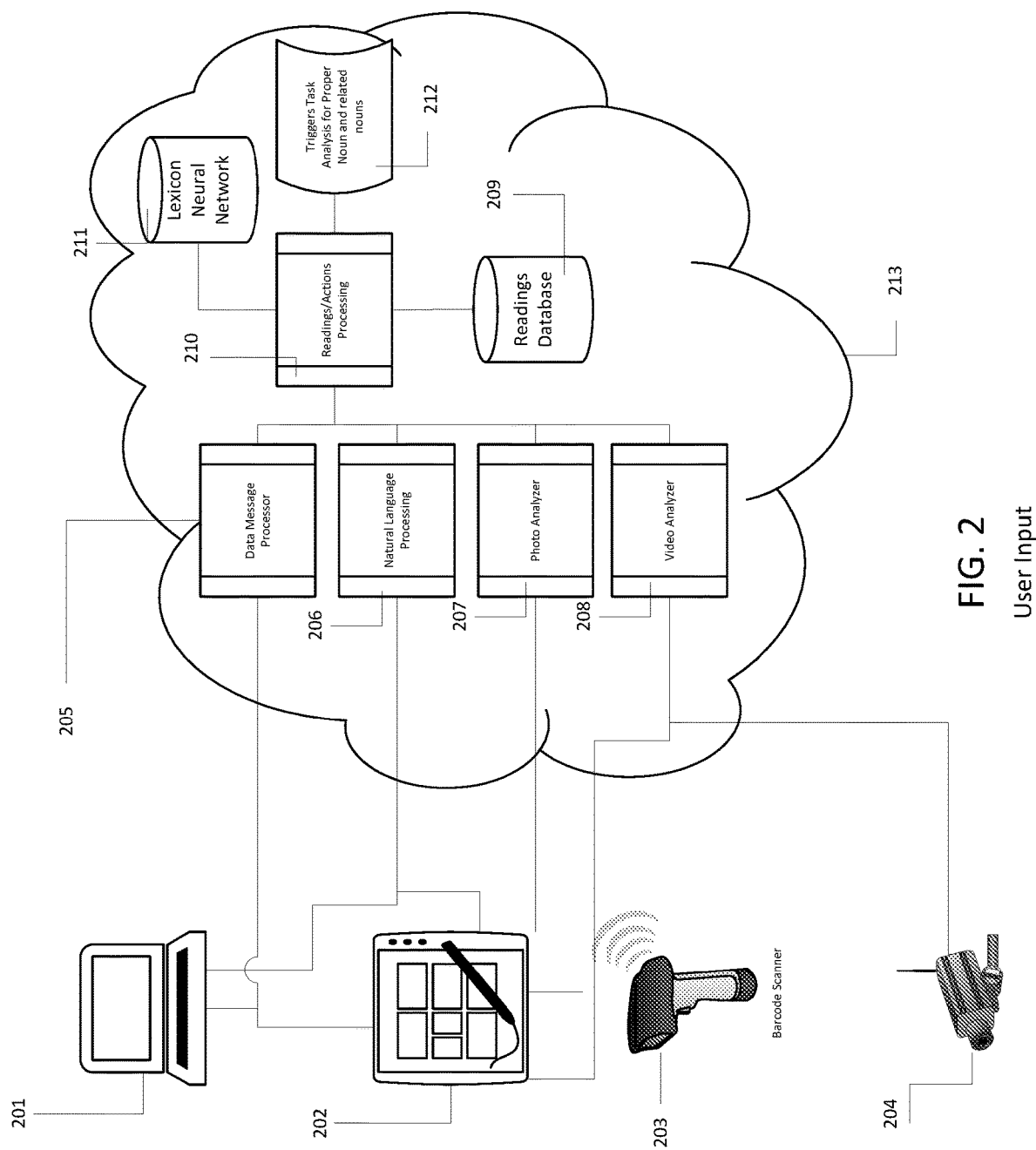
Figure 3:
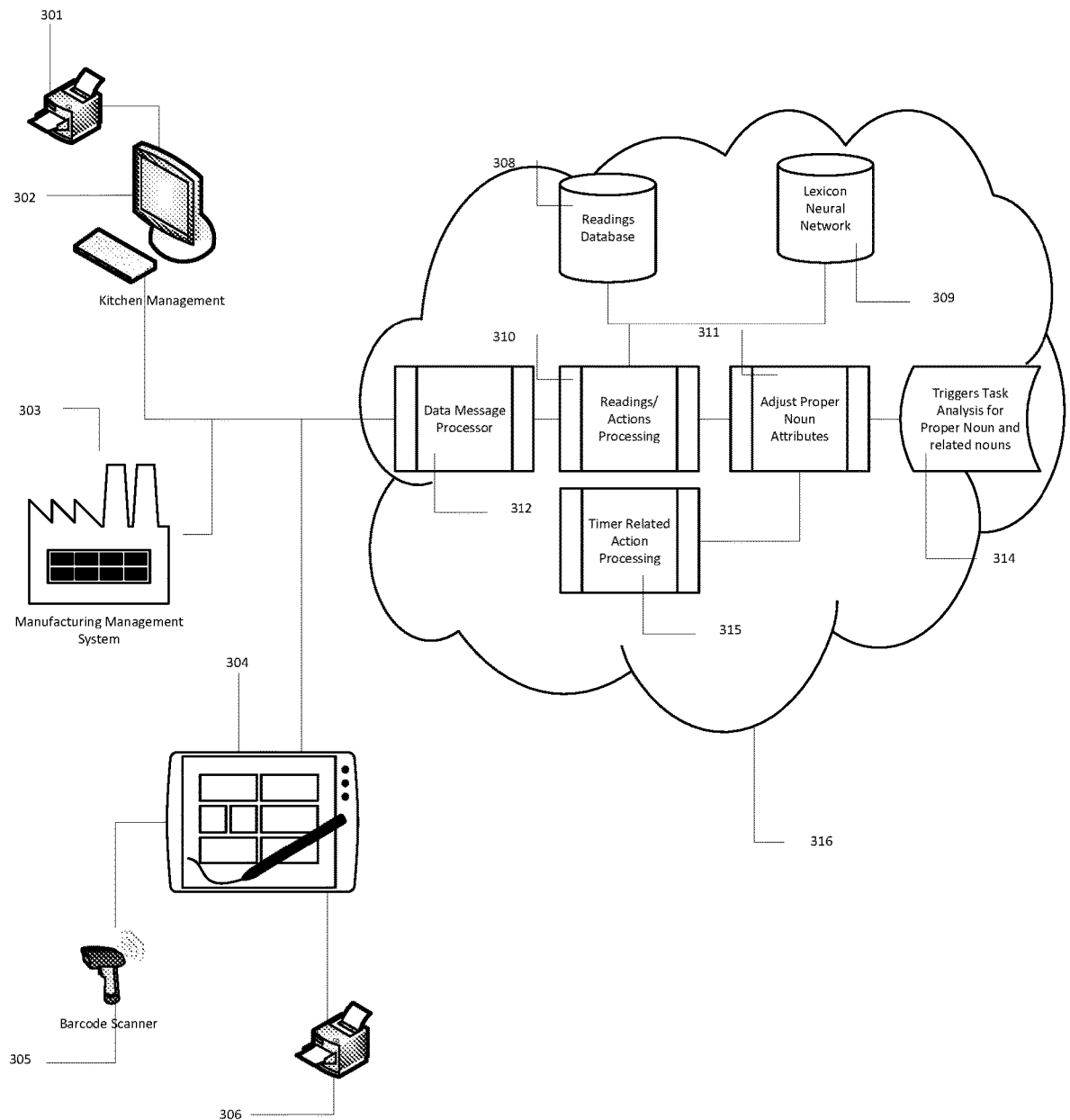
Figure 4:
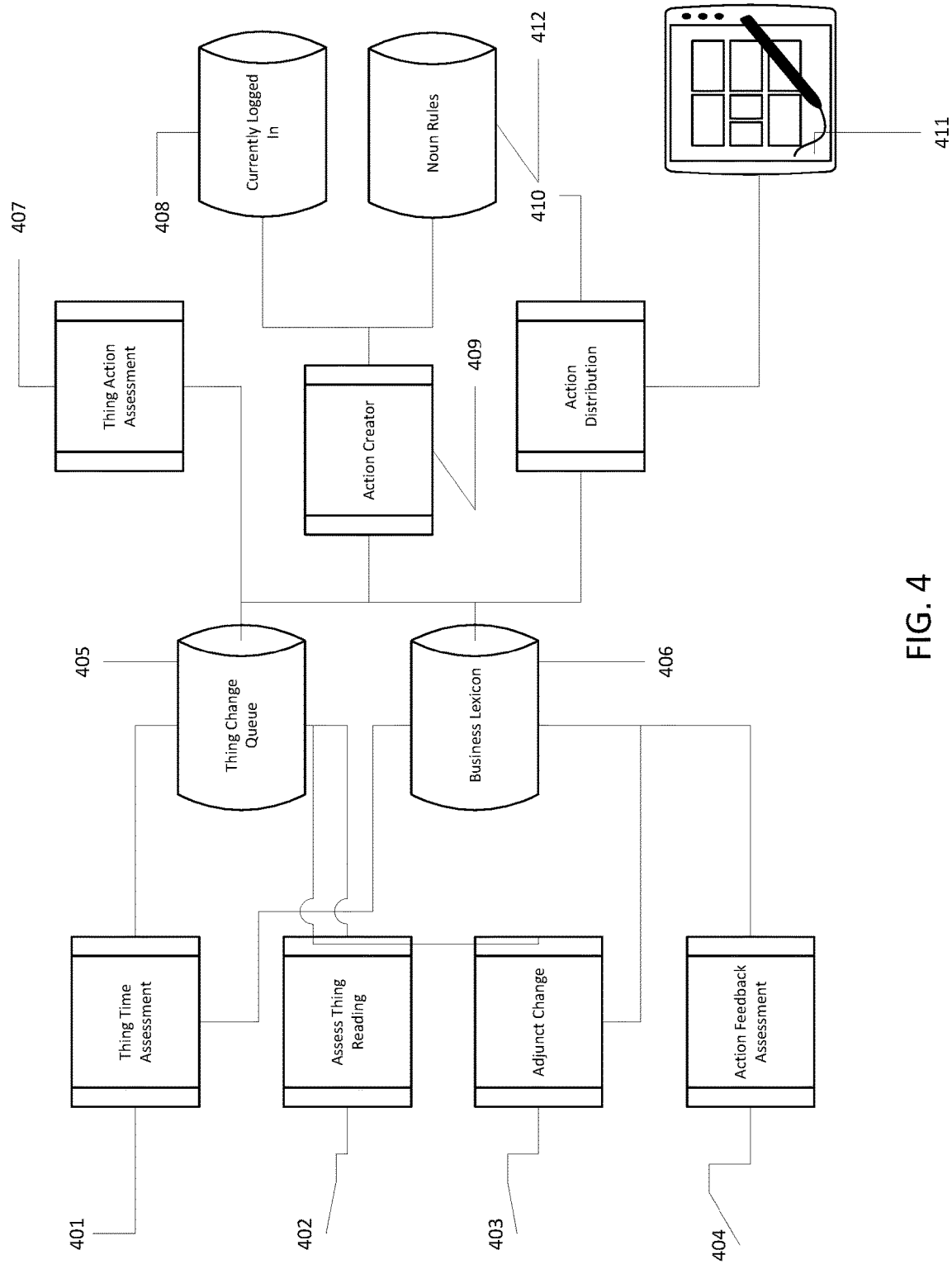
Figure 5:
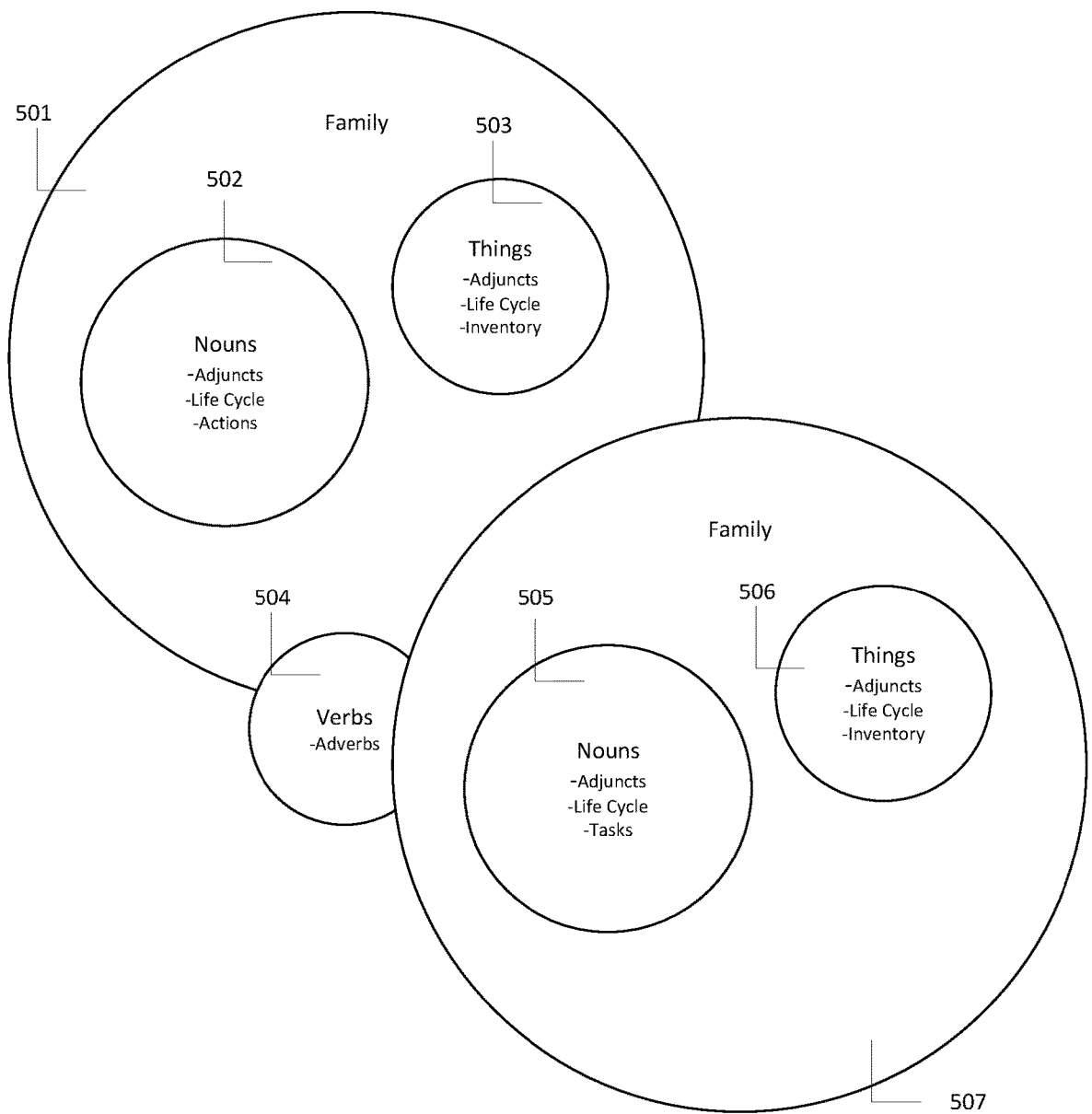
Figure 6:
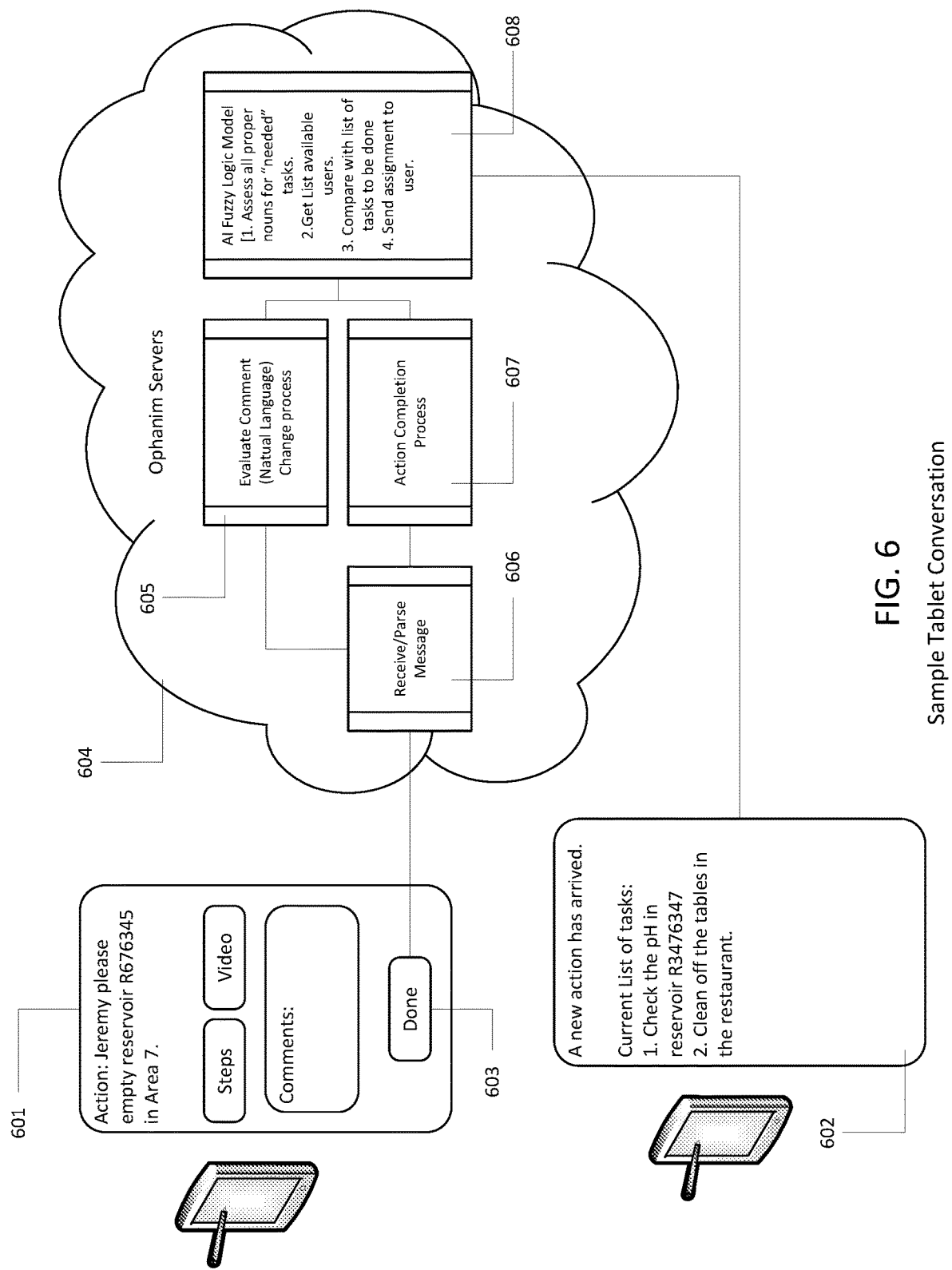
Figure 7:
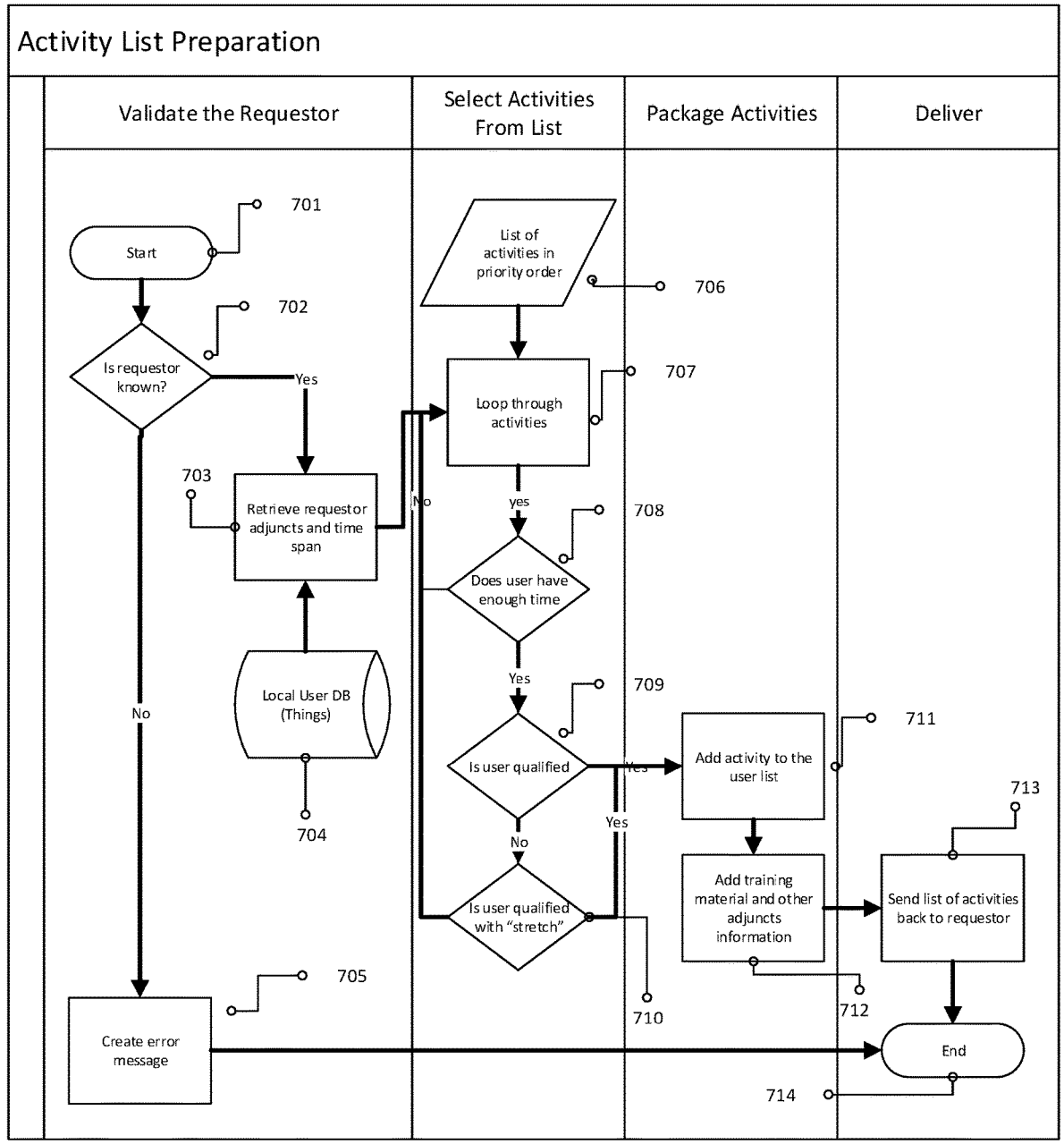
FIGS. 7-29 are illustrative Use Cases for the cloud-based system and method to track and manage objects.

FIG. 7 shows how most requests for Activities will be handled. The system will first validate if the requestor (steps 701-705) is valid. The challenge is determining if the actor is qualified for a particular Activity (steps 706-710) as accomplishing this involves gray areas of Adjunct checking (close may be good enough). For checking of "stretch" qualifications, the Adjuncts may be just out of the gray range but the actor has expressed an interest to learn. Once the Activities are selected and training material is added to them, the list will be forwarded to the requesting system (steps 711-713).

Alternative Flow

Figure 8:
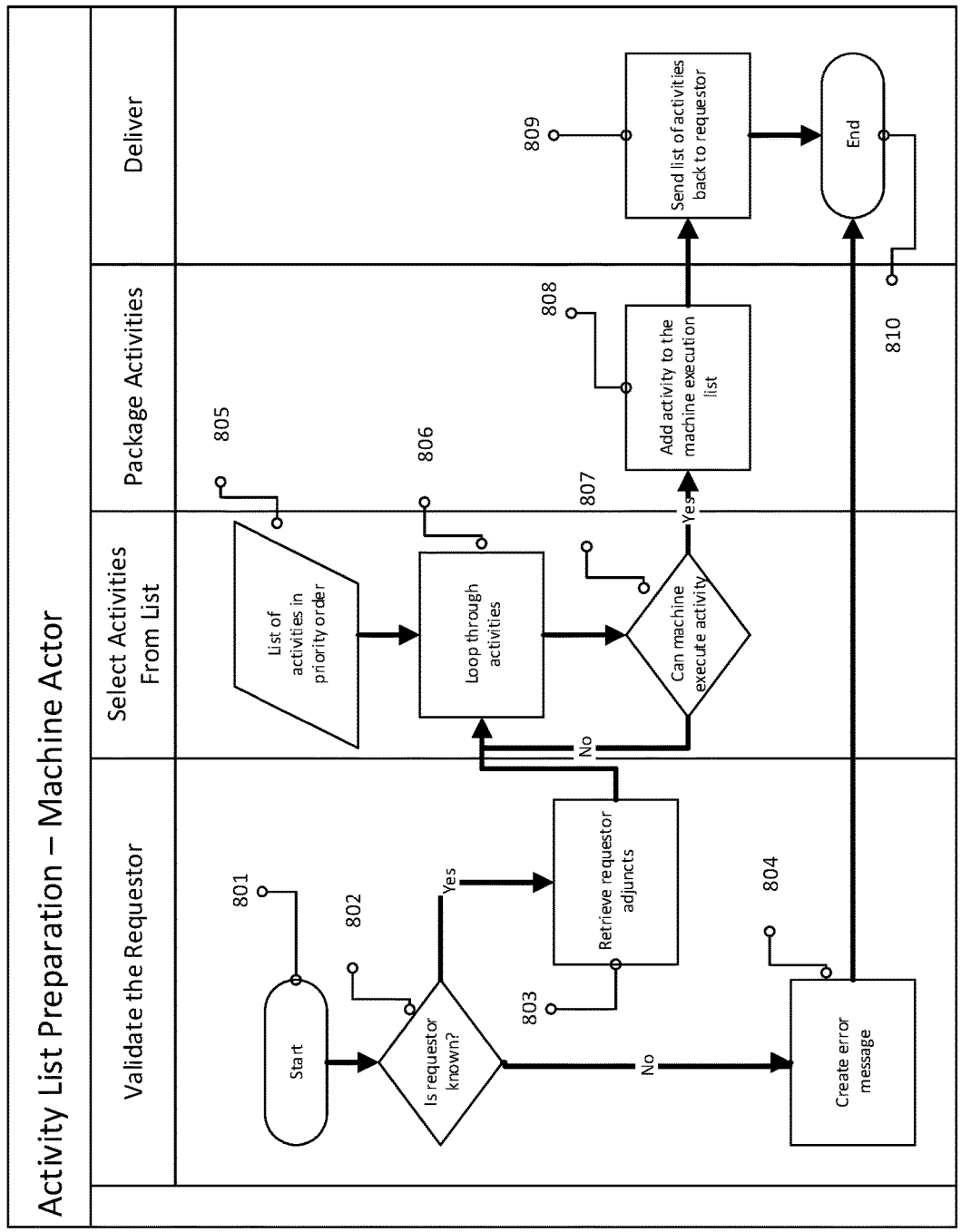

FIG. 8 shows that for machine actors, the data flow changes somewhat because the amount of time does not need to be checked. The selection will be done based on whether the server has the executable to run and whether the Action start time has arrived. This is illustrated in steps 801-809.

Exception Flow

There are a number of situations to consider in the exception flows. The following list is not exhaustive but should reflect the major exceptions:

Fatal Programming Errors—Generate a message to the log and alert the support staff via email and/or text.
Database Errors—If the actor already has Activities in their list, forward them. Follow that with email or text to the support staff.
Empty Activity Queue—If there is nothing in the Activity queue, a query should be generated to retrieve any "always do" Actions.
Communication Link Failure—If there is a network failure, all Actions in the actor's list will be freed and placed back in the Activity Queue.

Post Conditions/Result

A list of the Actions containing the following will be sent to the actor:
Work Steps—description, images, video
Video demonstration
List of required supplies, equipment and anything else required to perform the Action
Must Start Time—if the Action should start by a certain time
Must Complete Time—if the Action should end by a certain time The Activities will be updated in the queue to log to which actor each Action was assigned and when.

2. Start an Activity

Every Activity list that is issued must provide back a start, a turn back, or a time out. In this case, the start of the Activity is documented. It means that the actor has decided to begin the first Action and to start recording the Actions taken, the results to be gathered along with any feedback from the actor.

Actors:
Employee
Volunteer
Server Process
Preconditions

The requesting person/machine must be known to the system as someone or something that can start an Activity. Additionally, the Activity had to have been assigned to the actor.

Basic Flow

Figure 9:
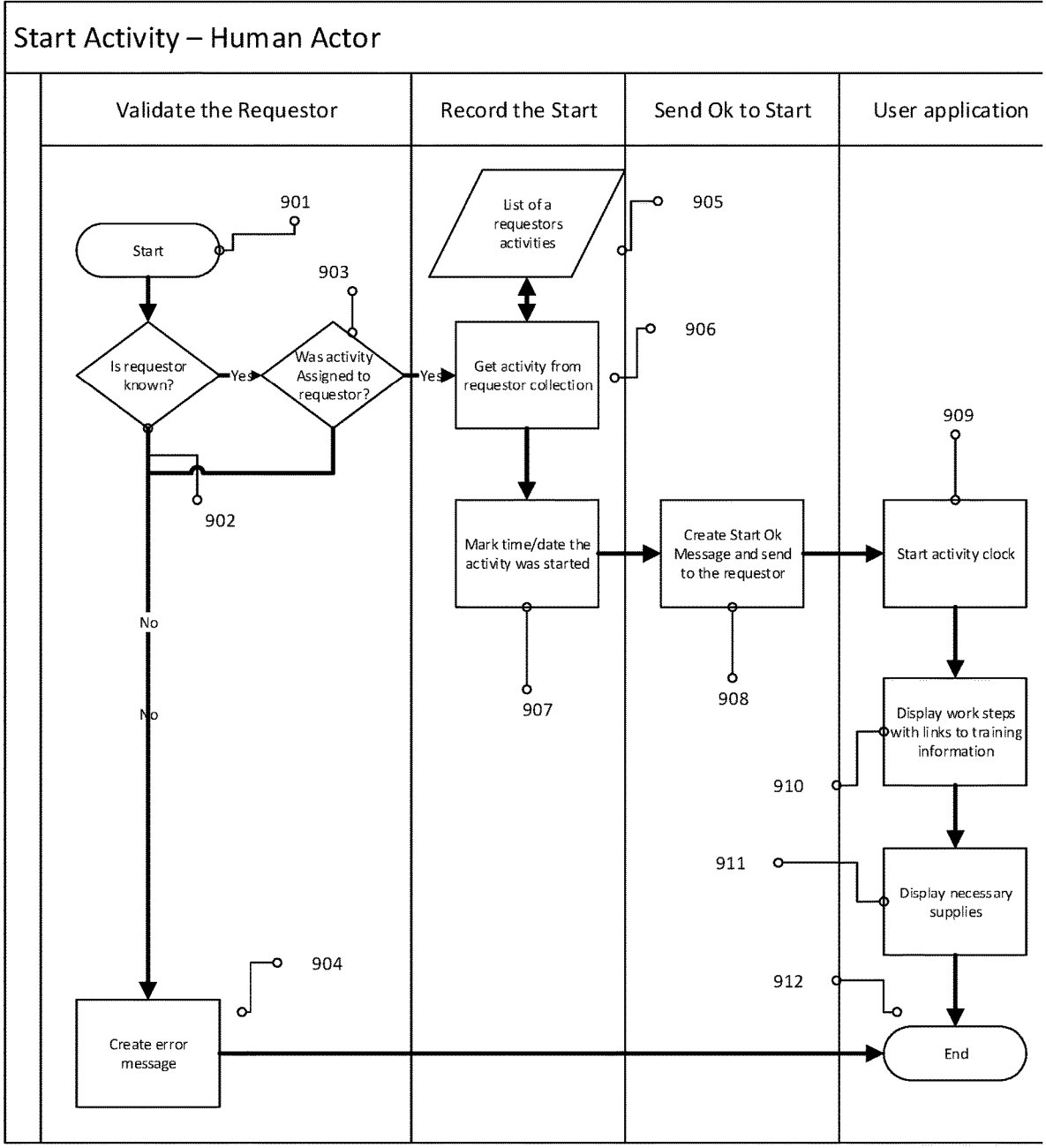

FIG. 9 shows how starting an Activity list will be handled. The basic flow is to check that the actor sending in the message was assigned the Activity and has the time to complete it (steps 901-908). The server will return a message that indicates that the Activity can be started (steps 909-912). Upon that notification, if the actor is a human using an application, the application will present them with the list of work steps and training materials.

Alternative Flow

Figure 10:
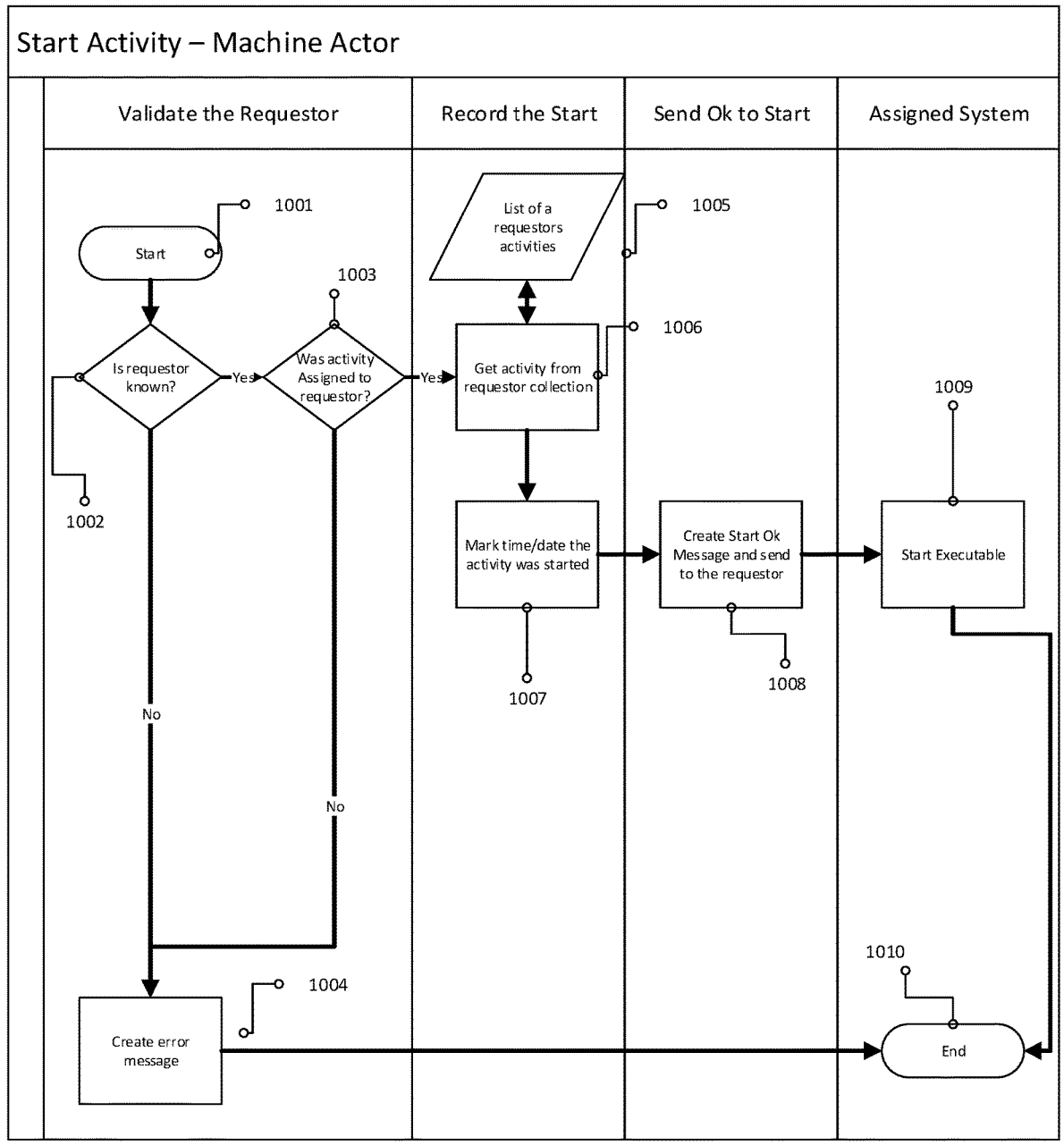

FIG. 10 shows that for machine actors, the data flow changes somewhat because there are no work steps (steps 1001-1008). There is only the running of an executable (steps 1009-1010).

Exception Flow

There are a number of situations to consider in the exception flows. The following list is not exhaustive but should reflect the major exceptions:

Fatal Programming Errors—Generate a message to the log and alert the support staff via email and/or text.
Database Errors—If the start message is ready then send it. Otherwise, Ophanim will not error on the side of caution and send a start "OK" message. The system should queue any information that still needs to be updated in the database.
Communication Link Failure—If there is a network failure, the server will attempt to connect to actor. If after three attempts to connect, the actor cannot be found, their Activities will be freed and messages will be sent to the support staff.

Post Conditions/Result

The actor will be presented with the work steps for each Action and a list of the supplies necessary to complete the Action.

The work steps will include a description and training materials (images, videos, etc.).

For the human actors, a small clock will start that can be set to count down or up by the actor. This mechanism is in place to provide challenges to completing an Action.

3. Report a Reading

While completing a given Action, the actor may need to report Adjunct readings. These are measurements, observations and data from monitoring systems and used in the AI management algorithms. The process of sending in the recorded reading message will be generalized for the purposes of simplifying the software.

Reading can be derived from any of the following:

Equipment where the value is inputted as the reading. For instance, the value on a pH tester will be inputted.

Observation will be where a person is giving a subjective opinion of an Adjunct. An example will be leaf color where a person may say the color is Forest Green. The possible readings will be limited to reduce the effect of subjectivity to the extent possible (e.g., the person will have to choose a color from a list).

Automated sensor that takes a reading and then sends it to the server.

The readings are used to determine:

If further Actions are needed with respect to the Thing.

If other Things require an Action.

Whether there are any unintended consequences as a result of this Action or other Actions on other Things.

Actors:

Employee

Volunteer

Server Process and Service

Automated Sensors

Preconditions

The person/machine/sensor must be known to the system as someone or something that can enter readings. The reading must also contain the proper identifier of the Thing and the Adjunct being measured.

Basic Flow

Figure 11:
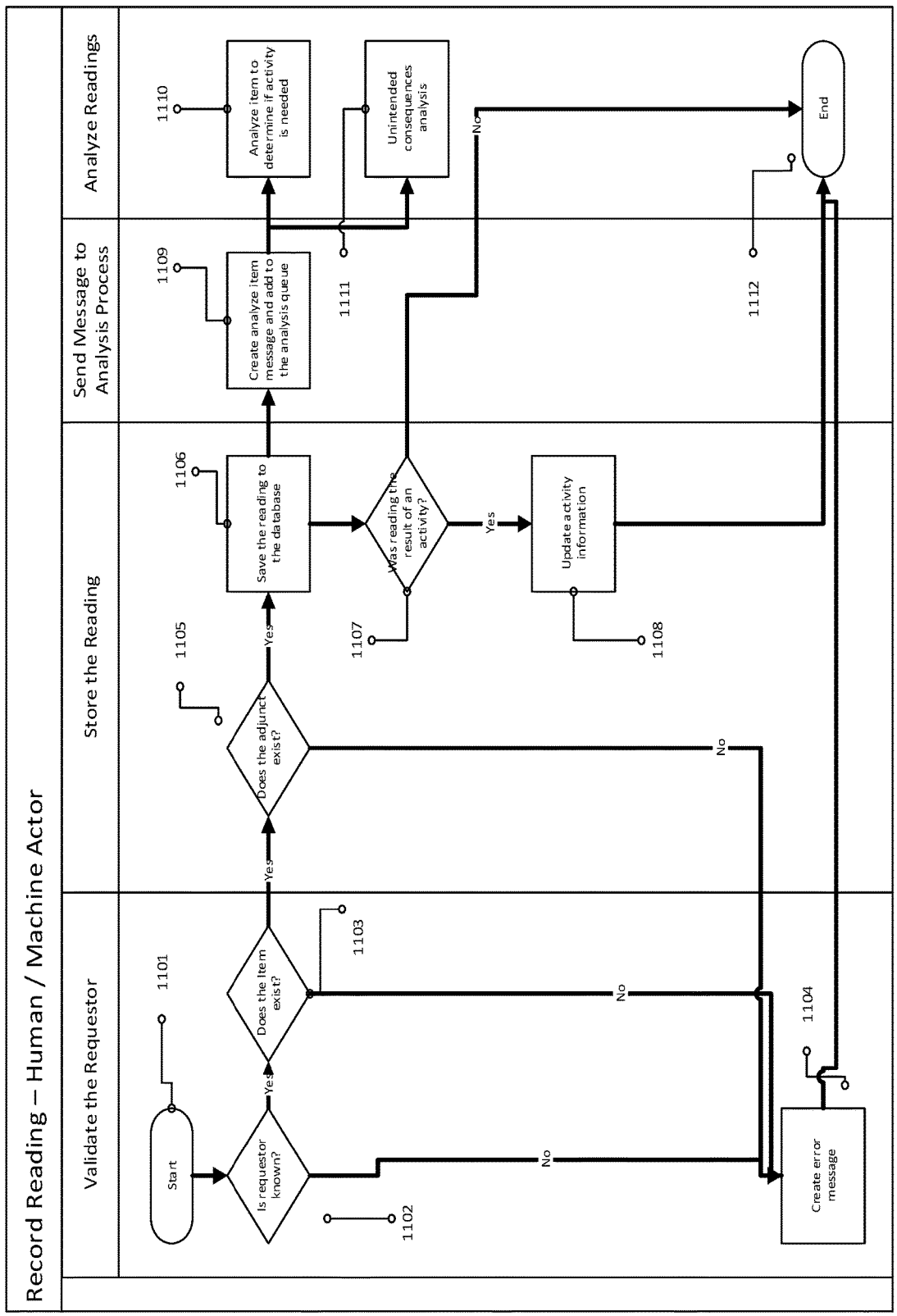

FIG. 11 shows how a reading will be received from an actor or server actor (steps 1101-1105) and then processed (steps 1106-1107). A notification of new readings on a Thing is then sent to the process that is assessing new activities (steps 1108-1112) to determine if further action may be needed.

Alternative Flow

Figure 12:
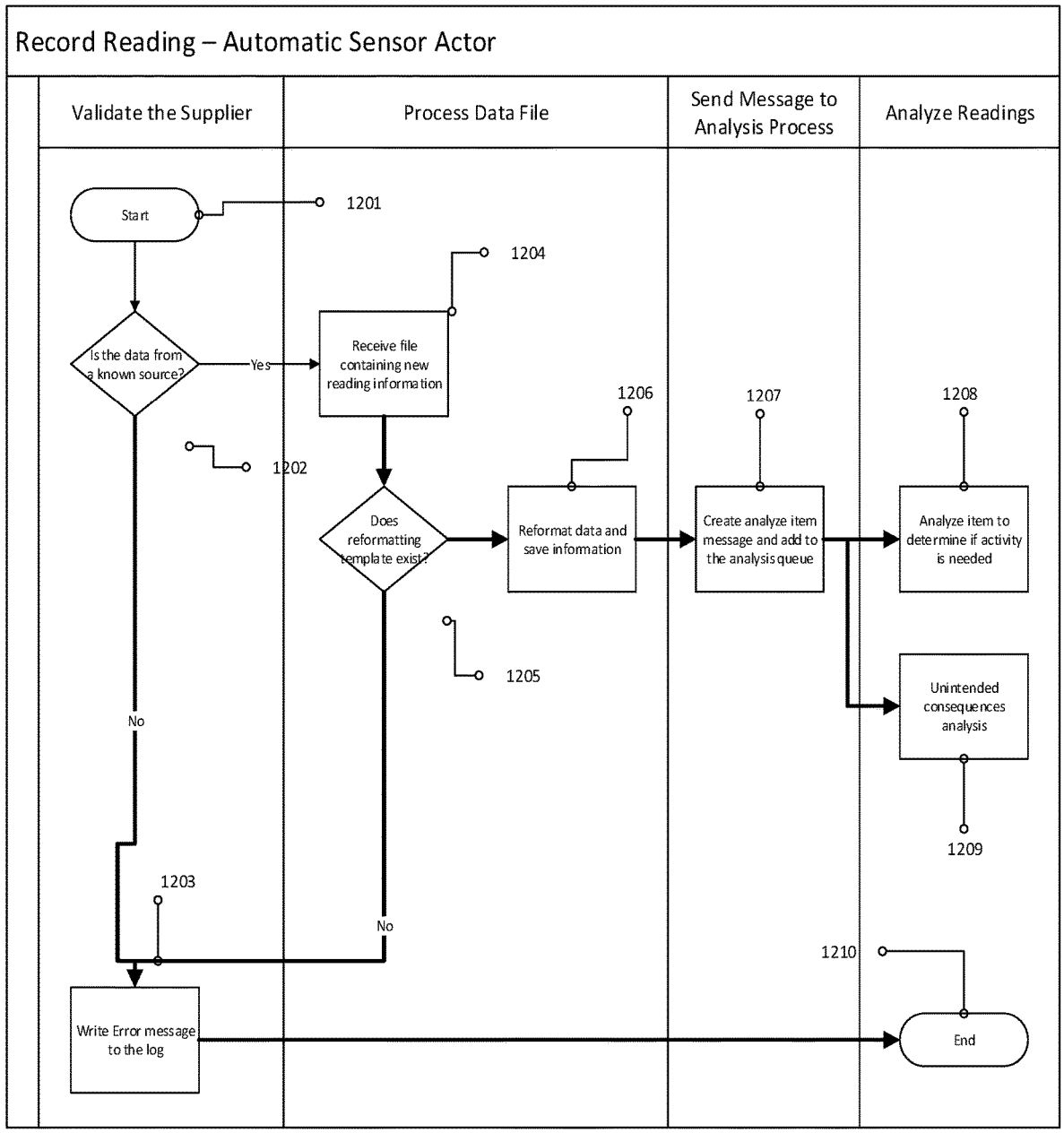

For automated sensor actors, FIG. 12 shows that the data flow changes somewhat because many of those processes require the data to be pre-processed before being added to the database. The data is sent to a process that reformats the data (steps 1201-1206) and creates the proper reading information. A notification of new readings on a Thing is then sent to the process that is assessing new activities (steps 1207-1209) to determine if further action may be needed.

Exception Flow

There are a number of situations to consider in the exception flows. The following list is not exhaustive but should reflect the major exceptions:

Fatal Programming Errors—Generate a message to the log and alert the support staff via email and/or text.

Database Errors—If the reading does not get saved, the data is queued and then retried after the database becomes available.

Post Conditions/Result

New reading data will be added to the database. That data is now available to be considered as the conditions of all Things are analyzed to determine if an Action is necessary and whether a particular Activity caused some unintended consequences.

4. Get Education on a Work Step

There will be times when an actor may need some instruction on completing an Activity or Action. This use case is about how a person will invoke the various methods to view training material and the events that take place after the training has been completed.

Actors:

Employee

Volunteer

Basic Flow

Figure 13:
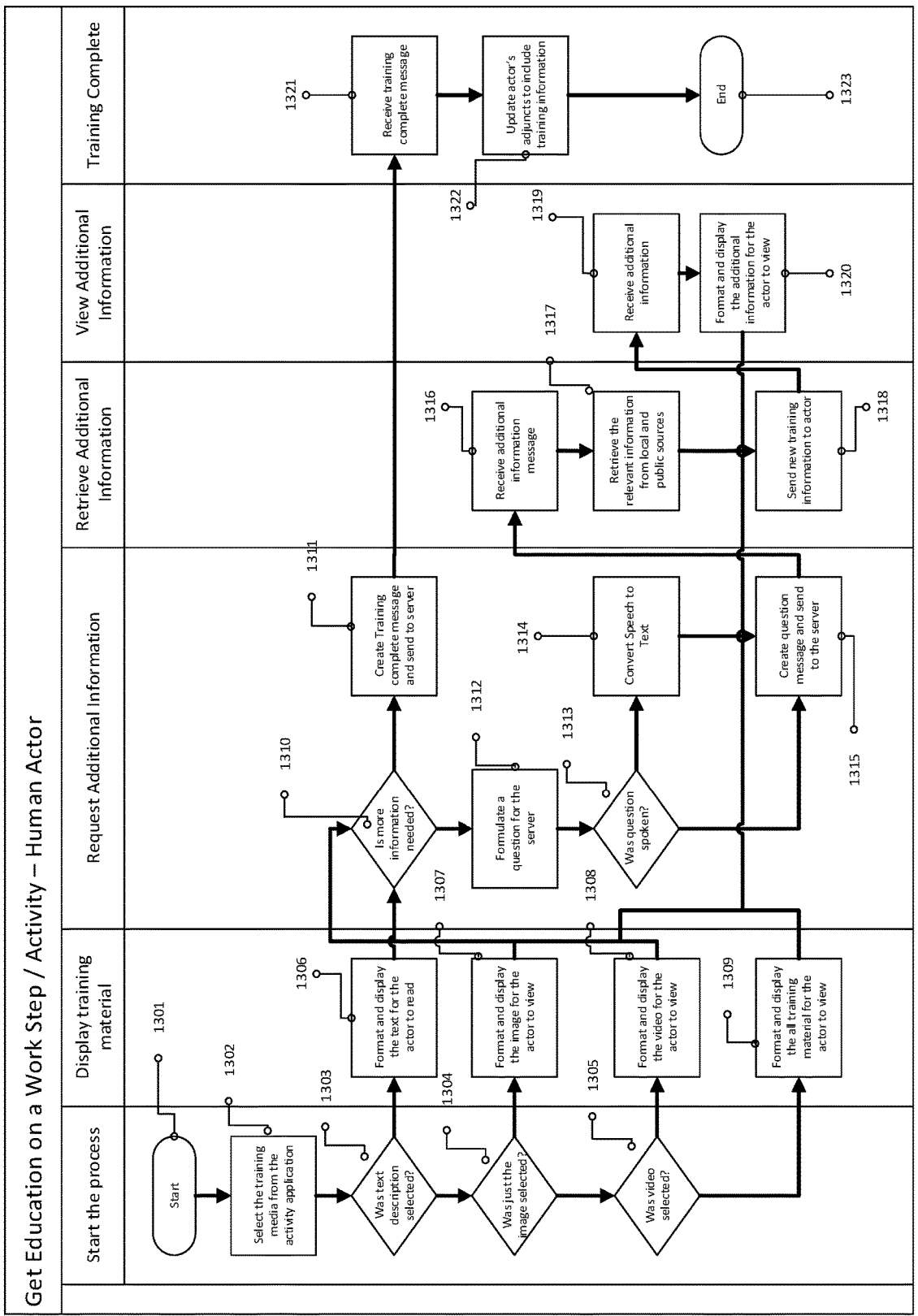

FIG. 13 shows how a person will invoke the various methods to view training material. The initial training material will be downloaded with the activity information. The process starts with the user selecting the type of training material (steps 1301-1305). The material is then formatted and displayed (steps 1306-1309). If the actor decides more information is required, they can formulate a question which will (steps 1306-1323):

Be converted to text if it was spoken.

Then need to be put through Retrieval software that will select from local and public sources to answer the question.

All material will be returned to the actor.

Once the training is complete, a message is sent to the server so that the actor's Adjuncts can be updated as they have now been trained.

Alternative Flow

No alternative flow is required.

Exception Flow

There are a number of situations to consider in the exception flows. The following list is not exhaustive but should reflect the major exceptions:

Fatal Programming Errors—Generate a message to the log and alert the support staff via email and/or text.

Missing Training Content—Generate a message and send it to the server to download the necessary information.

Post Conditions/Result

The actor will receive the information and then provide feedback on whether the information was helpful. Upon the successful completion of the training, a message is sent to server to update the actor's Adjuncts to include the Activity's training.

5. Send Feedback on Work Steps

Feedback will be used to determine whether the work steps for a particular Action need to be changed. A new set of work steps may result and the selection of the old or new will be left up to the Activity list software.

Actors:

Employee

Volunteer

Basic Flow

Figure 14:
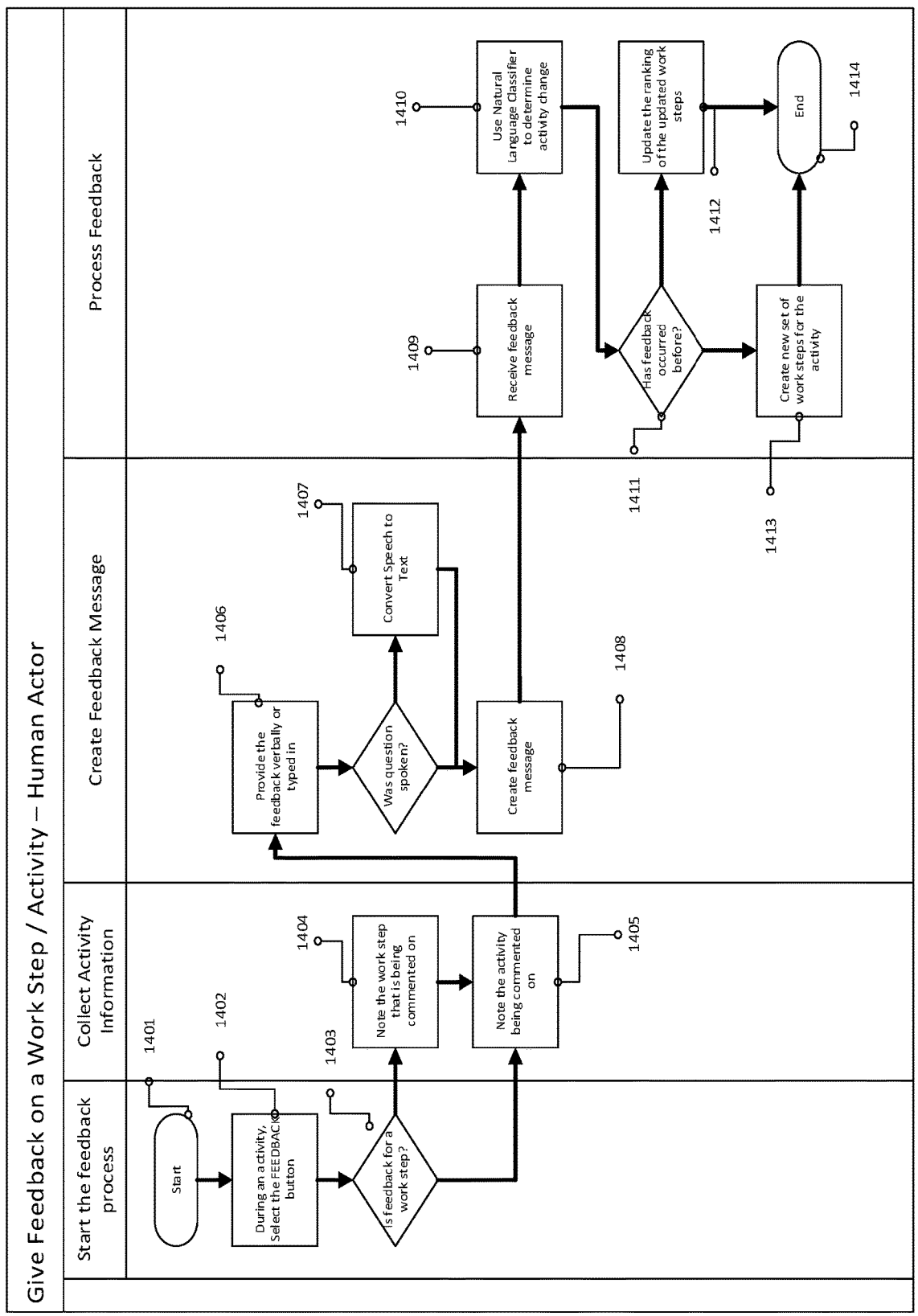

FIG. 14 shows a method a Character will invoke to provide feedback on an Activity. They will select the feedback button on any application (steps 1401-1403) and create a feedback message (steps 1404-1408). This message is then processed to determine the impact that it may have on activities, work steps or individuals (steps 1409-1414).

All Activity and work step information on which the feedback is based on should be collected to be passed on to the server.

If the feedback was spoken, use a Speech to Text tool to convert the spoken feedback to a statement.

The feedback statement is then processed to determine how the feedback will affect the work steps that were assigned to the actor.

Alternative Flow

No alternative flow is required.

Exception Flow

There are a number of situations to consider in the exception flows. The following list is not exhaustive but should reflect the major exceptions:

Fatal Programming Errors—Generate a message to the log and alert the support staff via email and/or text.

Database Errors—If the feedback or the work step changes do not get saved, the data is queued and then retried after the database becomes available.

Feedback Not Understandable—If the software could not decipher what the feedback was trying to indicate, a return message will be sent back to the Character to restate the feedback so that the system can properly act on it.

Post Conditions/Result

The Character will receive a thank-you acknowledgement for their comments. The system will maintain the work step changes and add them to the list of work steps available for an Action.

6. Update a Profile

All employees and volunteers will create a profile that defines the various Adjuncts that defines them. This will include:

Name
Address
Phone Number
Email Address
Permission to maintain a facial recognition model
List of Activity requirements (such as ServSafe Certification for working in the restaurant).

Actors:
Employee
Volunteer
Basic Flow

Figure 15:
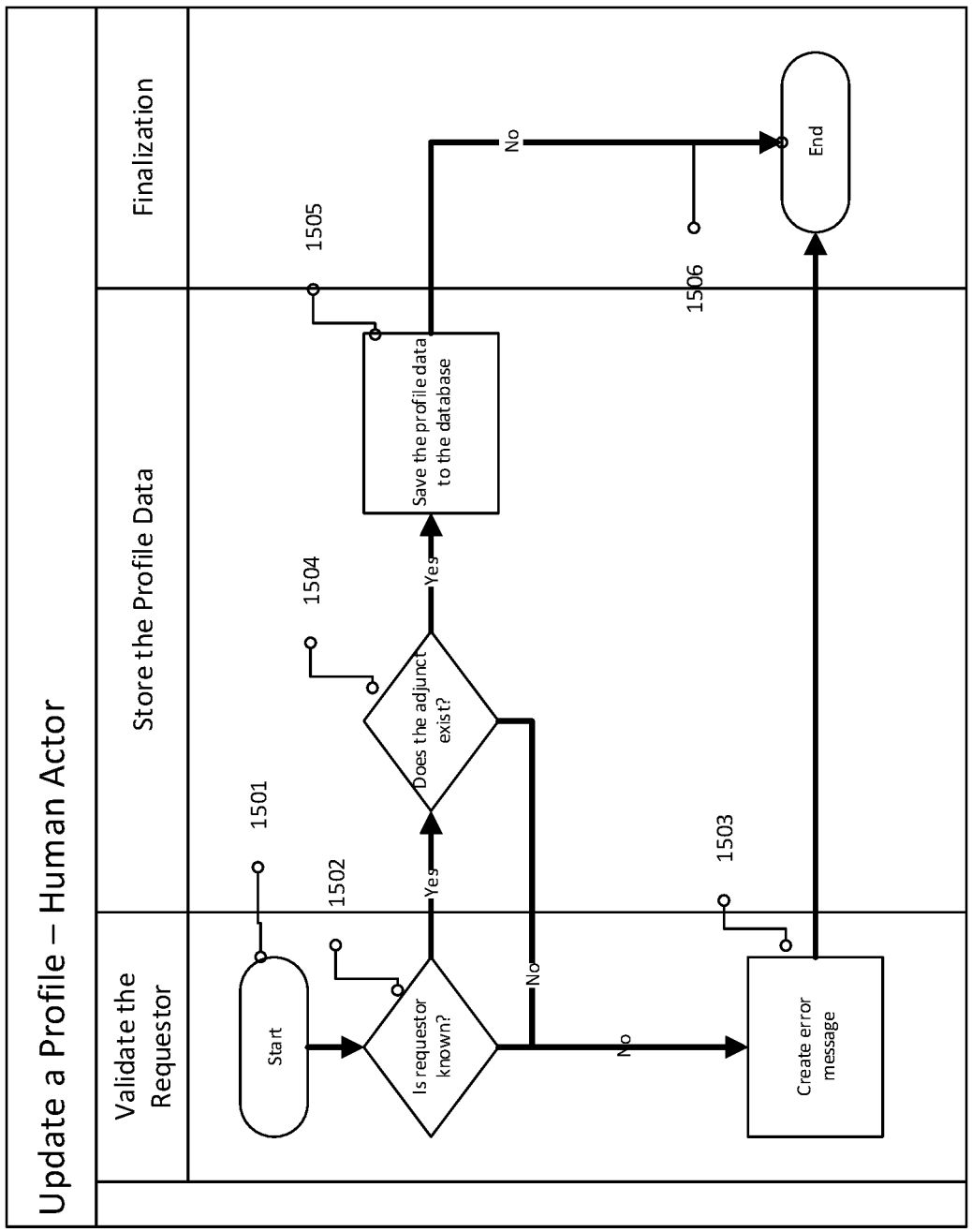

FIG. 15 shows how a Character will send an update to their profile. They would select an adjunct and update the reading for that adjunct (steps 1501-1506).

Alternative Flow

No alternative flow is required.

Exception Flow

There are a number of situations to consider in the exception flows. The following list is not exhaustive but should reflect the major exceptions:

Fatal Programming Errors—Generate a message to the log and alert the support staff via email and/or text.

Database Errors—If the reading does not get saved, the data is queued and then retried after the database becomes available.

Post Conditions/Result

The Character's Adjuncts will be updated and then used when assessing Activities to assign to them.

Information Kiosk and Visitor Interactions

The following use cases are related to a Kiosk System that will provide information, entertainment, and people/machine engagement. People will interact with the system via a keyboard, touchscreen, and/or through spoken conversation. The system will reply back through the Kiosk's screen or verbally through the attached speakers.

1. Greet Visitor

When a person arrives at the Kiosk, the system needs to greet the person with varying phrases. Greetings should vary depending on:

If the person is recognized.
If they are an employee or visitor.
Whether or not they interacted with another Kiosk before this one.
The person's approximate age.
Time of day.

The general idea is to engage the actor in a conversation.

Actors:
Employee
Volunteer
Visitor
Basic Flow

Figure 16:
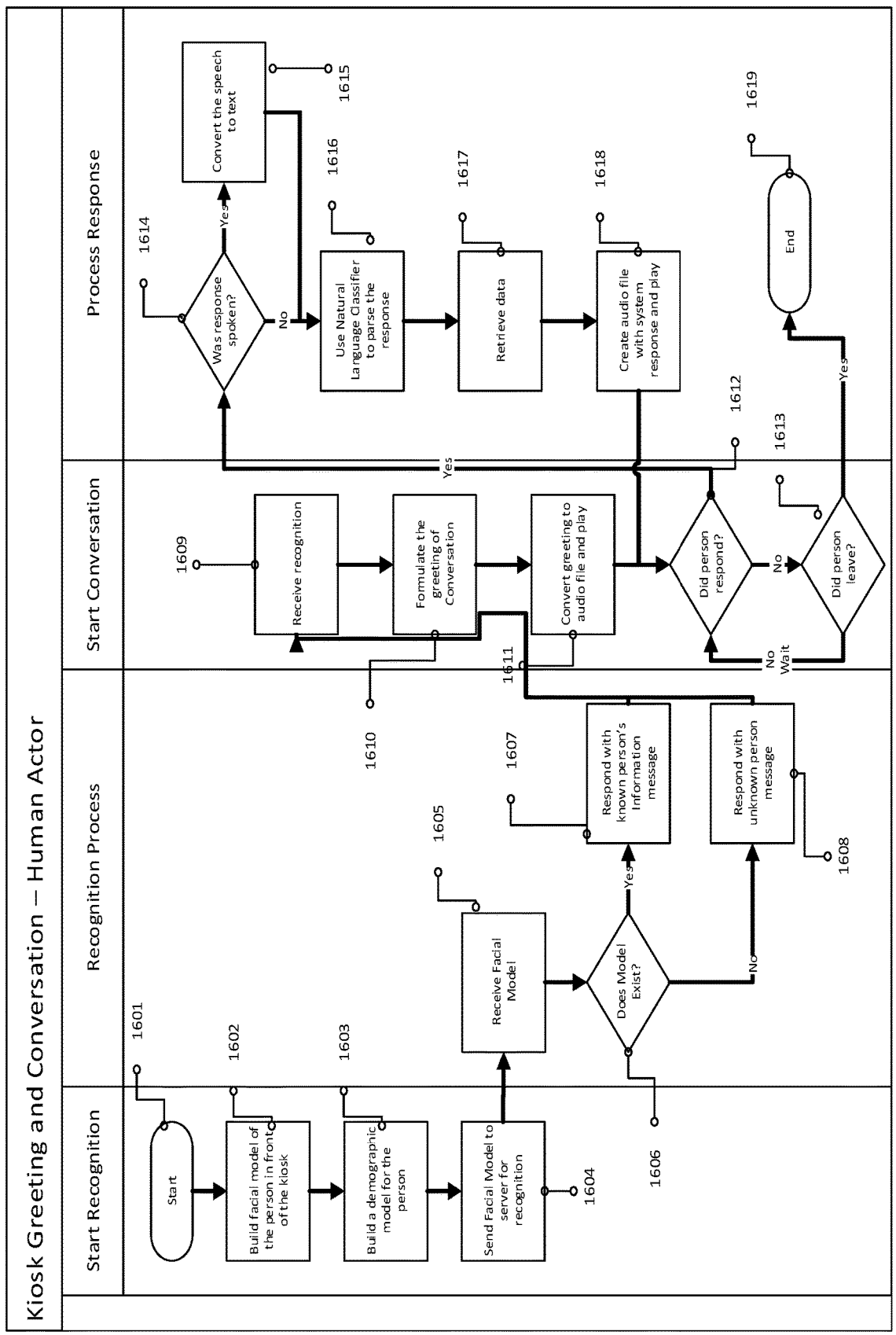

FIG. 16 shows the flow of information as a conversation is being started and then engaged. The engagement starts by creating a facial model of the person and determining if the system knows who it is (steps 1601-1610). If the person is known to the system (step 1607) a conversation is built passed on the past. If the conversation is new (step 1608), an initial conversation is sent to the kiosk. The system will need to wait for a response from the person, analyze the response, and then reply, turn-taking technique. The conversation is then converted to an audio file and then spoken back to the user (steps 1609-1613) The conversation is ended by a lull in the conversation or if the person leaves (steps 1614-1619).

The system will know if the person was at a Kiosk before this one.

Alternative Flow

No alternative flow is required.

Exception Flow

There are a number of situations to consider in the exception flows. The following list is not exhaustive but should reflect the major exceptions:

Fatal Programming Errors—Generate a message to the log and alert the support staff via email and/or text.

Response Not Understandable—If the software could not decipher what the response meant. A return message will be sent back to the actor to restate the response so that the system can continue the conversation.

Post Conditions/Result

The actor will enter into a conversation with the Kiosk Software whereby any information relevant to the actor's activities will be made available.

2. Ask a General Question

During the conversation between the actor and Kiosk, the actor may ask a question that is general in nature. For instance, how does photosynthesis work?

The system will need to be able to reach out to public sources to get the information from multiple sources and put together a consensus answer for the actor.

Actors:
Employee
Volunteer
Visitor
Basic Flow

Figure 17:
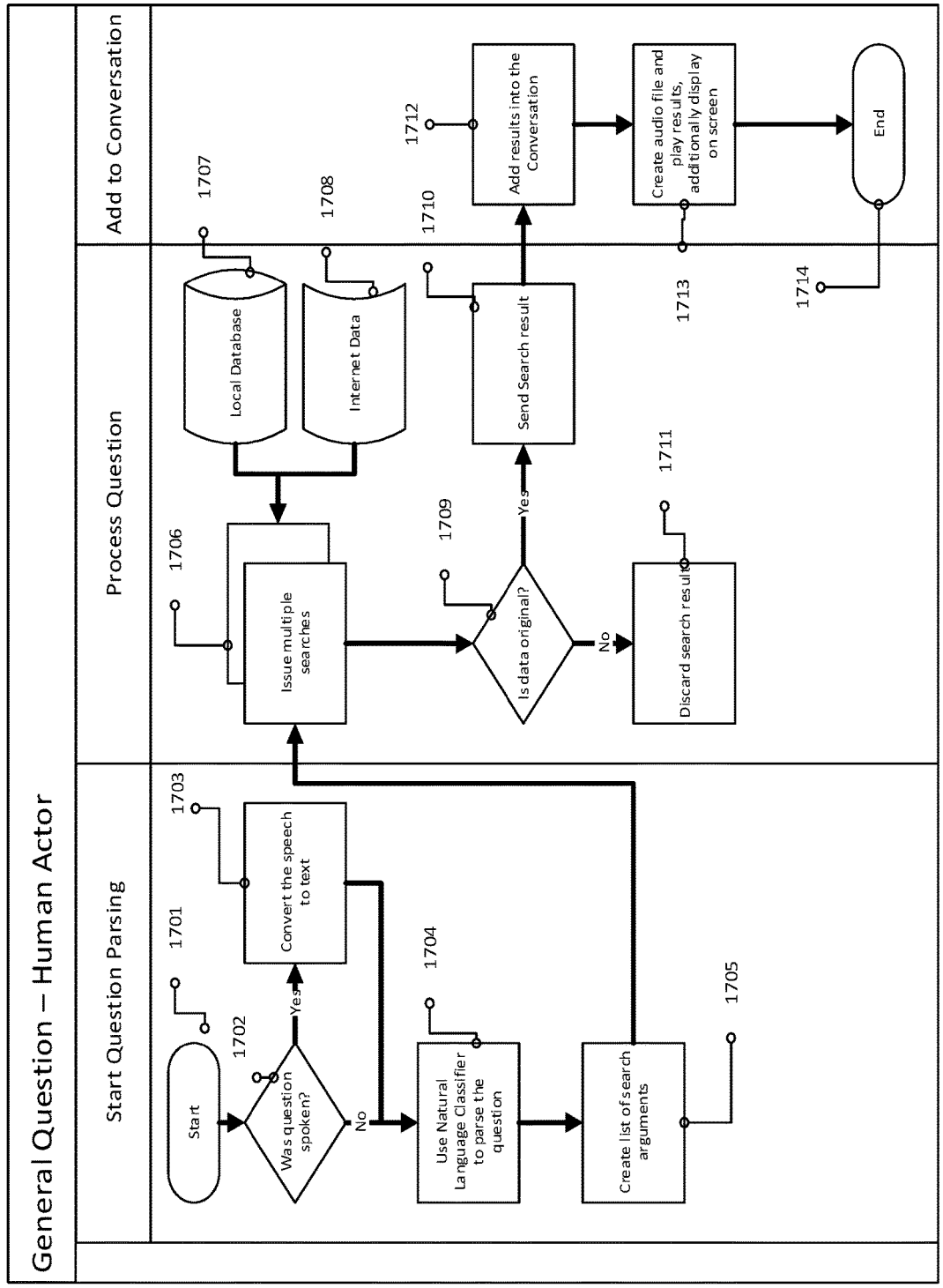
Figure 37A:
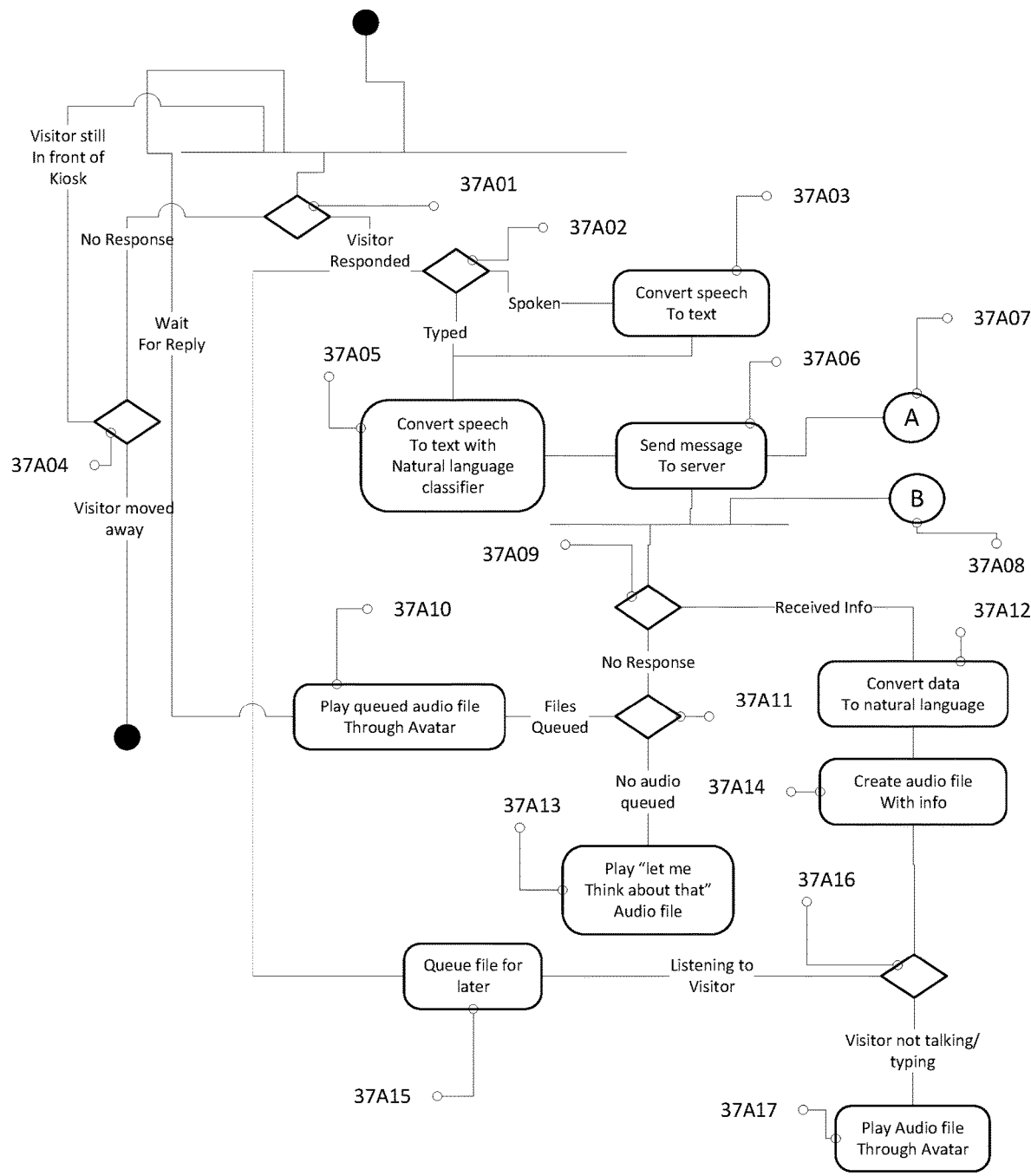
Figure 37B:
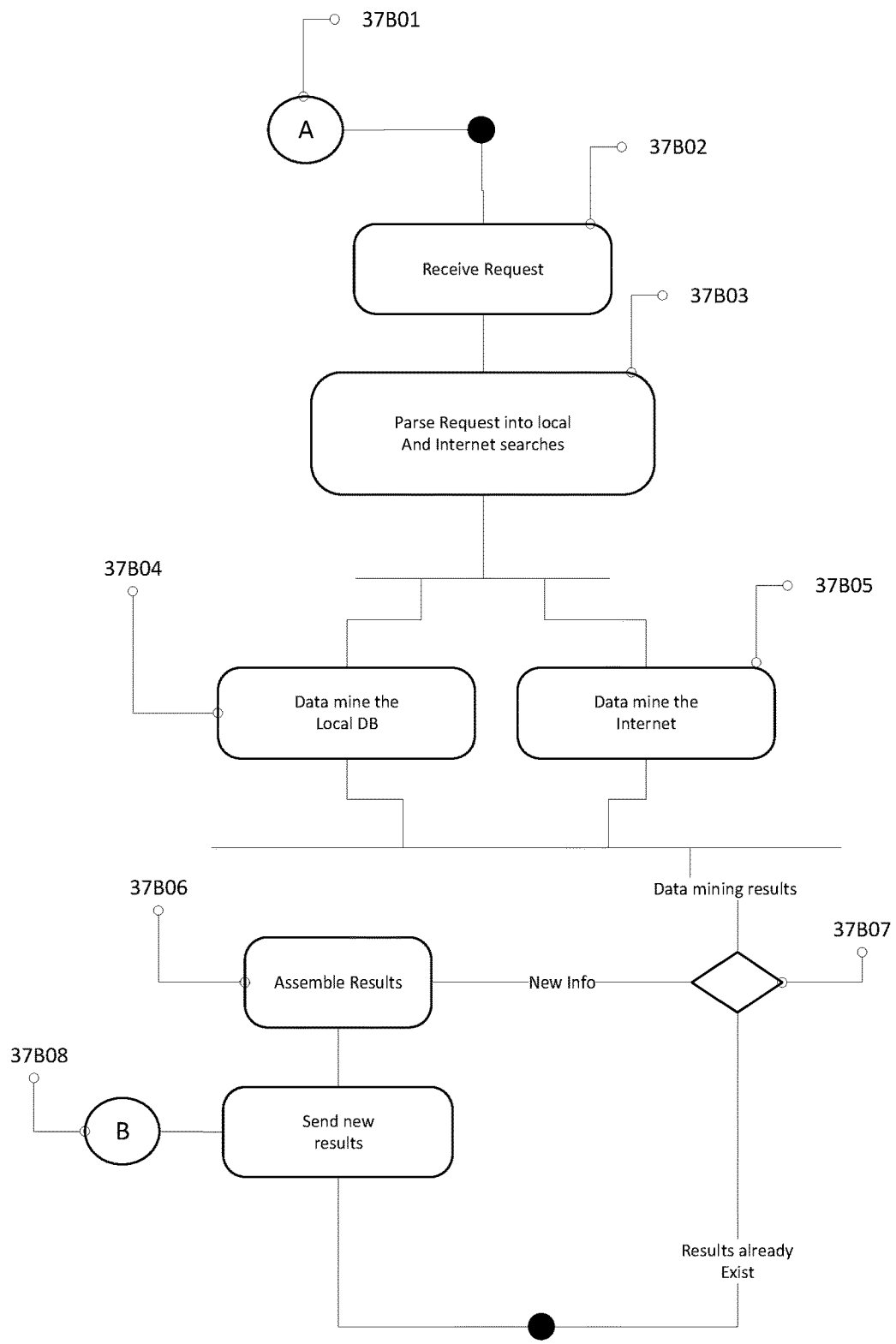

FIG. 17, FIG. 37A and FIG. 37B shows the process that will be used to gather information to satisfy general questions. Multiple searches will be created to find information on local databases as well as from Internet sources. The process starts by converting the spoken word to text (steps 1701-1705 and 37A01-37A05) to be used for searching. The system will then use data mining techniques to search (steps 1706-1711 and 37A06) the various databases. The results are then converted to audio files to be spoken back to the requestor (steps 1712-1714 and 37A10-37A17).

Returning results will be immediately returned to the Conversation software so that they can be presented as if the Kiosk software is answering.

Alternative Flow

No alternative flow is required.

Exception Flow

There are a number of situations to consider in the exception flows. The following list is not exhaustive but should reflect the major exceptions:

Fatal Programming Errors—Generate a message to the log and alert the support staff via email and/or text.

Internet Connection—If the connection is down, send a message to the Conversation software that data is coming. The request will be queued and resent when the connection is back.

Database Error—The request will be queued until the database comes back online.

Actor Leaves—If the actor leaves the Kiosk, all requests are cancelled and the conversation is terminated.

Post Conditions/Result

The actor will receive the response, which might be a combination of information from several sources. Should data from the local database and a public source come to the Kiosk at the same time, the local data will be presented first.

3. Ask a Question on a Specific Object

During the conversation between the actor and Kiosk, the actor may ask a question with a hand gesture or that is directed at a specific object in the business. For instance, what is that?

The system will need to query the local database to get all relevant information about the object. Additionally, general queries are made to augment the information.

Actors:
Employee
Volunteer
Visitor
Basic Flow

Figure 18:
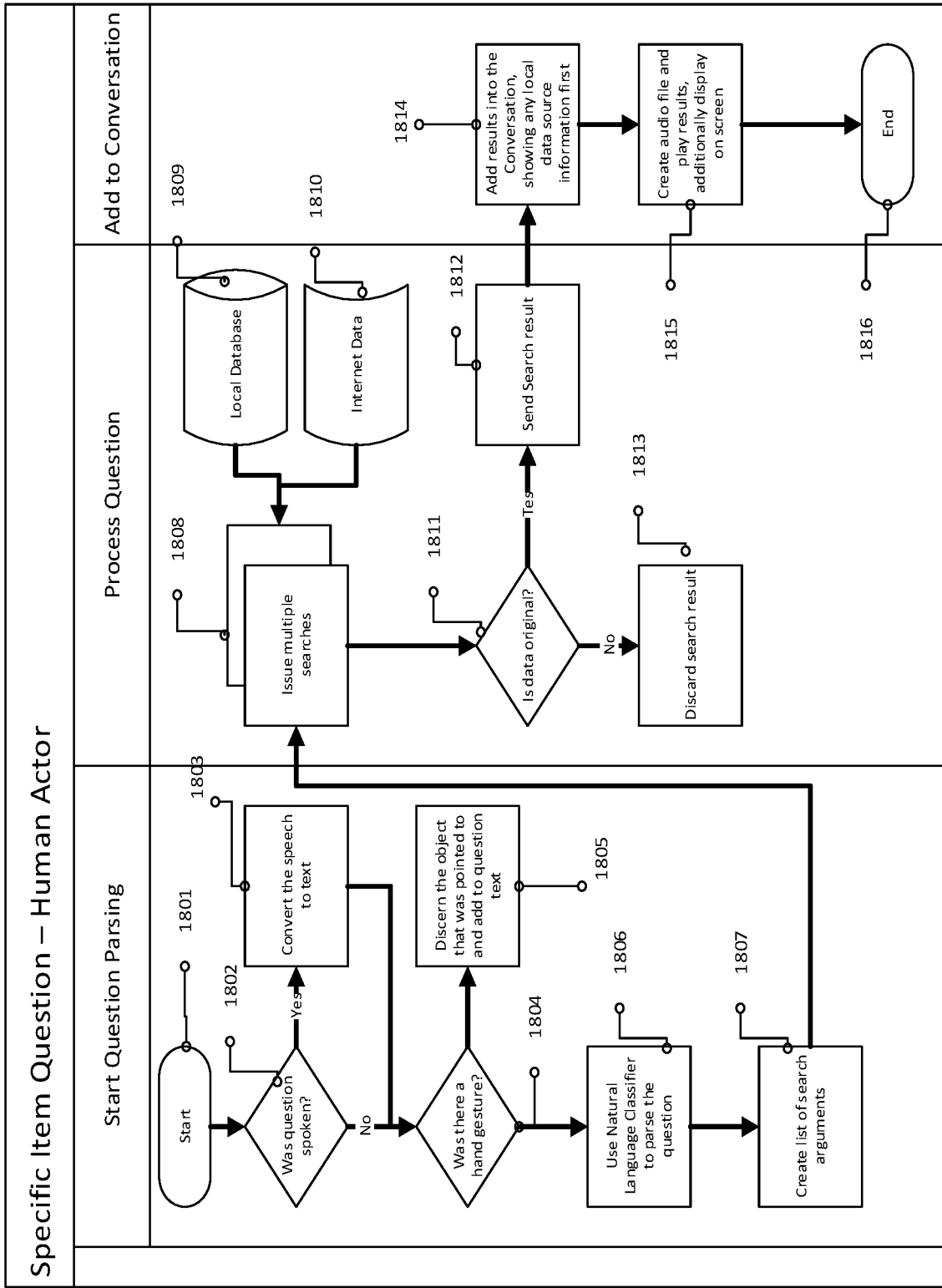

FIG. 18 shows the process that will be used to gather information to satisfy a question about a specific object. The process starts by converting the spoken word to text (steps 1801-1807) to be used for searching. The system will then use data mining techniques to search (steps 1808-1813) the various databases. The results are then converted to audio files to be spoken back to the requestor (steps 1814-1816).

Returning results will be immediately returned to the Conversation software so that they can be presented as coming from the Kiosk software. Data from local sources should be displayed first when multiple-source information comes in together.

Alternative Flow

No alternative flow is required.

Exception Flow

There are a number of situations to consider in the exception flows. The following list is not exhaustive but should reflect the major exceptions:

Fatal Programming Errors—Generate a message to the log and alert the support staff via email and/or text.

Internet Connection—If the connection is down, send a message to the Conversation software that data is coming. The request will be queued and resent when the connection is back.

Database Error—The request will be queued until the database comes back online.

Actor Leaves—If the actor leaves the Kiosk, all requests are cancelled and the conversation is terminated.

Post Conditions/Result

The actor will receive the information, which is a combination of information from several sources.

4. Play a Game

This use case involves showing the list games that the enterprise is providing for the public. The actor will:

1. Select a game.
2. Be presented with the rules.
3. Receive any equipment necessary to play the game.
4. Start the game.
5. Ask the Kiosk to keep score.
6. Allow "trash" talking by the Kiosk.

Actors:
Employee
Volunteer
Visitor
Basic Flow

Figure 19:
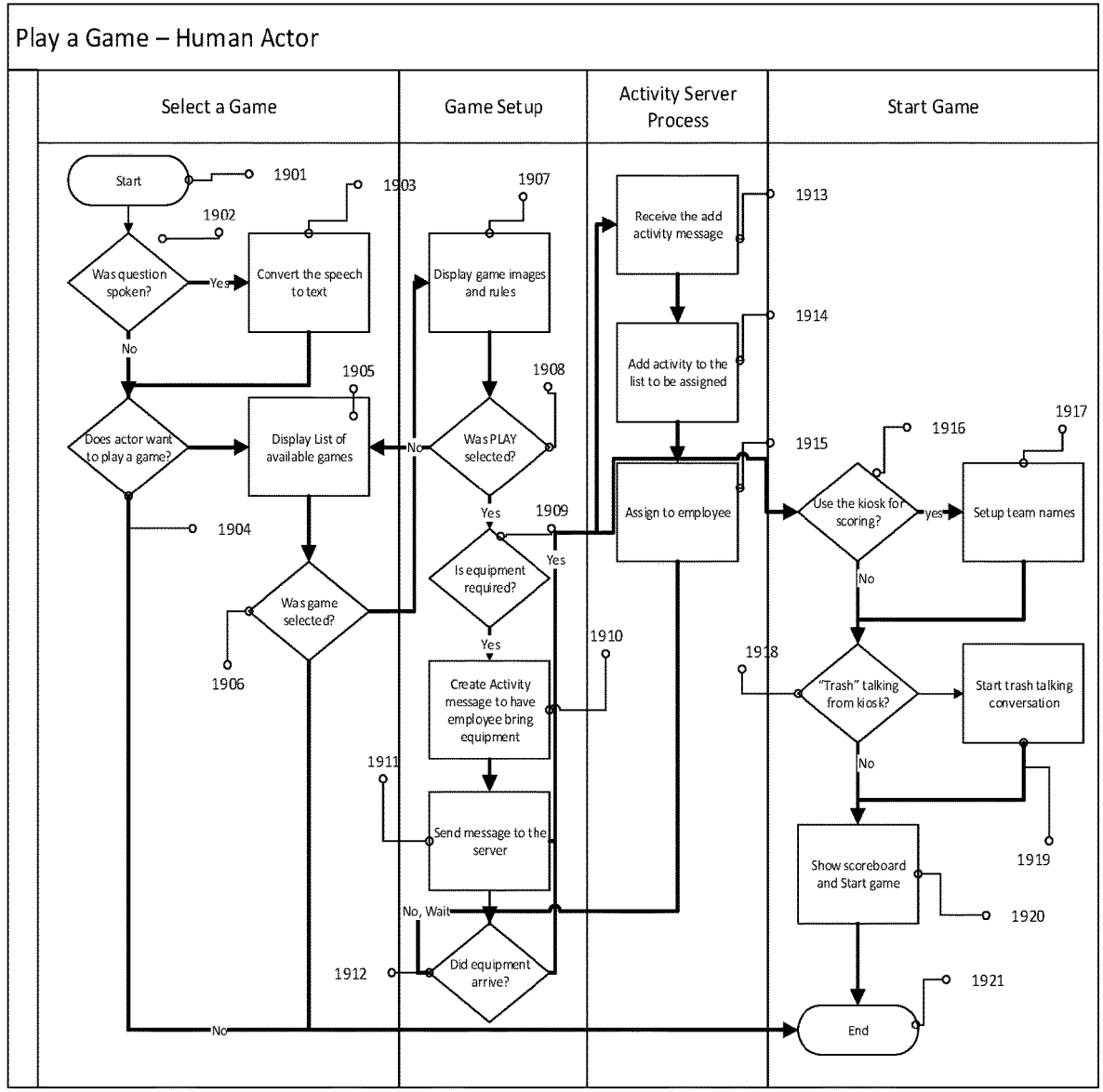

FIG. 19 shows how a person will select a game to play. Using a natural language processing, a request for a game (steps 1901-1906) is made and the information retrieved for the selected game. Information on the game is then displayed (steps 1907-1912). The person may then choose to use the kiosk for scoring and trash talking (steps 1916-1921).

Should a game be started and require equipment, an Action record to bring the visitor the required equipment will be added to the queue (steps 1913-1915) such that it can be immediately assigned to an employee.

Alternative Flow

No alternative flow is required.

Exception Flow

There are a number of situations to consider in the exception flows. The following list is not exhaustive but should reflect the major exceptions:

Fatal Programming Errors—Generate a message to the log and alert the support staff via email and/or text.

Equipment Unavailable—A message will be generated and sent to the actor that no equipment is available to please try later.

Network Failure—A message will be generated to please ask an employee for the required equipment.

Post Conditions/Result

The actor will receive the information on the selected game. If a game is started, the system will track the time, keep score and do some "trash" talking (if selected).

5. View Business Offerings

This use case revolves around the actor asking for information on a business serviced by the Kiosk. This will include advertisements, short descriptions, images, and videos. An example of this may be a menu from the restaurant.

Actors:
Employee
Volunteer
Visitor
Basic Flow

Figure 20:
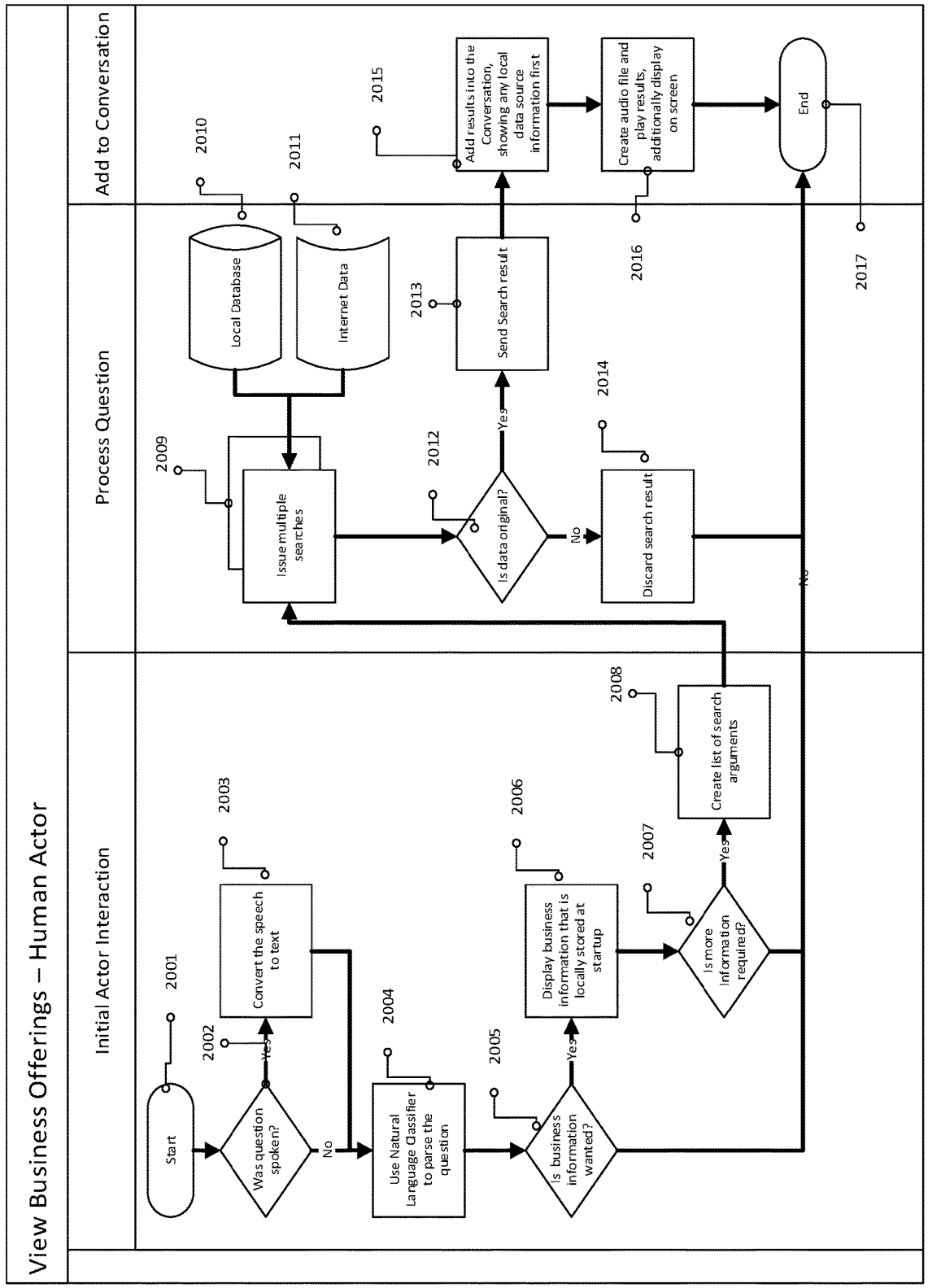

FIG. 20 shows when the actor will ask a question whose answer requires information about an associated business (steps 2001-2008). The information for the associated business will be pulled from the local database (steps 2009-2014) and sent to the Kiosk to be communicated (steps 2015-2017).

Alternative Flow

No alternative flow is required.

Exception Flow

There are a number of situations to consider in the exception flows. The following list is not exhaustive but should reflect the major exceptions:

Fatal Programming Errors—Generate a message to the log and alert the support staff via email and/or text.

Internet Connection—If the connection is down, send a message to the Conversation software that data is coming. The request will be queued and resent when the connection is back.

Database Error—The request will be queued until the database comes back online.

Actor Leaves—If the actor leaves, all requests are cancelled and the conversation is terminated.

Post Conditions/Result

The actor will receive the information on the business that was requested.

6. Generate Demographic Information

For each person who enters the facility, a set of demographic information will be generated that includes the age and number of actors.

Figure 21:
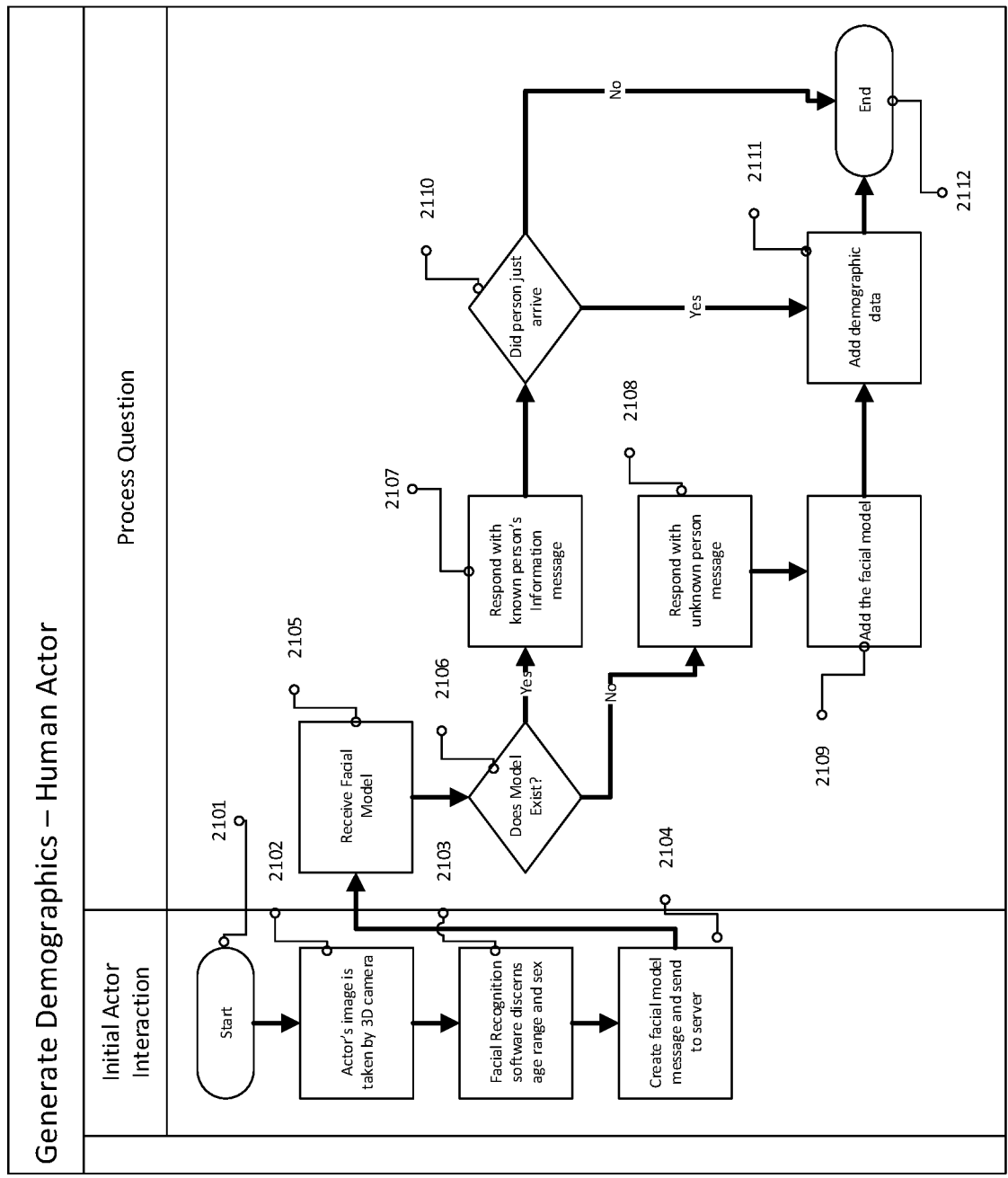

Actors:
Employee
Volunteer
Visitors
Basic Flow
FIG. 21 shows that the actor need only pass by a 3D camera when they first enter the facility. The camera's software will do a facial recognition model (steps 2101-2104) on the actor and determine the age range. This information will be pushed to the server and saved with the facial model for further analysis (steps 2105-2112).
Alternative Flow
No alternative flow is required.
Exception Flow
There are a number of situations to consider in the exception flows. The following list is not exhaustive but should reflect the major exceptions:
Fatal Programming Errors—Generate a message to the log and alert the support staff via email and/or text.
Database Error—The request will be queued until the database comes back online.
Post Conditions/Result
The running count and types of individuals in the park will be available for the digital sound system and any other reporting that might be necessary.

7. Inventory Management

Figure 22:
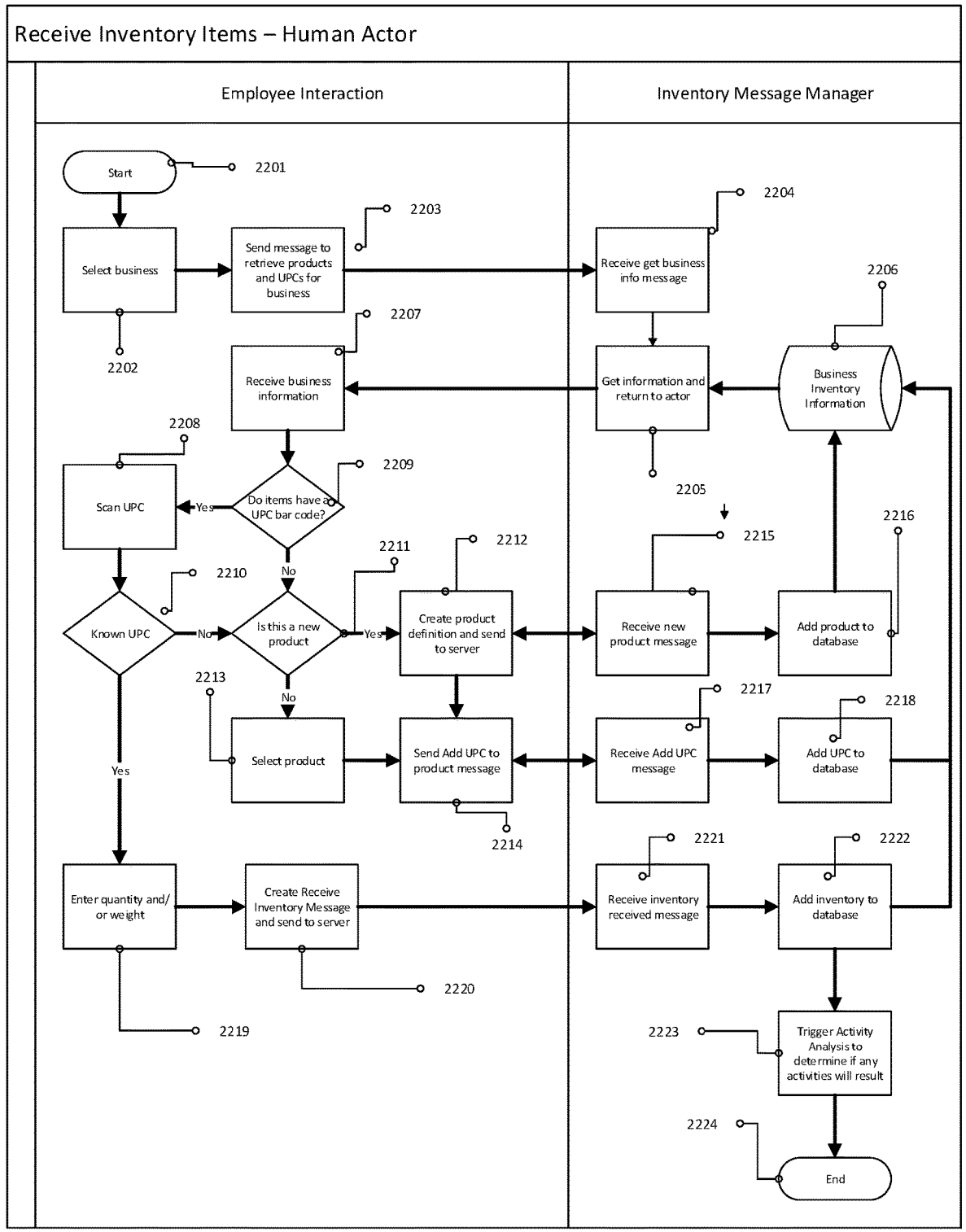

One of the ongoing Activities of this system is to manage all of the inventory items of all of the associated business operations. Some of the most important functions of Inventory Management:
Location of all items.
Quantity of all items.
Keeping track of expiring items and minimizing loss through spoilage.
Collection of data on new items.
Allocation of items to support business activities.
Receive Inventory
As inventory arrives, an employee will need to check it into the system so that it can be allocated for Actions and to support various associated businesses.
Actors:
Employee
Basic Flow
FIG. 22 shows that the Character will select a business for which the inventory item will be assigned (steps 2201-2207). The UPC might then be used to define the product and input the quantity, weight, and other relevant information (steps 2208-2220). If the item does not have a UPC, a barcode with an item-unique ID tag can be printed and affixed. The inventory data is added to the to the database and the activity analysis is then triggered (steps 2221-2224).
The data is then saved in the database and made available to the Activity assignment process.
Alternative Flow
No alternative flow is required.
Exception Flow
There are a number of situations to consider in the exception flows. The following list is not exhaustive but should reflect the major exceptions:
Fatal Programming Errors—Generate a message to the log and alert the support staff via email and/or text.
Database Error—The request will be queued until the database comes back online.
Network Connection Failure—If the network connection is down, the receiving data will be queued on the actor's machine and then uploaded when the network is restored.
Post Conditions/Result
The actor will receive a list of all of the items they processed in order to reconcile against the packing slip.

8. Expiring Inventory

Figure 23:
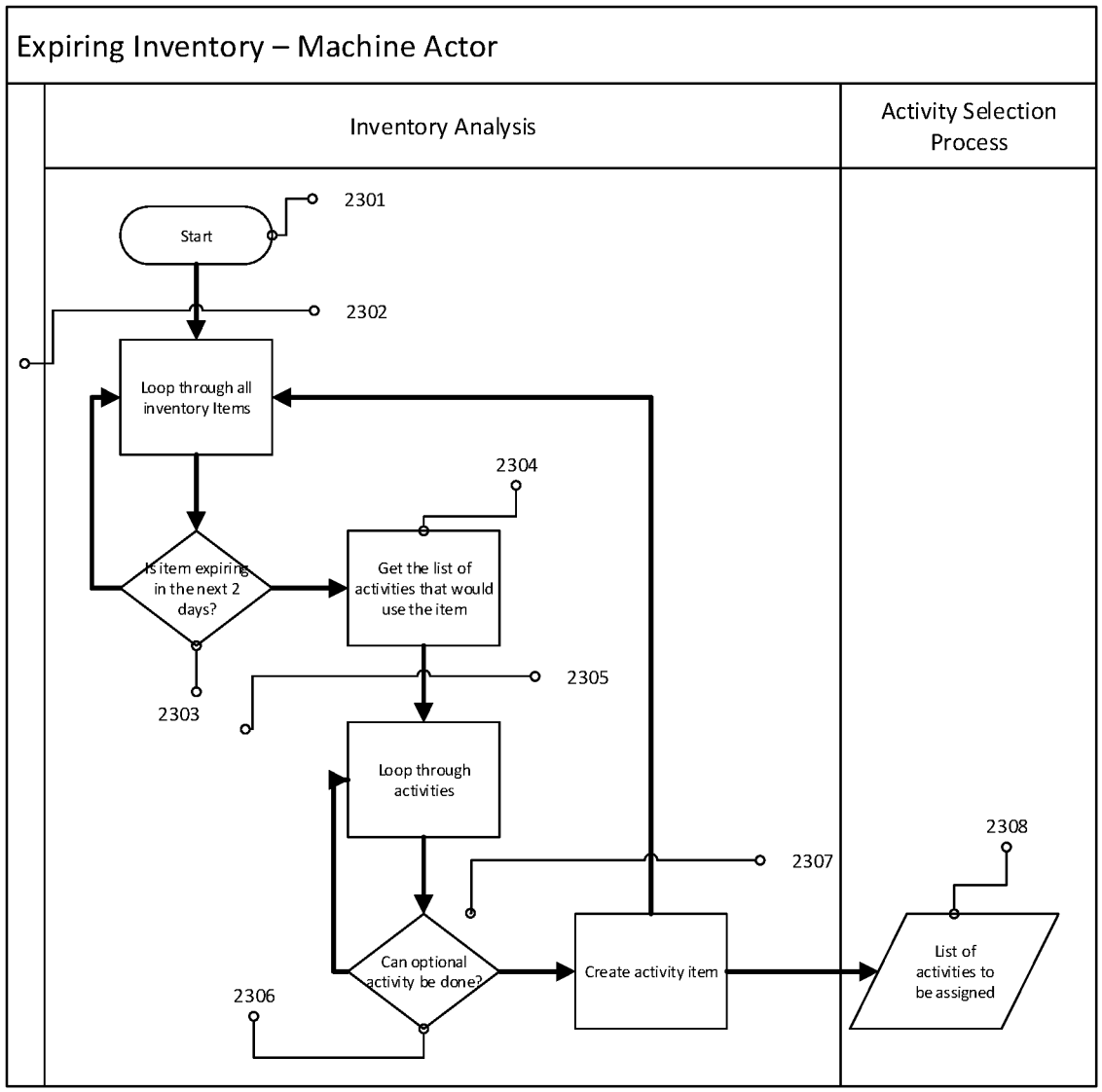

This use case is one in which a server process will be constantly looking through the list of unused inventory items to find items that are about to expire and then create Actions that will use them.
Actors:
Server Process
Basic Flow
FIG. 23 shows a loop through the list of current inventory items looking for items expiring in the next two days (steps 2301-2303). Those items are then used to determine if there are any optional Actions in which the expiring item will be consumed. These activities are then added to the Activity queue for assignment (steps 2304-2308).
Alternative Flow
No alternative flow is required.
Exception Flow
There are a number of situations to consider in the exception flows. The following list is not exhaustive but should reflect the major exceptions:
Fatal Programming Errors—Generate a message to the log and alert the support staff via email and/or text.
Database Error—The request will be queued until the database comes back online.
Post Conditions/Result
A set of Activities that were added to the queue for assignment
Sound System Management
The following use case is related to creation of the digital sound file that is used to change the music that is being played throughout the park.

1. Create Sound File

Figure 24:
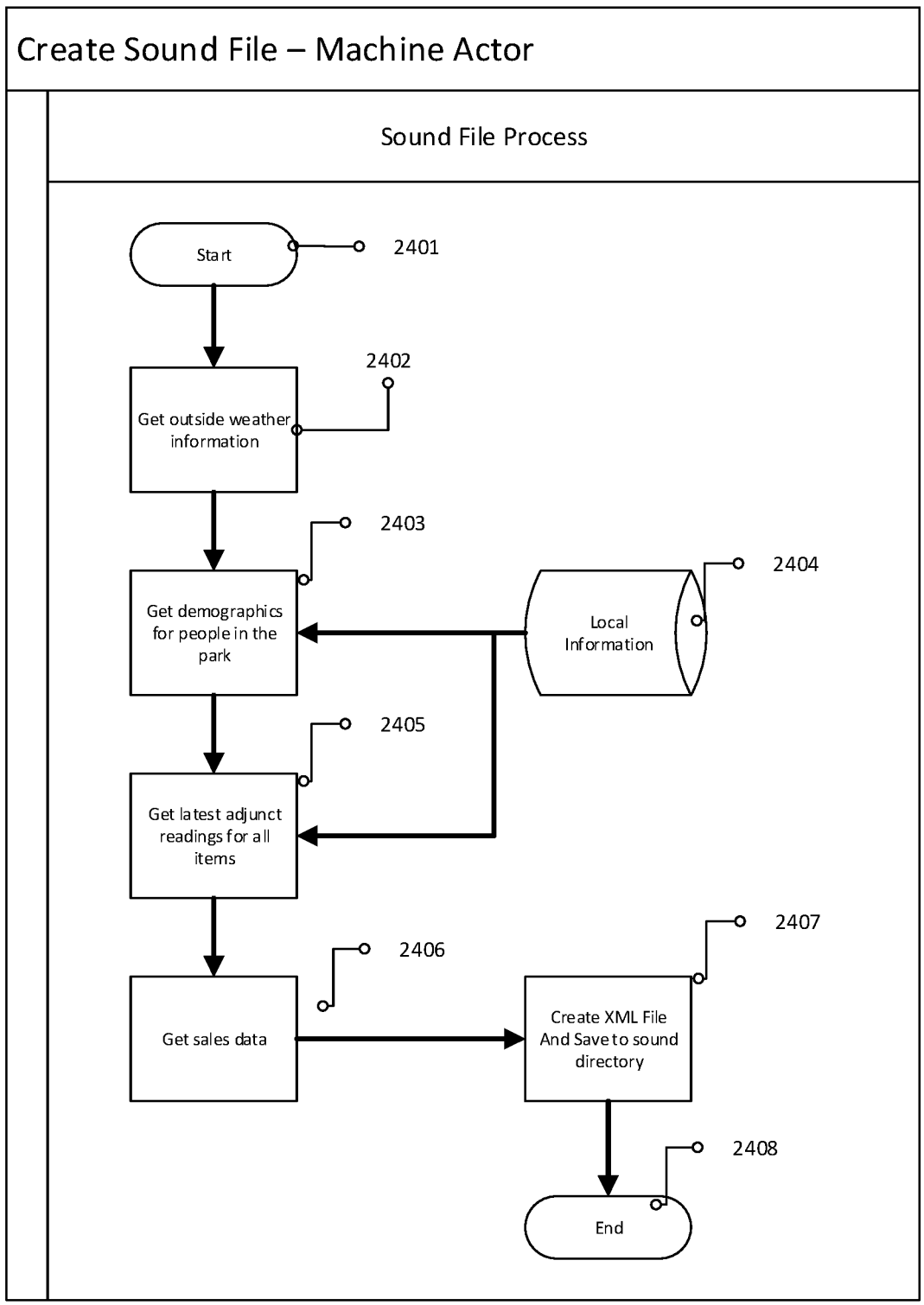

The file contains data from the following areas:
Outside weather conditions.
Demographic data for the people in the park.
Sensor data for the internal environment.
Adjunct readings for certain Proper Nouns in the park, such as reservoirs and thermostats.
Sales receipts.
Actors:
Server Process
Basic Flow
FIG. 24 shows that the program will run every 10 minutes and present the digital sound system with an XML file that contains all of the latest information for the park. The program gathers the weather data (step 2402), park demographics (step 2403), adjunct readings (step 2405), and sales information (step 2406). The data is then assembled into an XML file for input to the sound system (step 2407).
Alternative Flow
No alternative flow is required.
Exception Flow
There are a number of situations to consider in the exception flows. The following list is not exhaustive but should reflect the major exceptions:
Fatal Programming Errors—Generate a message to the log and alert the support staff via email and/or text.
Database Error—The process is halted and will try again in 10 minutes.
Internet Connection—If the connection is down, the file will use the last information that was received.
Post Conditions/Result
The process results in an XML file that will be used as an input to the digital sound system.

Corporate Event Management

The following use cases are related to management of corporate and other events that will be scheduled for the park.

1. Booking an Event

This use case revolves around the inputting of the necessary information to reserve the park and all of the necessary accoutrements.

Actors:
Employee
Corporate Planner
Basic Flow

Figure 25:
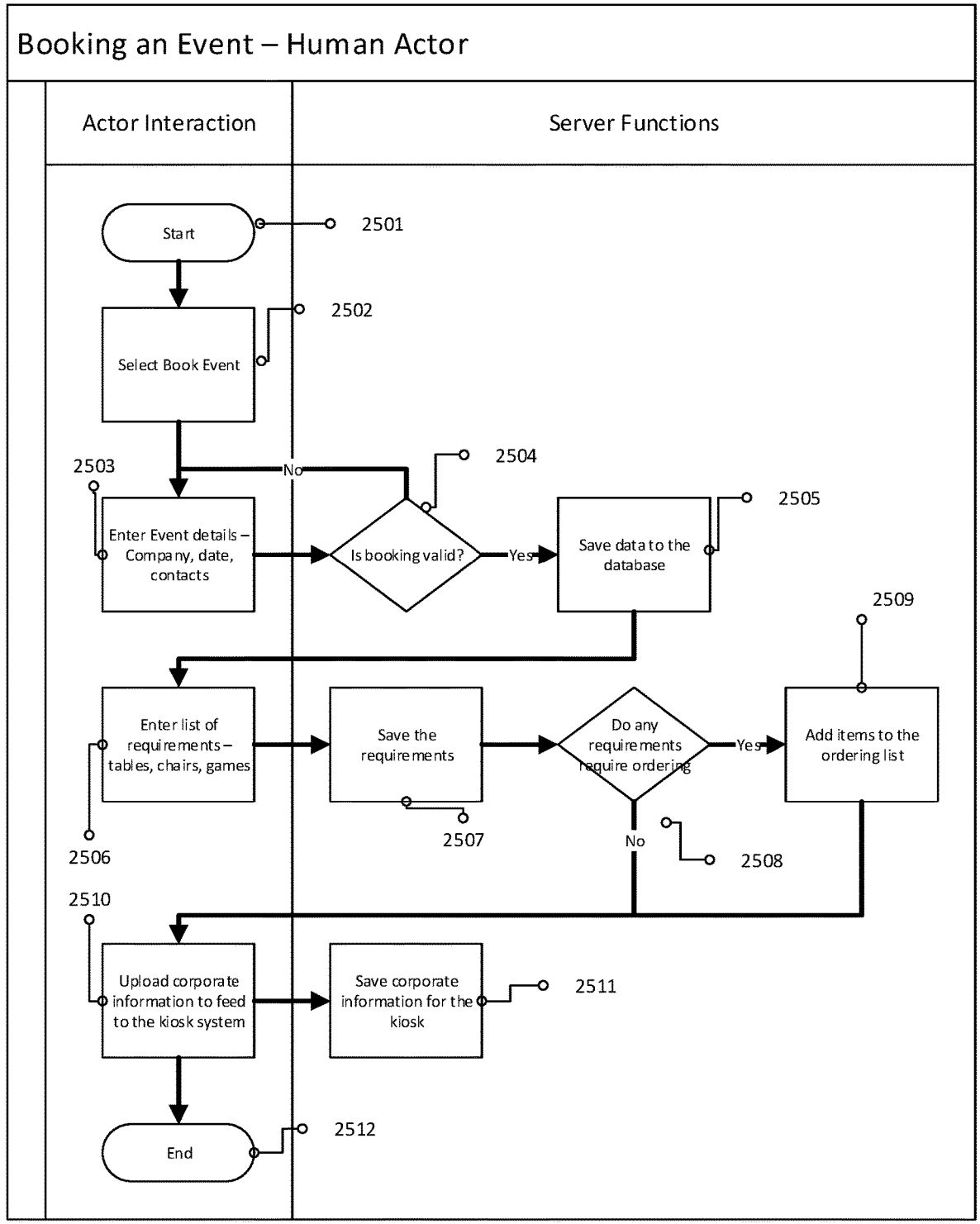

FIG. 25 shows that the actor will input the necessary data in order to book the event (steps 2501-2505). The data will be validated to assure that the date and the necessary supplies are available or can be purchased (steps 2506-2512).

Alternative Flow

No alternative flow is required.

Exception Flow

There are a number of situations to consider in the exception flows. The following list is not exhaustive but should reflect the major exceptions:

Fatal Programming Errors—Generate a message to the log and alert the support staff via email and/or text.

Database Error—If the failure happens after the event date is saved, the data will be queued until the database comes back on line. If the failure happens before, the actors will receive a message that no bookings can be received at this time.

Post Conditions/Result

The actor will receive a message to the screen that the booking has been accepted. Additionally, the actor will be able to create a PDF of the itinerary and all of the supplies necessary.

2. Event Sign-In

When an event has begun, attendees of the event will be asked to sign-in on Kiosk System. The information on the attendee will be then be sent to all Kiosks such that they may carry on conversations.

Actors:
Attendee
Basic Flow

Figure 26:
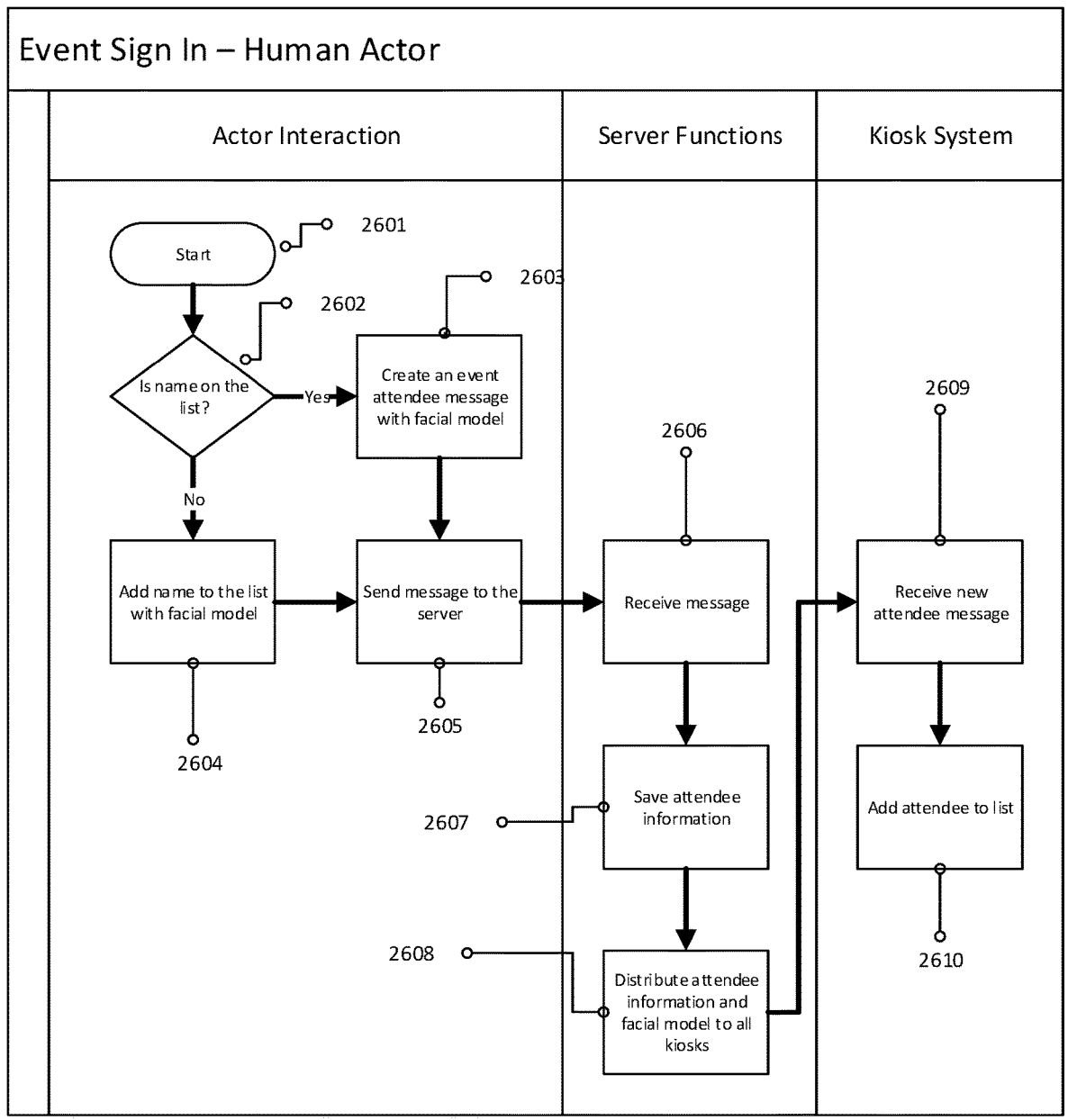

FIG. 26 shows that the attendee will go to any Kiosk and either select their name from the list provided by the host or add their name, then enter other pertinent information (steps 2601-2605). This information is then matched with the person's facial model so that they can be recognized at any other Kiosk (steps 2606-2610).

Alternative Flow

No alternative flow is required.

Exception Flow

There are a number of situations to consider in the exception flows. The following list is not exhaustive but should reflect the major exceptions:

Fatal Programming Errors—Generate a message to the log and alert the support staff via email and/or text.

Network Connection Failure—If the network connection is down, the receiving data will be queued on the Kiosk and then uploaded when the network is restored.

Post Conditions/Result

The actor will receive a greeting and the itinerary for the day.

General Management

There are several functions that will be used across applications and businesses. These functions revolve around safety and feedback.

Should something happen that creates a safety situation, anyone should be able to report the incident. The server will need to interpret the incident description, decide what activity needs to be created and then assign the activity to the closest qualified employee to remedy.

Feedback is similar in that the system needs to interpret the text, determine the activities that may be impacted by the feedback, create an alternate work step process to match the feedback and assign a use priority.

1. Incident Reporting

This use case involves the process for reporting an incident and the actions that will take place afterward.

Actors:
Employee
Volunteer
Visitor
Server Process
Basic Flow

Figure 27:
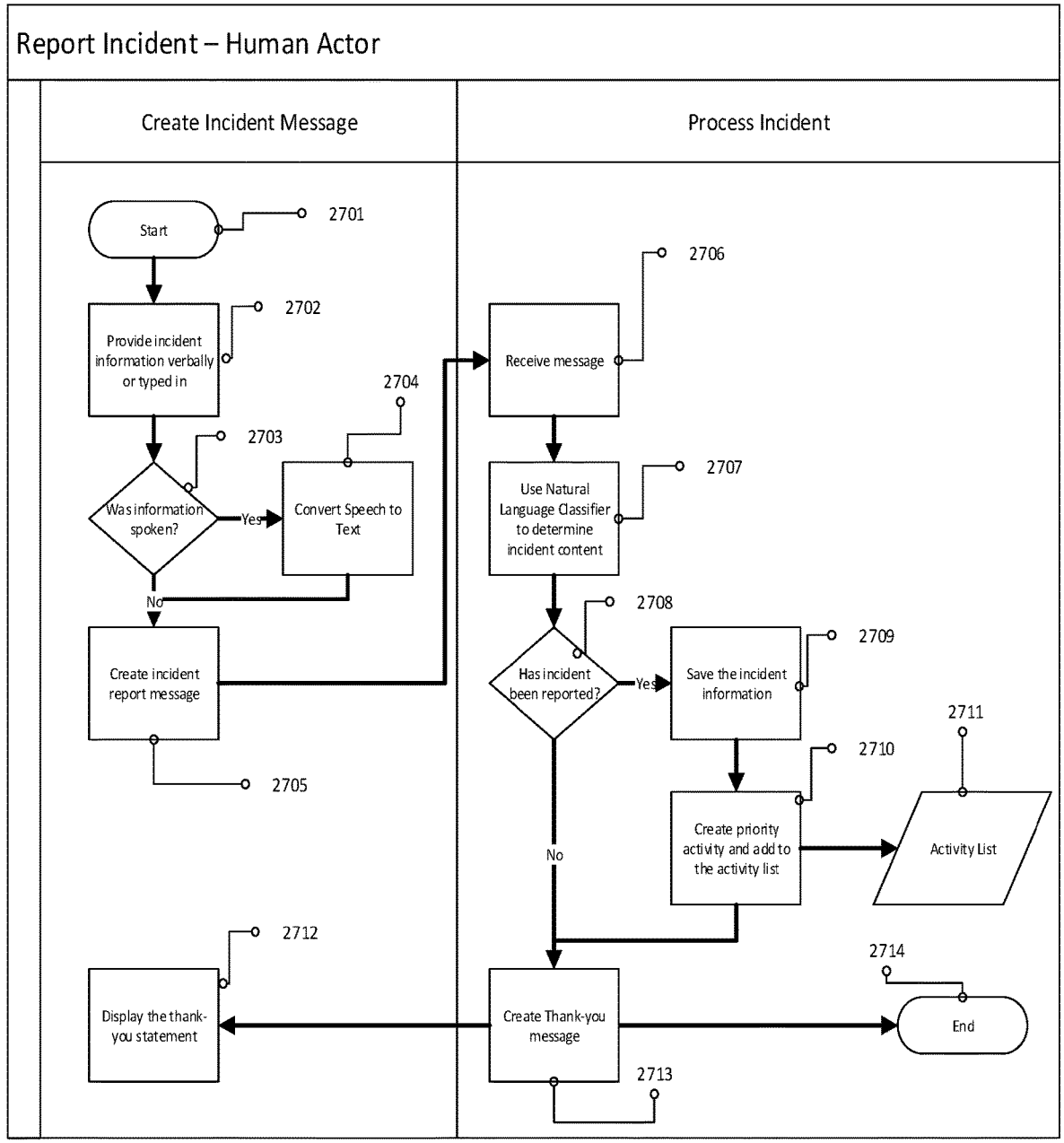

FIG. 27 shows that applications within the park will be equipped to display an INCIDENT button whereby anyone can report an incident by typing in or speaking a description of the incident (steps 2701-2705). The server will then need to determine what activities should be generated to deal with the incident (steps 2706-2714).

Alternative Flow

Figure 28:
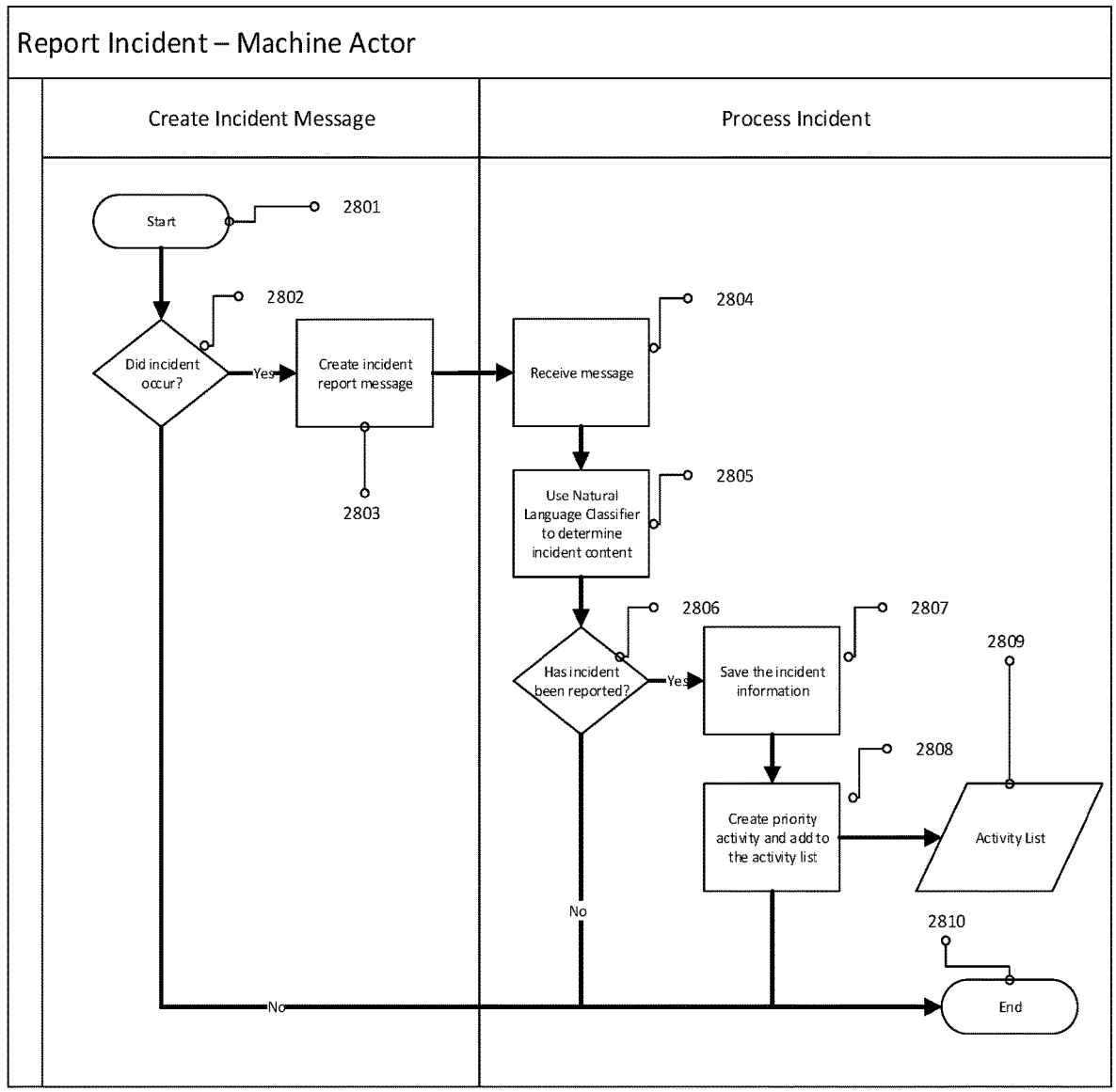

FIG. 28 shows that in automated systems that include sensors and other environmental information will also be contribute to the incidents should any of them detect a measurement outside the norms (steps 2801-2803). The server will then need to determine what activities should be generated to deal with the incident (steps 2804-2810).

Exception Flow

There are a number of situations to consider in the exception flows. The following list is not exhaustive but should reflect the major exceptions:

Fatal Programming Errors—Generate a message to the log and alert the support staff via email and/or text.

Database Error—The incident will be queued until the database comes back online. The activities will be generated and added to the queue.

Network Connection Failure—If the network connection is down, the actor will receive a message on the screen to seek out an employee.

Post Conditions/Result

The actor will receive a crafted thank you from the application.

2. Provide Feedback

One of the keys to adjusting the system is to use the feedback from anyone in the park. The system will need to determine what the feedback is relevant to and then add an activity to assess the feedback or to just update some activities.

Actors:
Employee
Volunteer
Visitor
Basic Flow

Figure 29:
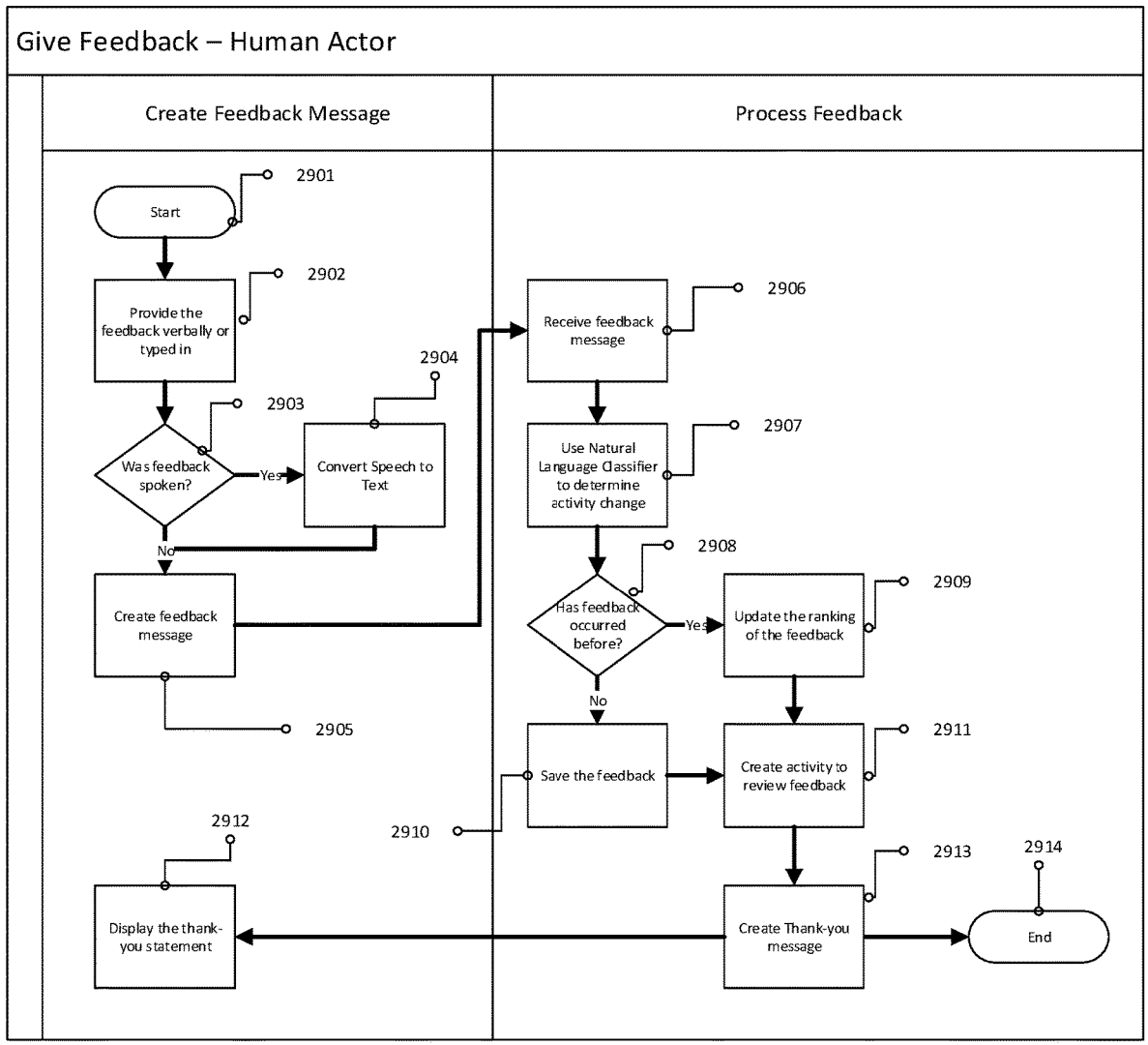
Figure 38:
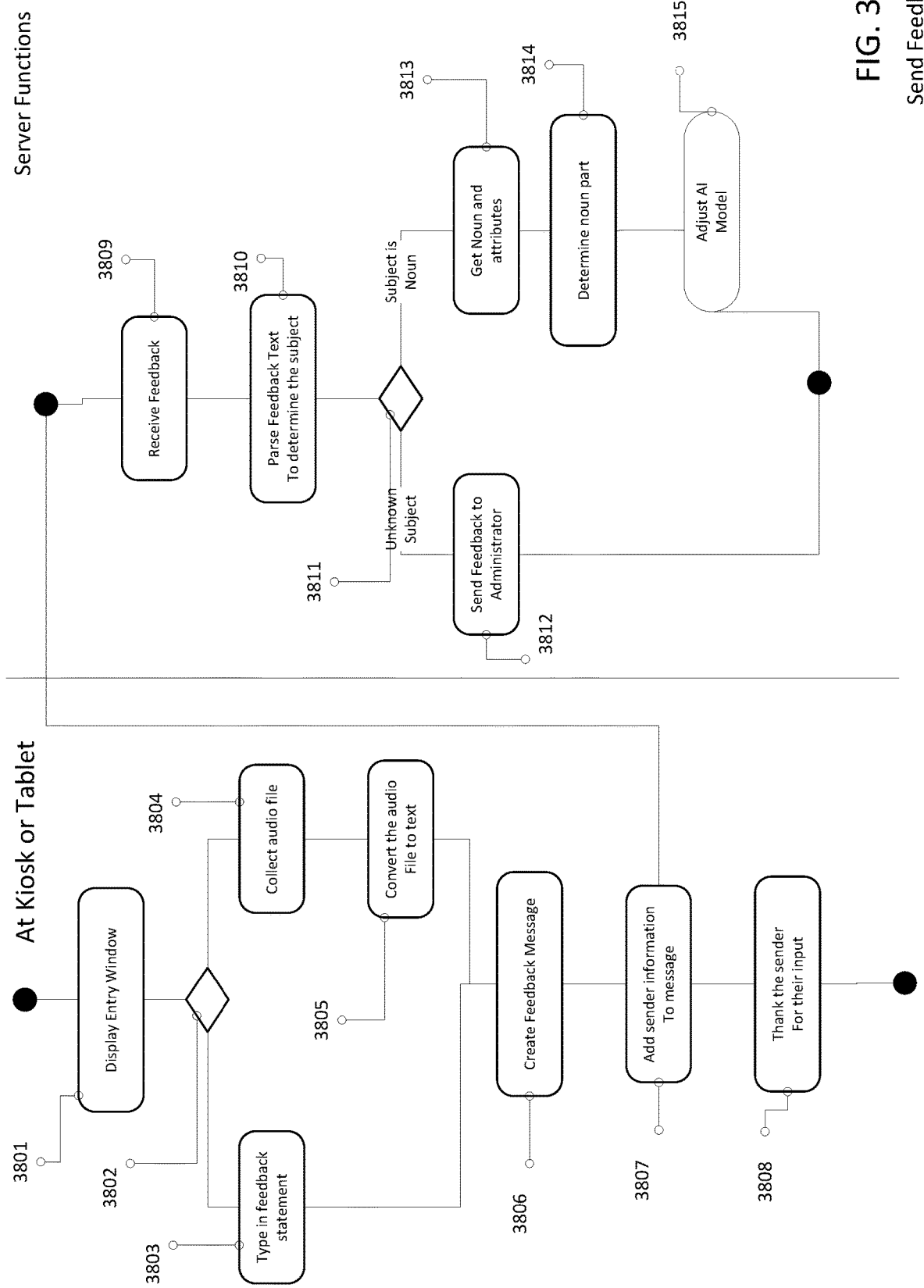

FIG. 29 (Use Case Diagram) and FIG. 38 (Activity Diagram) represent the application within the park that will be equipped to display a FEEDBACK button whereby anyone can provide feedback by typing in or speaking the comment (steps 2901-2905 and 3801-3808). The server will then need to analyze the feedback and create activities to address the feedback (steps 2906-2914 and 3809-3815).

Alternative Flow

No alternative flow is required.

Exception Flow

There are a number of situations to consider in the exception flows. The following list is not exhaustive but should reflect the major exceptions:

Fatal Programming Errors—Generate a message to the log and alert the support staff via email and/or text.

Database Error—The feedback will be queued until the database comes back online. The activities will be generated and added to the queue.

Network Connection Failure—If the network connection is down, the feedback will be saved and sent to the server when the network is restored.

Post Conditions/Result

The actor will receive a crafted thank you from the application.

FIGS. 30-37 include activity diagrams for a kiosk conversation, similar to the use cases, but showing how different use cases might affect one another, and with integrated diagrams and/or detailed descriptions thereof.

Figure 30:
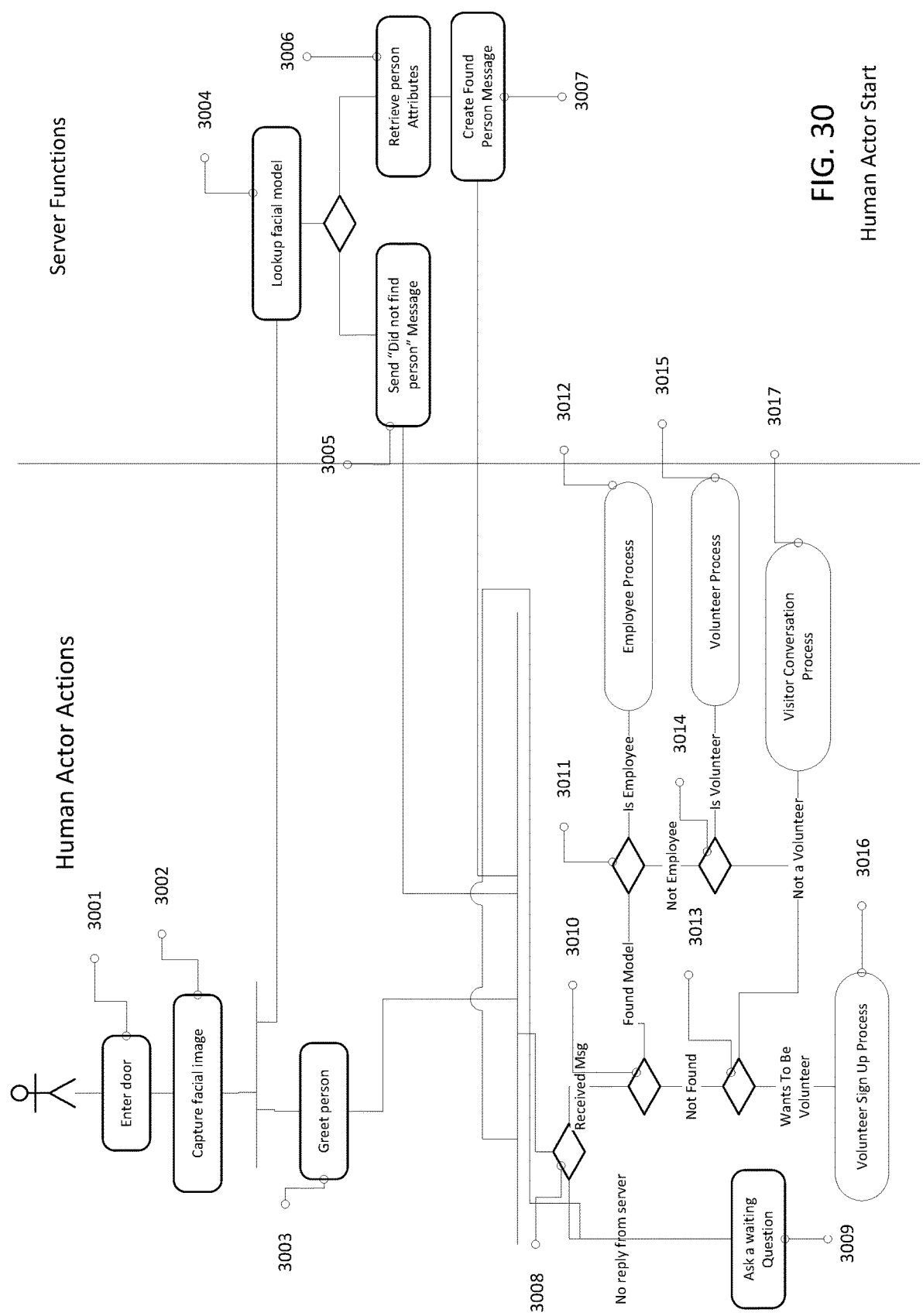
FIGS. 30-38 are illustrative Activity Diagrams for the cloud-based system and method to track and manage objects.

FIG. 30 depicts the activity that occurs when a person walks into the park and approaches the kiosk (steps 3001-3003). Server functions are then invoked to determine if the person is known to the system (steps 3004-3007). The kiosk will then need to determine the conversation that will occur (steps 3008-3017) and display it.

Figure 31:
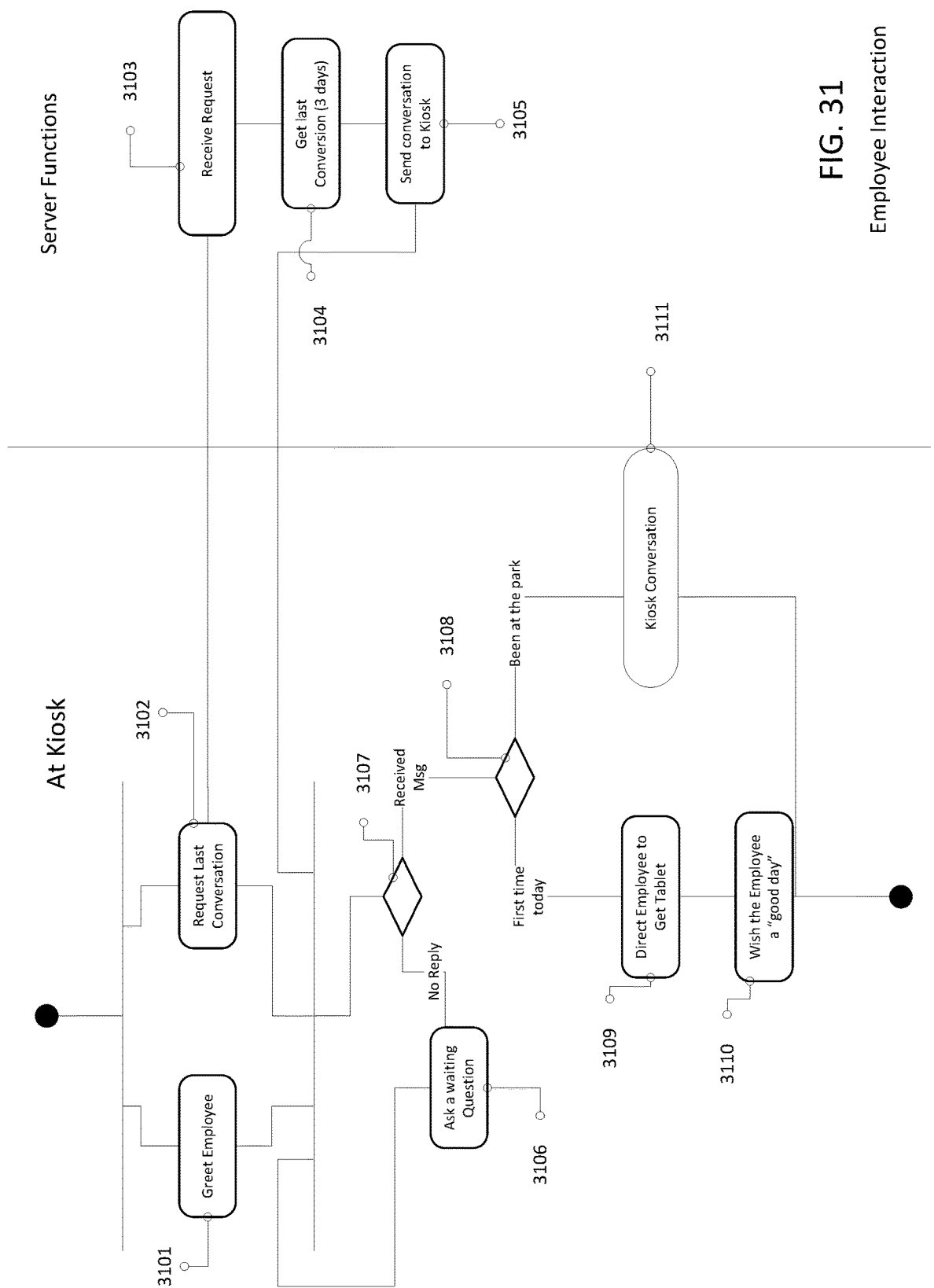

FIG. 31 represents the activity that occurs when an employee is recognized via facial recognition (steps 3101-3102). The server will then put together a conversation (steps 3103-3105) to be spoken back through the kiosk (steps 3106-3111).

Figure 32:
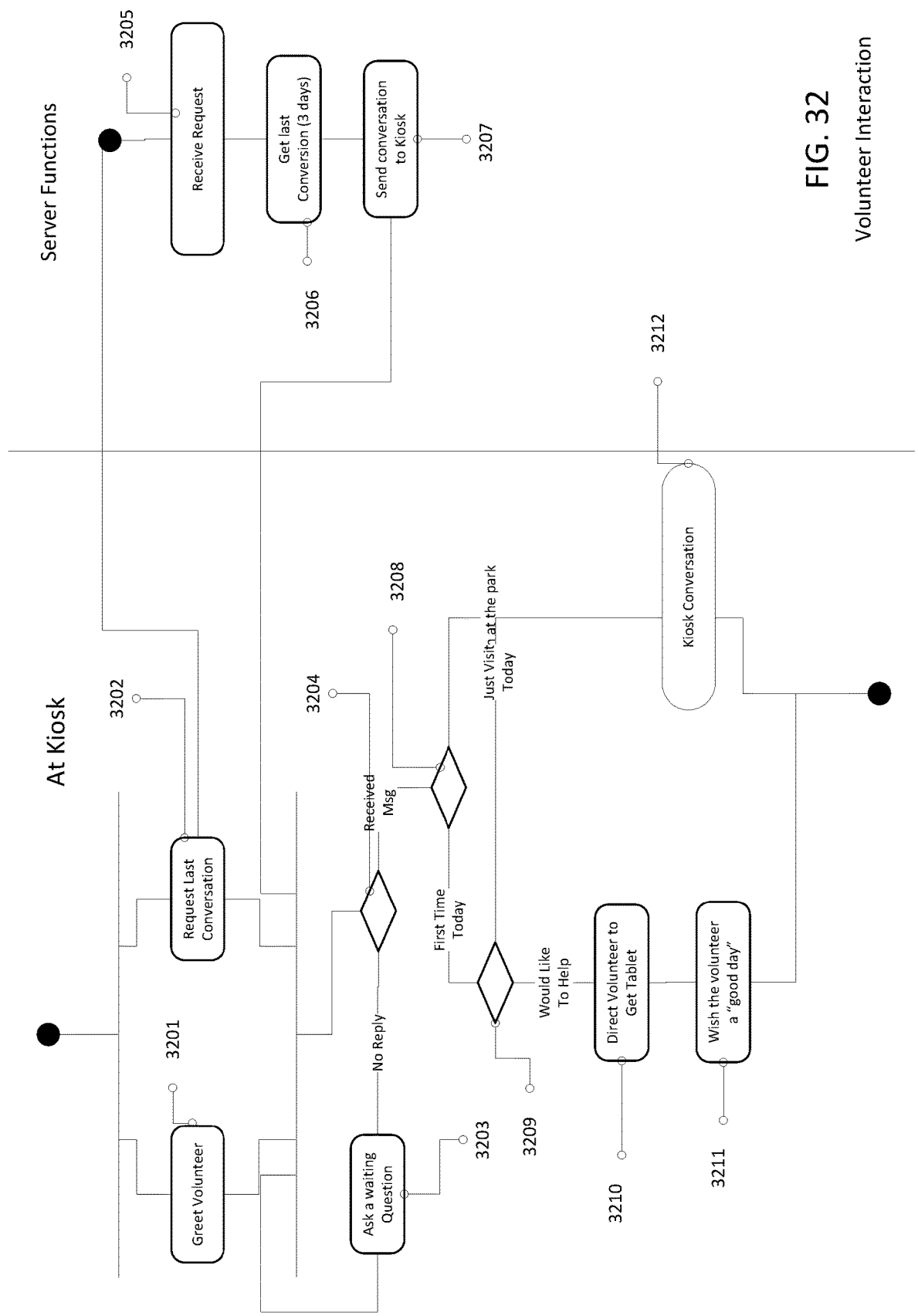

FIG. 32 represents the activity that occurs when a volunteer is recognized via facial recognition (steps 3201-3202). The server will then put together a conversation (steps 3203-3207) to be spoken back through the kiosk (steps 3108-3212).

Figure 33A:
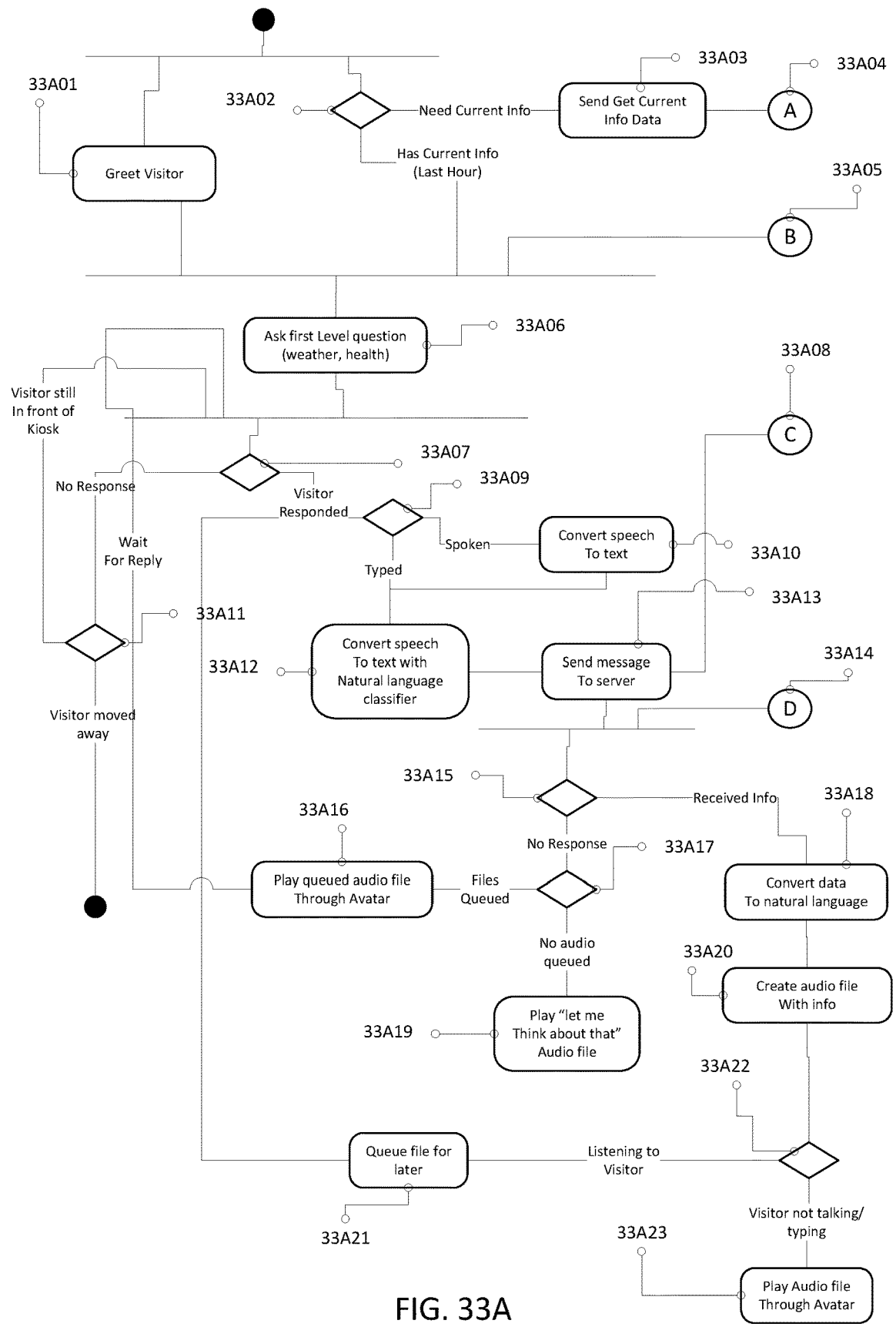
Figure 33B:
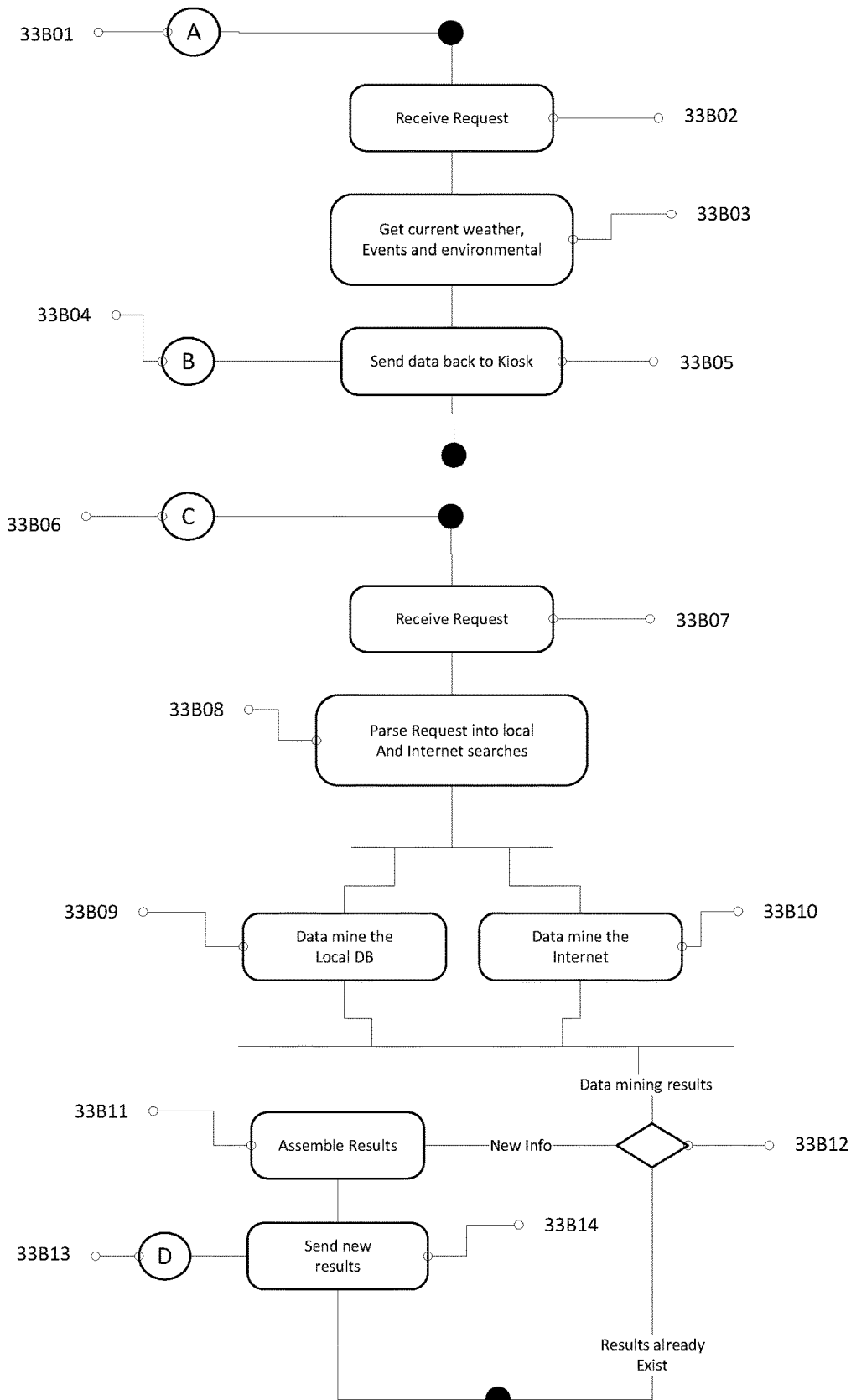

FIG. 33A and FIG. 33B represents the activity that occurs when a visitor approaches the kiosk (step 33A01). The kiosk will assemble current information to be used for conversations (steps 33A02-33A03). The kiosk will then start by asking simple questions (steps 33A06-33A07). The response would then be converted to text and analyzed, a new statement and question created (steps 33A09-33A23). The server will process all requests from the visitor (steps 33B01-33B14).

Figure 34A:
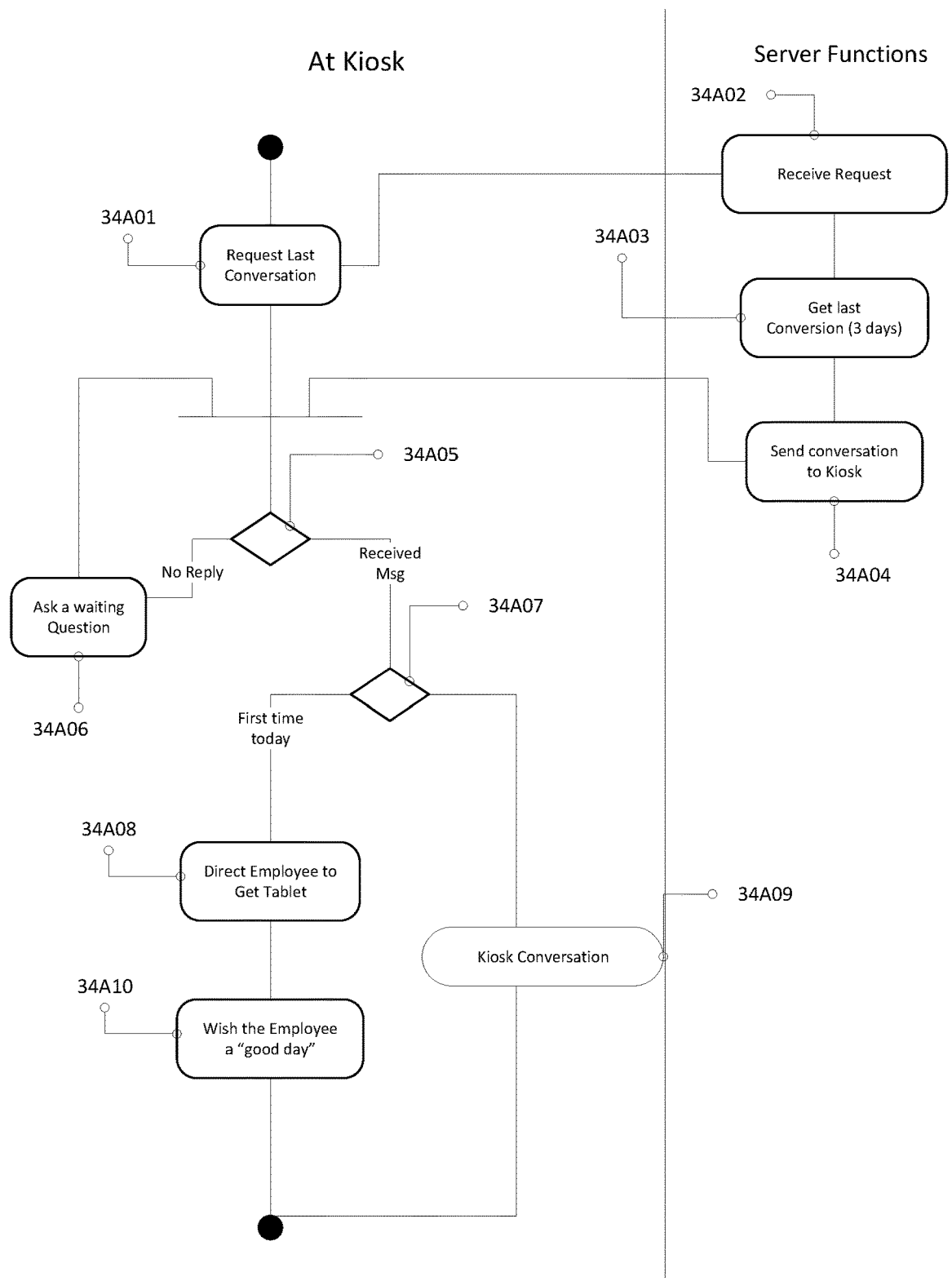
Figure 34B:
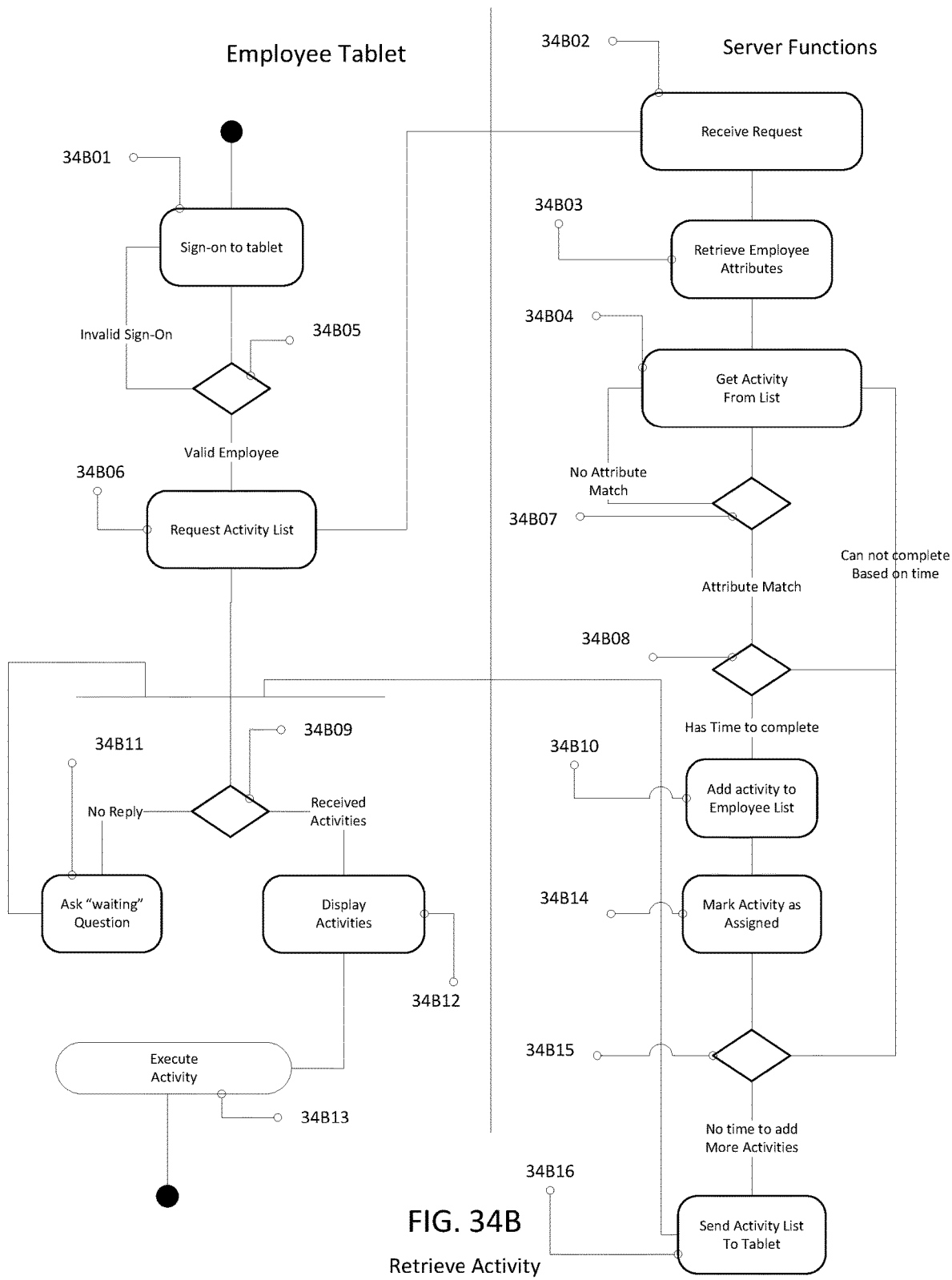

FIG. 34A and FIG. 34B represents the activity that occurs when an employee approaches the kiosk (steps 34A01-34A09) and is directed to use a Staff Activity Tablet. The tablet application will then be used direct the employee on the activities scheduled for them (steps 34B01-34B16).

Figure 35A:
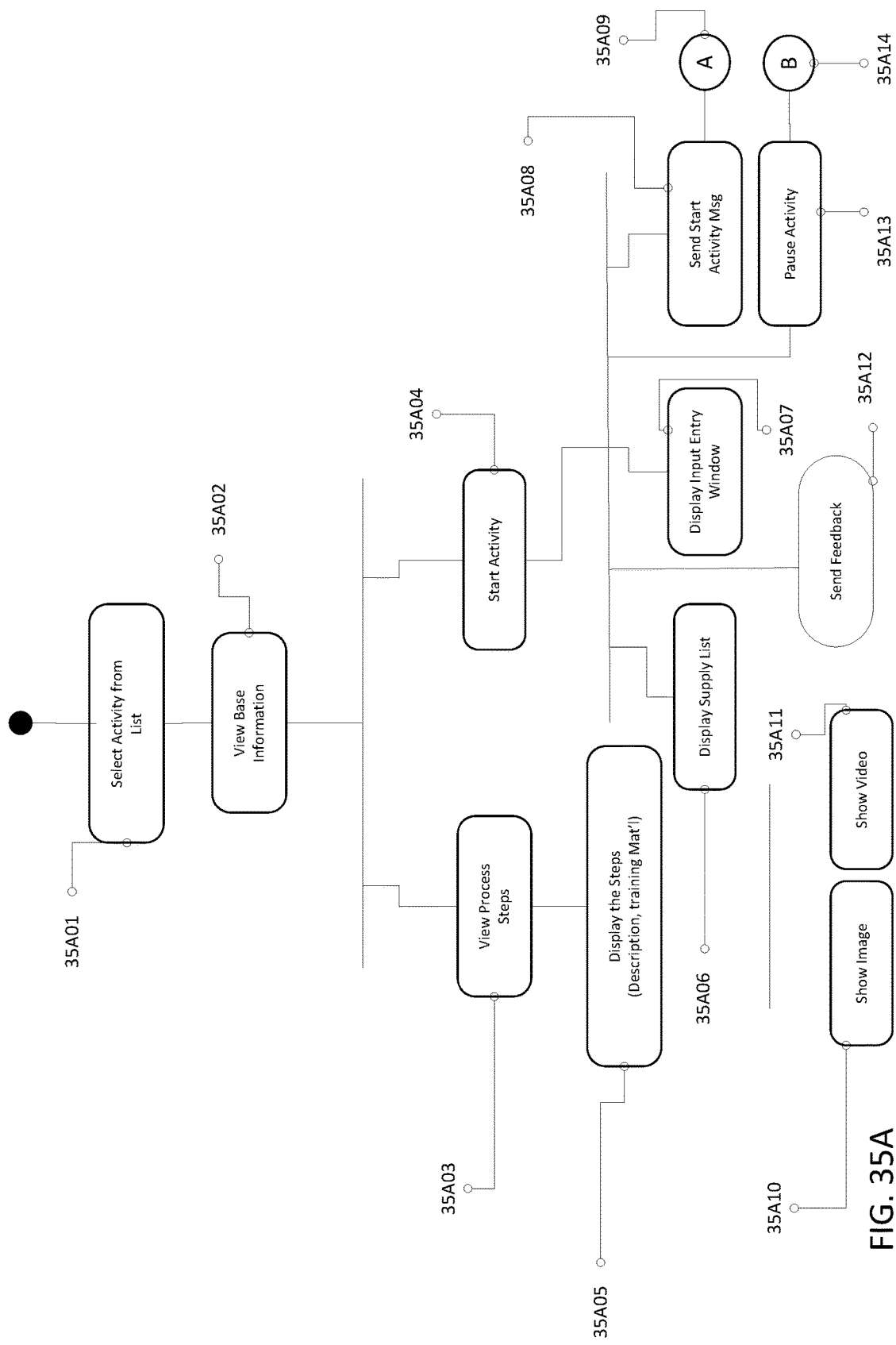
Figure 35B:
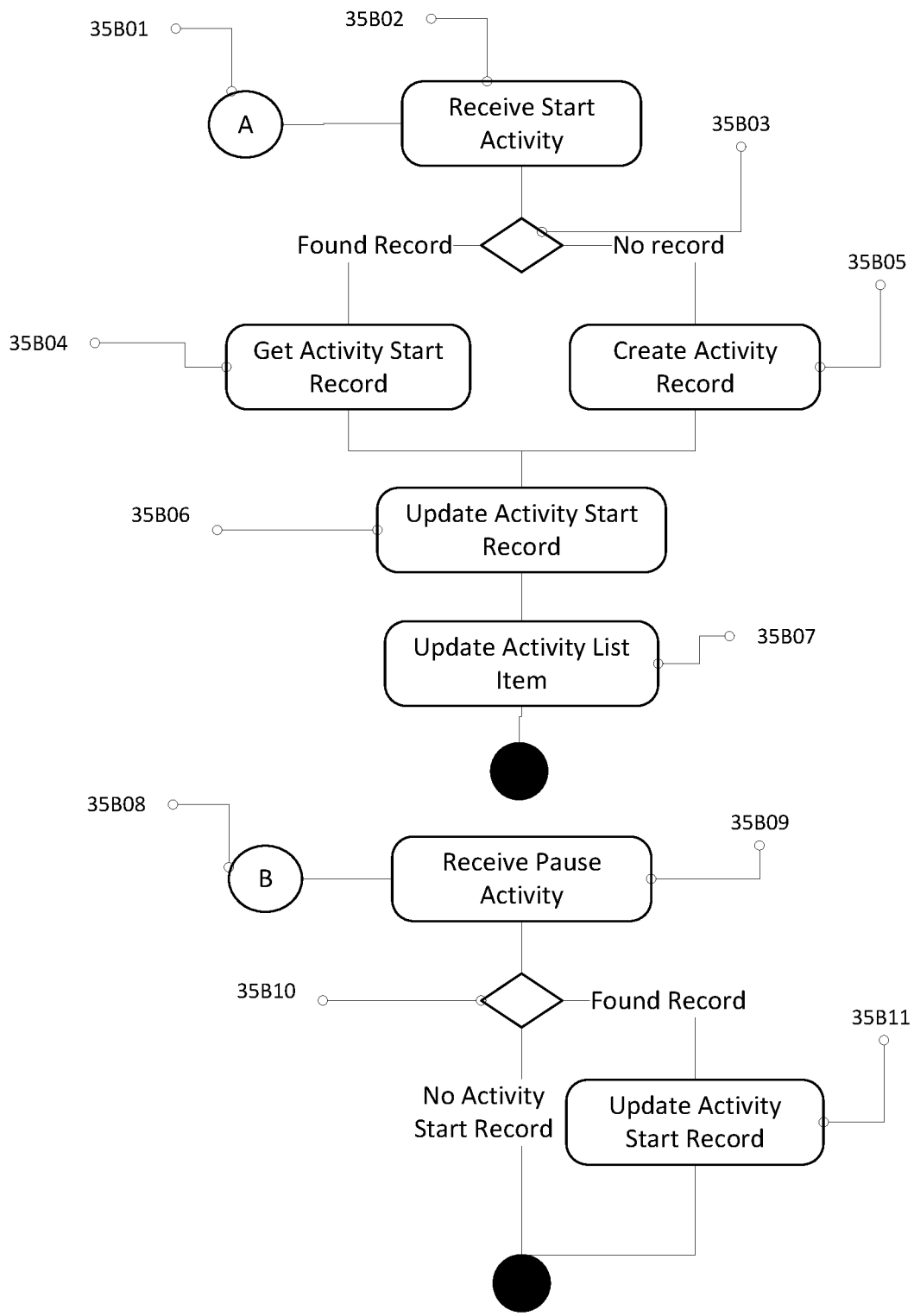

FIG. 35A and FIG. 35B represents the activity that occurs when an employee begins an activity on the tablet (steps 35A01-35A02). The tablet will have the functionality to select an activity (steps 35A04), display a supply list (step 35A06), and send feedback (step 35A12). FIG. 35B represents the activities that occur when an employee or volunteer is executing an activity.

Figure 36A:
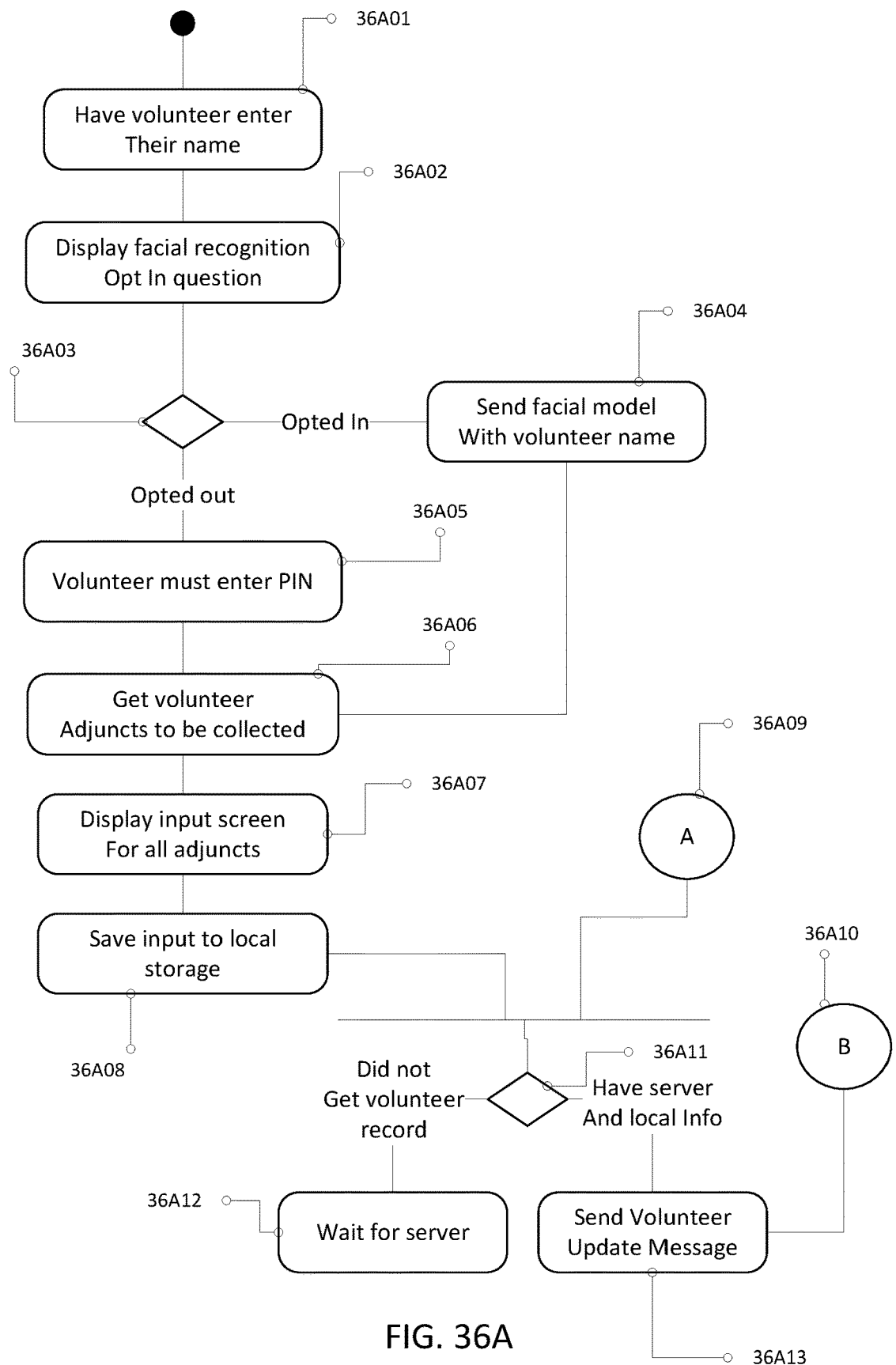
Figure 36B:
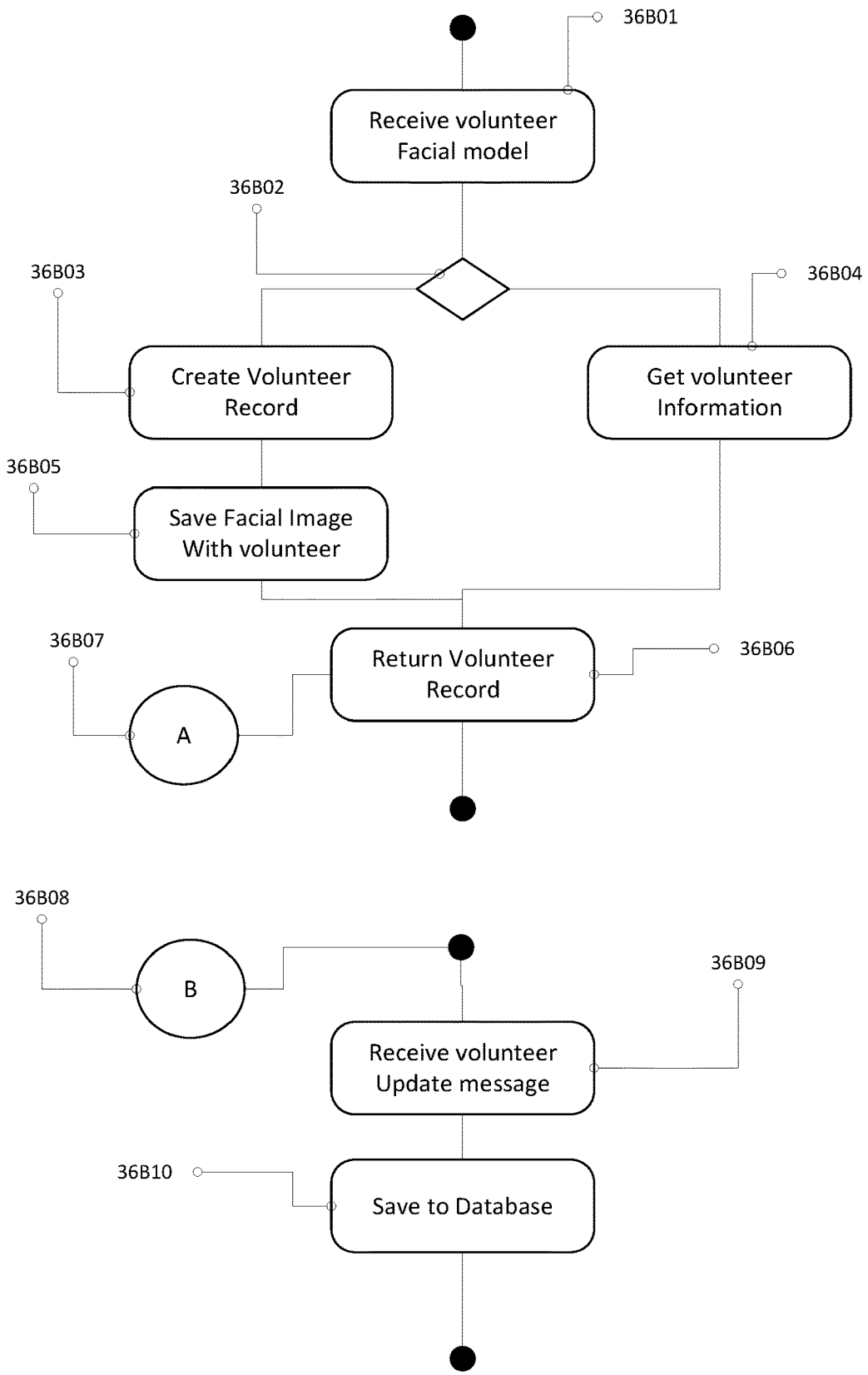

FIG. 36A represents the activity that occurs when a person decides to be a volunteer. The volunteer's information is inputted (steps 36A01-36A08) and sent to the server (steps 36A09-36A13). FIG. 36B represents the saving of volunteer information to the database.

Figure 39:
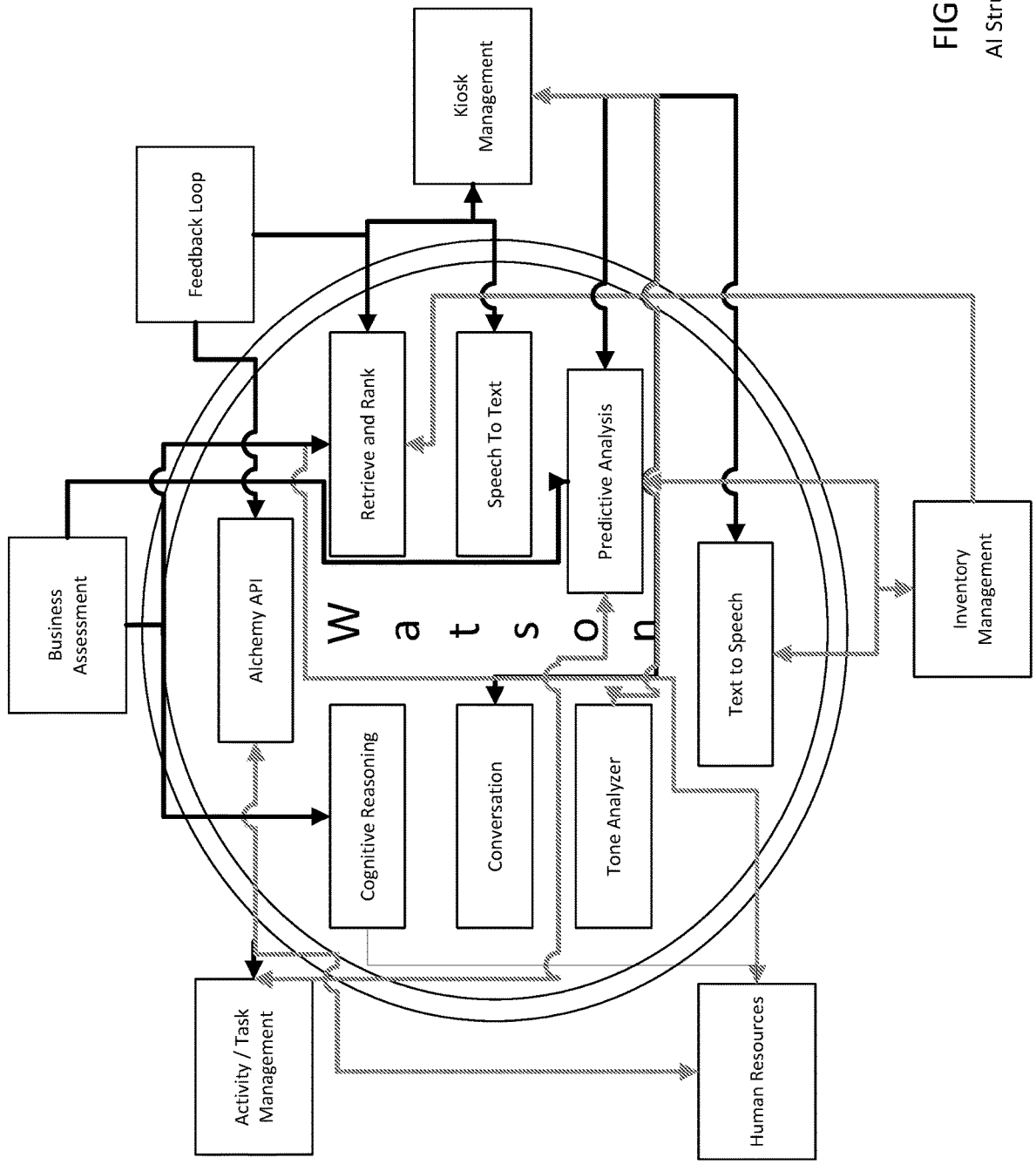
FIGS. 39-43 are illustrative real-world examples for the cloud-based system and method to track and manage objects.

The present invention when employed with a third-party AI analytical system form an integrated suite of software that will allow any business to have access to data mining and other AI tools. (The below discussion contemplates Ophanim's interacting with IBM's Watson™ for illustrative purposes and is depicted in FIG. 39. Ophanim could also interact with a different AI analytical service, such as that offered by Google or Amazon Web Services, in much the same way.)

The key services provided by this software include:

Visibility as to how well each of the business' operations is functioning on its own and in terms of the enterprise as a whole.

Business advisement utilizing Watson's™ cognitive reasoning.

Inventory management.

Activity management.

Data collection and analysis using sensors and other input devices.

In addition to the managerial-related service, the software supports systems that assist in running the enterprise, such as:

Staff Assistant—this is a tablet/smart phone application that functions as an interactive checklist of Actions that the employee or volunteer is expected to perform during a given shift. Additionally, the application provides advice from the knowledgebase and the Internet. A supplementary natural language interface provides a user-friendly means of communication.

Information Kiosk—this is an avatar-based application that is programmed as a game and that uses a natural language interface to provide an easy way for customers, employees, and other affiliates to gain information on the business and more.

Managing the Business

Startups, as well as small and medium size businesses, often cannot benefit from AI systems due to the lack of enough data for effective data mining and decision analysis. Ophanim provides AI-powered management tools that will enable any size business to confront its day-to-day challenges with expert guidance. To accomplish this, data from multiple businesses is scrubbed (identities removed) and combined to form a large volume of data. The data is then available for mining to allow a third-party AI analytical service such as IBM's Watson™ to use its Cognitive Reasoning to guide each such business.

Below is an outline of the various functional parts of the web-based software as a service (SaaS). They include:

Business Assessment.

Business Variables Management.

Knowledgebase Management.

Basic Human Resource Management.

Action/Activity Management.

Inventory Management.

Kiosk Management.

Business Assessment

The Business Assessment area of the software suite will allow users to receive feedback about their enterprises. The system uses data collected (then scrubbed) from participating businesses, as well as information provided by the user, as input to Watson's™ Cognitive Reasoning APIs. The system will perform assessments regularly, so users can receive advice on demand.

At the heart of the system is a set of applications that will monitor Actions being performed, sales, and feedback from customers and staff. This data is combined with environmental information and data from other participating businesses to help answer questions like:

Are products properly priced?

Is staffing sufficient or excessive?

Are there changes in competitor offerings?

Are the locations appropriate and safe for staffing and sales?

To accomplish this, data can be constantly garnered from participating businesses and from publicly-available sources such as websites and news programs. Several processes are used to glean useful information from these sources.

Operations Advisement

Throughout the day, the business environment is in a constant state of change. New competitors might enter the market, and price changes by competitors can affect profitability. Critical Actions may not be completed in the allocated time, thereby raising the business's costs or causing it to miss service commitments. Staying on top of all areas is a difficult task.

Ophanim's Advisement System plays an integral role in keeping track of all of the business's operations by making assessments such as these:

Comparing products and services with those of competitors in terms of functionality and price.

Determining if any location of the business is in an area that has disruptive activity planned, such as new construction, roadwork, parades, or protests.

Monitoring school calendars if the business can be affected by whether or not school is in session.

Determining what calendar reminders to send for events that can affect the business, such as tax filing deadlines, important industry meetings, holidays, and forecasted severe weather.

This process will run throughout the day to be ready on demand.

Financial Advisement

One of the major tasks of the Advisement System is to provide a separate set of "eyes" on the books. Many small businesses do not have the wherewithal, especially in the beginning, to hire an accountant to advise them.

The Advisement System will be looking to answer questions such as these:

Are margins appropriate for the industry and enough to support the business?

Is the cash flow sufficient or should short-time financing be pursued?

Is product pricing correct or should it be raised or lowered?

Product and Service Advisement

The Advisement System will provide the business with information relating to its various products and services, such as these:

What is the current margin and how does that compare to the business's historical margins and to industry standards?

How do customers rate the product or service and what modifications have they recommended?

How does the product or service compare to those offered by competitors in terms of price and features?

Are there process-related or other changes that can be made to improve the product or service and/or its margin?

Business Variable Management

There are thousands of variables that are used in managing the business. While some of these variables can be derived from outside sources, most will need to be inputted by the user. To the extent possible, the software will use natural language interfaces and gamified UIs to make the data input process both more enjoyable and more understandable to the user than is the case with traditional software. If for no other reason than to minimize errors, it is important that the user knows why the information is being requested.

As data is entered, it will be validated for correctness and reasonability. To determine if data is reasonable, it will be compared with corresponding data already in the data silo. This will not stop the data from being entered but will alert the user that the data being entered is out of the norm.

Data will be collected in the following areas: employee information; product and services specifications; facility information; client information; supplier information; inventory information (assuming that the business already has commenced operations); and process flows.

Business Goals

In order to assess the enterprise properly, its goals need to be fully understood. A participating business may want to maximize profits while still providing some social good to the community. In this section of the System, the user will be asked a series of questions to help determine the business's goals.

(Tracking the financial variables of the business is made easier by allowing data to be exchanged with widely-used accounting software and banks' websites.)

Product/Service Definitions

To develop assessments on processes or competition for the business's products and services, the specifications for each product and service needs to be entered into the System. Should the information already exist on a company website, the pages will be scraped to provide the base information. The business will then need to edit the data to give the AI model the best chance at producing helpful assessments.

Some of the basic information on will include: the name of the product or service; identifiers (including those used in the industry, by government, and by the business); specifications along industry standards (such as height, weight, dimensions, and colors); manufacturing process description including required labor and materials; and service requirements including required labor and materials.

Knowledgebase Management

The knowledgebase will be made available to all businesses that participate in data sharing. Its use will be to augment the business's own data to aid Watson™ in developing helpful assessments.

The knowledgebase data will be drawn from participating businesses, Internet sites, and other publicly-available sources, and, possibly, certain commercial sources. The data will be scrubbed of any company identifying information and then placed in a database structured for speedy data mining.

Basic Human Resource Management

To schedule Actions and support business activities for employees and volunteers, Ophanim needs to have the basic human resource information available. The data contains information to be used for the following: governmental reporting and compliance; Activity assignment; employee management (related to hiring, compensation, promotions, vacations, etc.); and employee/volunteer Information;

The data collected for an individual can include: name; address; tax ID—this value is redacted and encrypted on the system; skills ratings for any Action that the individual may receive (including any licenses and certifications); training programs to improve skills; preferred shifts; and constraints on what Actions or shifts to which the individual should be assigned.

Documentation

Ophanim's Human Resource System allows the user to input and retrieve documents that were submitted with respect to an employee. Such documents can include: employment application; volunteer application; W-9; work visas; ID verification; and transcripts, certificates, licenses and other evidence of specific training or skills.

Scheduling

There is an art to developing a schedule whereby employees are happy, all relevant labor regulations and laws are followed, and all of the necessary Actions are assigned. Developing such a schedule that also promotes efficiency and productivity for the business is even more challenging.

Many methodologies and optimization models have been tested in order to learn how to develop schedules that work. These schedules can be generated at any interval and are based around considerations such as these: the Actions that are currently in the queue for the day; the relative priority of each such Action; employee availability (including recent shift history); how productive each employee has been at certain Actions at different times of the day; upcoming business events; weather forecasts; and school calendars.

All of this data is used to produce the most optimized schedule. Individuals are notified of their schedule on a frequency selected by the business owner. A text is sent daily to each scheduled individual that highlights the Actions to which they will be assigned for the day.

Action/Activity Management

The main purpose of this System is to reduce the number of managers needed for a business by allowing Ophanim to manage the day-to-day Actions and to improve how they are being performed. This might be accomplished via a smart phone or tablet application that all staff members will be issued. More information on this application can be found in the Staff Assistant section below.

The System is comparing the immediate and longer term needs of the enterprise with the ability of staff (including their skill levels), inventory, and time. Messages are sent to employees to have various Actions addressed throughout the day, or immediately if the Action warrants it.

There are several components that are all running independently of each other but will collectively feed the Action pipeline to the staff. The components are:

- The Activity Scheduler—matches staff members with Activities that are required for the day.
- Training—based on the business's needs and on staff member's requests to enhance skills or grow in the organization, training Actions will be added to the schedule.
- Feedback Loop—this accepts feedback from staff and customers, then develops a list of the relevant processes, service or products, and/or staff members for review.
- Staff Productivity—this measurement is around the need for rework of an Action, feedback (positive and negative) from staff and customers, and input from the part of the System that is assessing unintended consequences.

Activity Scheduler

The Activity Scheduler engine is a process that takes in information from the following:

- Product/Service Commitments—these are product deliveries and service level agreements that need to be addressed today.
- Maintenance Actions—these are Actions that need to be done to maintain equipment and the facility.
- Immediate Actions—these Actions are introduced due to an event occurring. An example would be to create an Action to clean up broken glass.
- Staff Availability—this includes staff currently assigned to work and a list of staff members who could be called in to help should it be required.
- Training Requirements—to allow staff members to grow, Actions will be added that will give them an opportunity to learn or improve a business skill.

The System takes in the data from above and creates the most optimal assignment of Activities for a given day. The Activities are then sent to the Staff Assistant application to be acted upon.

Training

To make staff members as productive and as happy as possible, the System includes training time and material in the daily Activities that the staff receives. This is done by the following means:

Each Action that is created has the ability to add training material to the definition.

The business user can define training material and can mark this as a course that is required for specific Actions or advancement.

The training material can take the form of PDF files, videos, and/or images. Additionally, there may be an oral or online exam to get credit for the training.

Staff Productivity

Measurement of a staff member's productivity is often a one-dimensional measurement, as it looks only at how much the staff member accomplishes. The System will take into account factors that might be detrimentally affecting the employee's ability to complete the Actions in the time allotted.

Each Action will be looked at over time to consider:
Who is the person doing the Action?
How much time did they spend?
Did the Action need to be repeated?
Were more materials required to complete the Action?
Did the order in which Actions were performed affect the time and/or amount of materials required?

With this information, Watson's™ Cognitive Reasoning will be employed to determine if changes should be made.

Feedback Loop

In order for the System to improve over time, feedback needs to be received from staff and customers that will highlight things that might be changed to improve the business. The capture of the feedback will be done via the Staff Assistant and the Information Kiosk.

The System will take in the natural language text and run it through Watson's™ API to determine:
What product, service, staff member, or other business element is the subject?
Is it a complaint or endorsement?
What Actions are affected?
Does the feedback include a solution?
Has the feedback been received before?

A message is then prepared for the business to review. Changes to Actions, products or services, and/or processes referenced in the feedback can be accepted or rejected with a single click. Any changes will be tracked for unintended consequences.

Inventory Management

Inventory management is the practice of overseeing and controlling the ordering, storage, and use of components that a company uses to produce the goods and services it sells. Inventory management is also the practice of overseeing and controlling the quantities of finished products for sale.

Advantageously, the tools necessary for the business to manage its inventory are provided in a way that integrates this activity with the others managed by the System.

Tracking Inventory Use

Tracking of inventory starts with the acceptance of deliveries. Each Action has a list of inventory items required. As the Action is started, the inventory quantities are adjusted.

The system does not assume that the inventory quantities are correct from automated Action adjustments, however, since quantities also change due to factors such as waste and misplacement. When scheduled manual inventories are taken, the quantities will be adjusted and algorithms will be built to account for the difference between the calculated quantity of each item and the quantity actually on hand.

Expiring Goods Analysis

Expiring goods are dairy products and other inventory items with "use by" dates. The use of these goods should be planned to minimize their waste.

The System forecasts the rate at which expiring goods will be used by considering sales and use data on the goods with help from Watson's™ Cognitive Reasoning. The expiration dates are checked well in advance so that there is time to readjust Actions and schedules so that waste caused by expiration is minimized.

Information from this process is then passed to the ordering and activity management processes.

Ordering

The Activity of ordering from suppliers can be both time-consuming and prone to errors. The enterprise needs to create a proper order, then make sure that the supplier has filled the order correctly, and, finally, make sure that the supplier has billed only for what was delivered and accepted Leveraging Watson's™ Cognitive Reasoning, an ordering system uses the following information to make its recommendations for ordering: products that have been consumed through the various business operations; sales volumes and forecasts; waste and lost percentages based on input from inventories taken; and analysis of expiring goods.

Orders are then created for each supplier and are made available for review. The user can then: review the order by supplier, adjust item quantities, and remove or add items.

Once the order is ready, the user may send the order via email or text.

Additionally, the user may print the order should it need to be mailed. Many suppliers, especially those in the food service industry, have been very slow to embrace technology. The system overcomes that limitation by allowing a supplier that is an External Agent to log into a website and perform actions such as confirming delivery appointments and creating invoices with respect to the business.

Deliveries

Upon receipt of a delivery, the business reconciles it against the order or orders from which it resulted. Communication with the supplier can occur directly if it is also a participating business or via the website discussed above if it an External Agent. The delivery reconciliation process includes confirming proper receipt, noting that the quantity delivered is different from the quantity ordered, rejecting individual items due to quality-related or other reasons, and/or rejecting the entire delivery. The system includes a tablet application for delivery reconciliation that will connect to the Ophanim Database.

Invoicing

Upon receipt of an invoice, the business reconciles it against the delivery or deliveries to which it applies. Communication with the supplier can occur directly if it is also a participating business or via the website discussed above if it is an External Agenet. The invoice reconciliation process includes confirming that the quantity of each item for which the business is being billed matches the quantity actually delivered and accepted, and that the supplier used the correct prices and delivery charges. The system includes a tablet application for invoice reconciliation that will connect to the Ophanim Database.

Payments

Payment processing is done via downloads and uploads to various accounting systems so that payments can be made to the suppliers. The System will keep track of payments that have been made, and the supplier will then be notified via email or text that a payment is been made.

Kiosk Management

One of the advantageous functions of the System is to engage customers, employees, and volunteers in the business's activities. The Information Kiosk offers an enjoyable way for individuals to do this through oral and text-based communication. The software is designed not only to answer somebody's questions, but to engage in a conversation that may include tangential topics like family, weather, retirement, and many more depending on where the conversation leads. Additionally, the Kiosk can be setup to remember the person (if they opt in for saved facial recognition is selected) so that the conversation can be continued on a subsequent visit.

For the business, the Kiosk software can do more than just greet people as they enter the door and talk to them. For example, the System can facilitate the ordering of products or services offered by the business directly or on a commission basis.

View Current Kiosks

One of the main pages of the Kiosk Management System contains details of all of the Kiosks supported by the software. The row on a specific Kiosk can include its:

Name.

Mac address.

Location.

Popularity in terms of the number of queries it has received.

Popularity in terms of the number of unique interactions and returning users.

Most recent update's date and time

Buttons to send an update.

Kiosk Packages

Kiosk packages are a set of files that are used by the Kiosk software to provide it with:

Location information including longitude and latitude.

Avatars to be used.

Icons and images to be used.

Text describing the business and its products and services.

List of accounts to be used when making reservations or to order goods. This will include logos and the list of fields required.

The data is packaged and queued for download when the Kiosk is ready for update. The packages may be used to support multiple Kiosks.

Deployment

Before a Kiosk is deployed, the Mac address and other information must be added to the Kiosk Management System and a package assigned. The initial loading of the software should be done prior to the Kiosk's leaving the business facility.

The hardware can include, for example:

32" touch-screen monitor

Windows 10 or Linux computer.

Speakers.

Directional microphone.
Intel Real-Sense camera.
Staff Assistant

The gamified application runs on a tablet or smart phone can be issued to all staff members and have the following capabilities:

- View the Activity list for the day and allow the user to check off completed Actions.
- Enter data from sensors, meters, and other measurement devices.
- Enter observations (including photographs).
- Look Back feature that will allow the user to view needed information (such as previously recorded measurements).
- Talk Back feature that will tell the user, in natural language, what Actions are to be operated on and provide a tool for looking up data without looking at the screen.
- Delivery reconciliation (if the employee is authorized).
- Inventory taking (if the employee is authorized).
- Interacting with training materials.

Activity Management

This application acts as a gamified manager that will challenge the user to complete their assigned Actions as well as try to coax the user into taking on Actions to which they have not yet been assigned. The gamification will take the form of:

- Credits earned for completing the work assigned.
- Additional credits for completing an Action in less time than was allocated.
- Additional credits for completing an Action using less materials than was allocated.
- Additional credits for improving the process to complete an Action.
- Additional credits for assisting other employees without being instructed to do so.
- Lost credits if an Action needed to be redone The business will decide how credits can be redeemed. Possibilities include additional vacation, mention in employee reviews, and enhanced training opportunities.

As a staff member completes an Action, they may simply check it off from the Action list. To complete an Action, the following must be done:

- All work steps must be finished.
- All required information (including any readings or images) must be recorded.

The System has a pause button on it to stop the keeping of time while working on an Action. This is done to collect accurate measurements of the amount of time an Action takes.

Data Collection

During certain Actions, the user can be asked to collect information and report it back to the System. The data collection may be in the form of:

- Readings from measurement devices.
- Images or video taken from the built-in camera.
- Sounds collected through the built-in microphone.

Once the data is entered, it is transmitted to the Action Management server process where the data is stored and then used to determine if new Actions need to be created.

Look Back

Should the user need to view previously recorded information for an Action, this feature will allow the viewing of the data. The amount of data will start at a month previous but the user may expand the time frame.

Talk Back

To make the application fun, a Talk Back feature has been added. This feature will allow the user to ask questions about the work to be done or to just to get some information. The System will answer back in natural language.

Additionally, through the day, the system can chide the user in order to provide some levity and a fun conversation.

Deliveries

If the user is authorized to accept deliveries, they can follow the procedure below to accept or reject a specific delivery:

1. Select the supplier by name.
2. Review the list of open orders.
3. Select the items contained in the delivery.
4. Adjust quantities or reject an item. If the item is rejected, a reason must be selected.
5. Once complete, the Accept button is pushed and the data is transmitted to the server.
6. A Reject button is provided in case the entire delivery is rejected.

Take Inventory

If the user is authorized to take inventory, the Take Inventory application can be available for the user to collect the list of what is actually on hand.

The process for each item can be:

1. Use the bar code reader on the input tablet or phone, or take an image of the item and use image recognition, to determine what the item is.
2. Select the item if there is more than one possibility.
3. Adjust the quantity.
4. Save the value to the server.

Training Material

One of the important functions of this application is the ability to provide training material at any time the user requests it (including when the user has been assigned an Action that requires them to undertake a training session). The user can read a PDF, watch a video, or review images with text.

Once the lesson is complete, if configured, the user may be asked to complete an exam or to get a more senior staff member to conduct a practical exam. Should the user receive a passing grade, their staff member data can be updated to include the skill represented by the training.

Information Kiosk

The Information Kiosk is designed to interact with customers to answer any questions they might have, to develop marketing data via small talk conversation, and to provide a revenue source through the ability to make a reservation or to order products from another company. The software is developed as a video game to provide an element of fun.

The Kiosk is managed via the business management pages. A package of data for this Kiosk is constructed to contain all of the information necessary to run the Kiosk. In the event that the Internet connection is not available, most of the functionality can be disabled but the conversation functionality of the greeting avatar will remain on.

Greeter

Figure 40:

FIG. 40 shows a Greeter that is an avatar that can greet people as they approach the Kiosk. For example, the Greeter can say "hello" or some other greeting and then wait for a reply from the person standing in front of the Kiosk. If the person has opted in to allow the Kiosk to maintain their facial model and the person is recognized, the Greeter can address them by name and continue the conversation from the last meeting.

Any question that the person in front of the Kiosk asks by typing or by speaking and having Watson™ interpret the language, can be analyzed to determine if the data is in a local data silo or if the question must be sent out to the Internet. In either case, the results are sent back to the screen and spoken back to the person. Should the results not answer the question, refining questions can be asked and used to train the natural language classifier.

Weather

Figure 41:
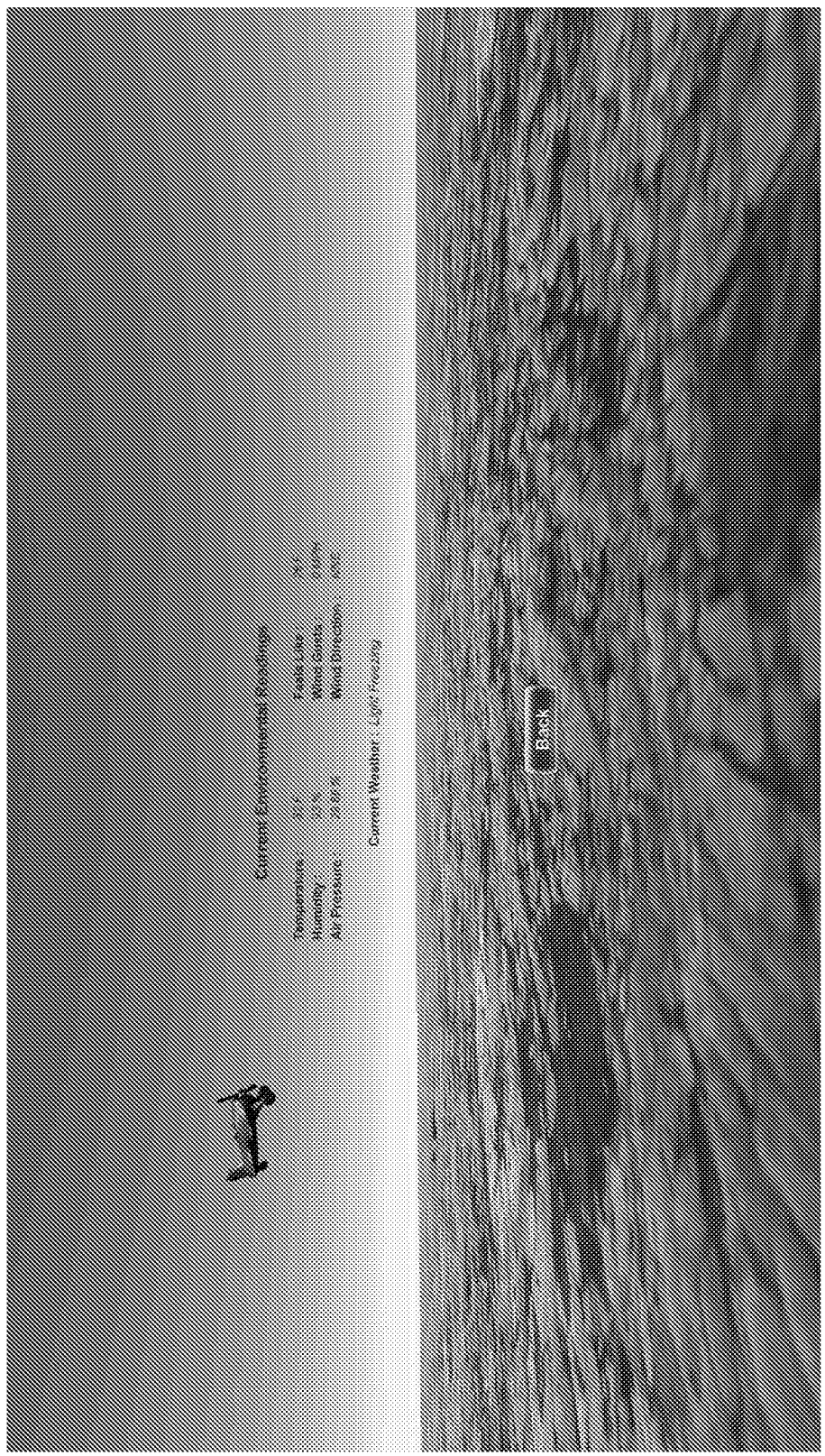

FIG. 41 shows Kiosks that can support the weather and a five-day forecast at each Kiosk's location. For those Kiosks that are in locations that can provide the indoor temperature, humidity, and air pressure, the data can be sent to the Ophanim Database and then shown on the weather screen.

Business Philosophy

Downloaded daily is the business philosophy and history of the business. Questions relative to the forming of the business or about the philosophy can be directed to this scene. The information can be in the form of text that can be shown and read to the customer or a video that is shown.

Facility Information

FIG. 42 shows facility Information that includes details on the creation of the space, history on the building, and list of surrounding landmarks and historical sites. The data can be in the form of text with images (the text can be read by a selected avatar) or a video.

Products and Services

FIG. 43 shows that for each business, the products and services that are to be highlighted in the Kiosk are described in the package that is brought down to the device every day. A product or service can have the following information:
Name.
Description.
Avatar to be used to display it.
Ordering fields if the product or service can be purchased or reserved from the Kiosk.
Additional multi-media that may include images or video.
Local knowledgebase changes to point Kiosk users to this page for questions around the product or service.
Create Order/Reservation As an added feature of the Kiosk, the business may have agreements with third parties to market or sell another company's products. For instance, a hotel may have an account with Open Table that can allow guests to reserve a table at local restaurants. In such a case, the business would receive a commission for each reservation that is filled.

The outside product or service can have the following information:
Name.
Description.
Avatar to be used to display it.
Ordering fields if the product or service can be purchased or reserved from the Kiosk.
Additional multi-media that may include images or video.
Local knowledgebase changes to point Kiosk users to this page for questions around the product or service Knowledgebase changes would be made in the conversation base as these items would come about as a result of a conversation.

Time Management

FIGS. 44-46 are illustrative diagrams for time management features for the cloud-based system and method to track and manage objects. A further implementation of Ophanim involves providing automated time management to enhance staff efficiency by ensuring that the most valued activities get performed. Ophanim's time management is advantageous because it automates the process by which people continually make trade-offs among potential Tasks (e.g., previously referred to as Actions) as unexpected events that affect plans occur. Ophanim does that by:
1. Dividing each day into relatively brief (e.g., two to four hours long) blocks of time called "Skeds."
2. Once a particular Sked has begun, considering all of the scheduled Tasks and all of the Tasks that have been manually or automatically added to that Sked as a collection.
3. At a specified frequency (e.g., every four minutes), determining whether the Sked is balanced in terms of the total available labor minutes versus the total time needed to perform all of the uncompleted ("Open") Tasks remaining in the collection, and, if not,
  a. Using a suitable algorithm to calculate a "Score" for each Open Task.
  b. Ranking the Open Tasks based on their relative Scores.
  c. Abandoning one or more Open Tasks and/or moving one or more Open Tasks to later Skeds based on the ranking.
4. Repeating Step 3 until the end of the Sked.

Ophanim uses an inventory management model for time management. However, instead of monitoring the available quantity of physical items to keep an entity from running out of them, as traditional inventory software does, Ophanim is designed to assist the entity's employees to work as efficiently as possible and, thus, not to run out of available time. However, there is an advantageous difference. A change in the quantity of one item generally does not affect the quantity of other items. In other words, subject to overall budget and space constraints, an entity can have as many of each item as it wants. That is not the case with time, as allocating it among various Tasks becomes a zero-sum game. Time spent on one Task is not available for other Tasks. So, with this approach, the additional consideration of making trade-offs, which is not normally part of inventory management, comes into play. Ophanim's advantageous solution is to manage collections of Tasks rather than individual Tasks.

Configuration

Configuring Ophanim for time management employs four steps. First, the User (e.g., the Author) identifies all suitable Tasks available to be performed. Each potential Task can include "Elements" that define the Task and "Ratings" that Ophanim uses to calculate the Task's Score. The Elements can include, for example:
Location: where the Task will be performed.
Verb: the action that will be performed.
Object: the Inventory Item (e.g., Common or Proper Noun) on which the action will be performed. (e.g., an Ophanim Inventory Item can be a Concrete Noun corresponding to a specific physical object, such as a gallon of whole milk, or an Abstract Noun corresponding to a measurable quality of a physical object, such as the relative cleanliness of the women's bathroom).
Base Expected Duration: the number of minutes performing the Task will normally require.

The Ratings, which are numerical, can include, for example:
1. Priority: the Task's relative importance compared to all other potential Tasks.
2. Movability: the number of Skeds in the future to which the Task can be moved if necessary (e.g., 0 means that the Task has to be performed during the Sked to which it is originally assigned and cannot be delayed).
3. Optionality: a Boolean value indicating whether or not the Task must be performed. (e.g., if the Optionality Rating equals True, then the Task can be abandoned, not simply delayed; on the other hand, if the Optionality Rating equals False, then the Task cannot be abandoned but must be performed either during the current Sked or a later Sked).

4. Difficulty: the degree to which a particular instance of the Task might require more or less attention—but not more time—to complete than normal (e.g., the Difficulty Rating might be greater than 1 if the Task is being performed during an especially busy Sked).
5. Unpleasantness: the relative mental effort required to perform the Task (e.g., cleaning a bathroom might have an Unpleasantness Rating of 4, whereas operating a cash register might have an Unpleasantness Rating of 2).

The second step entails the User's creating a Sked Template for each Sked. FIG. 44 shows how this occurs through the Sked Manager screen (elements 4402-44044). The User starts off by selecting the Sked to which the Template will apply (elements 4406-4420). Next, the User determines (1) which Tasks need to be performed during the Sked, and (2) for each such Task, the relative amount of effort that employees should devote to it ("Weighting") (elements 4422-4432). A Weighting of 0 means that the Task does not normally get performed during that Sked, and thus, should not appear in its Task List. Tasks with Weightings greater than 0 do appear. A Weighting of 1 means that the employees should spend the normal amount of time during the Sked performing the Task. A Weighting between 0 and 1 means that the Task gets performed but that employees should spend less than the normal amount of time on it. A Weighting greater than 1 means that employees should spend more than the normal amount of time on it.

Now, the User can figure out how many employees should work during each Sked and add this information to the corresponding Sked Template. That is accomplished by comparing the number of minutes in the Sked with the "Total Required Time" needed to perform all assigned Tasks during that Sked. Total Required Time is the sum of the product of the Weighting times the Base Expected Duration of every Task (element 4436). For instance, if the Sked is 120 minutes long and the total Required Time is 350 minutes, three employees are needed during that Sked.)

The User completes this process by assigning individual employees to each Sked so that there are enough employees to perform all of the assigned Tasks (element 4434), and then saving the Sked Template (elements 4438-4440). Tasks are assigned to Skeds and employees are assigned to Skeds, but employees do not have to be assigned to specific Tasks except when that is warranted. In general, all of the employees assigned to a specific Sked are collectively responsible for performing the assigned Tasks Operation FIG. 45 shows how Ophanim adds Tasks to Task Lists.

At the beginning of every week, Ophanim automatically instantiates Task Lists for all of that week's Skeds based on the Sked Templates (steps 4502-4508). Once that is accomplished, a new Task might be added to a Sked manually (steps 4510-4512), or an assigned Task might be deleted from a Sked or modified (e.g., in terms of its Weighting and/or its Priority Rating) through the operation of a "Rule". When an Event causes a Rule to run with respect to a specific Inventory Item, Ophanim evaluates the current value of each of the Inventory Item's specified Adjuncts to determine whether the Rule's conditions for triggering a Task-related action have been met. If they have, Ophanim undertakes the specified action (steps 4514-4534). For example, Ophanim's determining that a particular Inventory Item's quantity has fallen below a threshold level might cause Ophanim to add a "replenish item" Task to the Current Sked's Task List.

Multiple employees can use Ophanim at the same time, through any suitable device with an internet connection.

Upon logging in, each employee can view the current Sked's Task List. By default, the Task List displays the Tasks from highest to lowest Score, with Open Tasks grouped at the top and completed Tasks grouped at the bottom. (e.g., a different display order can be set as an employee preference.) For each completed Task, the name of the responsible employee and the start and end times are shown. For each Open Task, an employee can claim it by clicking on the "Begin" button. That action identifies the employee as being responsible for performing the Task and adds a start time. Clicking on the button again changes the status of the Task to completed and records the end time.

If necessary, the current Sked's Task List can be modified in order to make sure that employees focus on a particular Task by manually raising its Priority Rating. In the event that a specific Task is not displayed as an Open Task, its Weighting can be raised to a value greater than 0 to make it show up as an Open Task. A Task also can be de-emphasized by manually lowering its Priority Rating, unassigned by manually changing its Weighting to 0, or cancelled by clicking on its "Abandon" button.

In addition to showing employees which Tasks remain Open, the Task List function collects the amount of time that each employee took to perform each Task that he or she claimed. Ophanim can use that information to validate the Base Required Times entered during Configuration as discussed above.

Once the Sked begins, Ophanim keeps track of both the total amount of time that the employees assigned to the Sked have left to perform Tasks ("Remaining Available Time") and the Total Required Time needed to perform all of the Open Tasks. The Open Tasks include Tasks added to the Sked's Task List either automatically, through operation of Rules, or manually, and not completed, unassigned, or cancelled.

At a frequency selected by the User, for example, such as every four minutes, Ophanim can determine whether the Sked is "Balanced" (e.g., the Remaining Available Time is greater than or equal to the Total Required Time for all Open Tasks) or "Unbalanced" (e.g., the Remaining Available Time is less than the Total Required Time for all Open Tasks). If the Sked is Balanced, Ophanim will take no action with respect to the Task List. On the other hand, if the Sked is Unbalanced, Ophanim can modify the Task List in order to make the Sked Balanced. That will entail the following steps shown in FIG. 46:

1. Ophanim starts with the Sked's then-current Task List that has been populated through a combination of the relevant Sked Template's being instantiated, Tasks' being added and removed manually, and Tasks' being added and removed through the operation of Rules (steps 4602-4610).
2. Ophanim determines whether or not the Sked is Unbalanced (steps 4612-4618). If it is, Ophanim calculates a Score for each Open Task using a suitable algorithm that takes into account all of the Task's Ratings (step 4620).
3. Ophanim ranks all Open Tasks based on their Scores.
4. Starting with the Open Task with the lowest Score, Ophanim cancels it if its Optionality Rating equals True (steps 4622-4624). If its Optionality Rating equals False, Ophanim then checks to see if its Movability Rating is greater than 0. If it is, Ophanim lowers that number by 1 and moves the Task to the next Sked. If it is not, Ophanim moves on to the Open Task with the next lowest Score (steps 4628-4630). (Alternatively, e.g., Ophanim can be configured to cancel Open Tasks with Optionality Ratings equaling True, starting with the Open Task with the lowest Score, before trying to move any Open Tasks).
5. Ophanim continues the process described in Step 3 until the Sked is Balanced (step 4626).

Ophanim can determine whether or not the Sked is Balanced, and, if necessary, modify the Task List to make the Sked Balanced, continually until the Sked ends. Whenever Ophanim does this, it considers the then-current Task List rather than the one instantiated based on the Sked Template.

Thus, it can be seen that Ophanim promotes efficiency by automating the process by which the owner or manager of a business (e.g., the Author) gets employees to perform Actions that best accomplish the business's objectives, when and in the order that minimizes the total amount of time that the employees need to work.

Another application of Ophanim's time management functionality, for example, could be by an individual, such as a college student. Ophanim can keep track of the due dates of the student's assignments and other academic and non-academic obligations, and automatically assign Tasks instructing the student when to start researching, write drafts of papers, study for exams, do laundry, attend team practices and club meetings, etc. Further, Ophanim can improve the student's experience by analyzing the grades that the student received on a series of papers and exams in terms of the relative amounts of time spent on different Tasks and when those Tasks were performed, and then taking the results into account when creating future Task Lists.

Further, Ophanim is different from existing task management software in that it is specifically designed to make routine work more satisfying. This is accomplished in two unique ways. First, the way in which Activity lists are presented to a specific actor can be optimized for the actor's unique set of abilities and preferences through the use of Lenses. Second, all Activities are part of one or more Projects.

Ophanim promotes engagement by tailoring how information received from the server is presented to the actor. Typical text-based software might allow the information that is displayed to the actor to be changed in terms of font, typeface, color, and language. If the software features a dashboard, perhaps its panels can be rearranged or hidden. Ophanim's ability to customize the display is much more robust, and is applicable to both human and machine actors.

Each Ophanim actor has a Lens that controls not only the format in which the information received from the server is displayed to that actor, but also the relative speed and complexity used to present that information.

Significantly, Lenses allow for a great deal of actor-specific customization without affecting the basic logic that Ophanim uses to automate time management of tasks. Instead, Lenses determine the manner in which actors interact with their Activity lists. This, in turn, promotes engagement in three ways.

First, actors feel a sense of agency by gaining control over a fundamental aspect of their Ophanim experiences.

Second, frustration is reduced because actors (or their managers) can tailor their Activity lists rather than being forced to use a single standard.

Third, as each Lens has settings across multiple dimensions, an actor can experiment until deciding upon the optimum collection of settings.

Human actors vary in terms of the optimum number of Activities from which they should be asked to select. Some actors might function best when their Activity lists present one Activity at a time, with a new Activity not displayed until the prior one has been completed. At the other end of the spectrum, some actors might function best when 20 (or more) possible Activities are displayed in a single list, with the actors deciding the order in which they perform those tasks. Therefore, Ophanim Lenses can be set to vary the number of Activities contained in different actors' Activity lists.

Human actors also vary in terms of the specificity of information they need to operate most effectively. Inexperienced and forgetful actors might want to see, for each Activity, a checklist detailing the steps needed to complete that Activity. In contrast, more senior actors might have internalized all the steps and just want to see the Activities listed by name. Therefore, Ophanim Lenses can be set to display more or less detail with respect to the Activities contained in different actors' Activity lists.

Moreover, human actors vary in terms of what format of information is most comprehensible to them. Some actors function best with auditory inputs, some with text-based inputs, some with visual inputs, and some with a combination of multiple types of input. Further, even for actors for whom a special type of input is optimum, some variations are preferable to others. For instance, a visual Activity list can consist of photographs, simple diagrams, complex diagrams, GIFs, or videos, among other formats. Depending on both their respective abilities to process information presented in different ways and their preferences, individual actors will benefit when highly variable Activity lists are available. Therefore, Ophanim Lenses can be set to fine-tune each actor's Activity list.

Similar concepts apply to machine actors, as well.

Lens settings relevant for machine actors include API call format, communication protocol, frequency and rate for measurement collection, and recording format (e.g., photograph or sound recording).

A "task" can be defined as a single unit of work, whereas a "project" is made up of multiple tasks. In addition, a project typically has a start date and an end date, with milestones and a desired outcome. Tasks are often repetitive, such as in the case of jobs characterized by manual work, and are not innately engaging.

This lack of variety and sense of progress can make it more difficult for an actor performing routine tasks to operate at a high level for an extended period. In contrast, an actor performing tasks that are part of a project might believe that each completed task brings the project's desired outcome that much closer. That sense of progress, in turn, might motivate the actor to operate at a high level throughout the duration of the Project.

Ophanim recognizes the benefit that can arise by placing Activities in a larger context. It does this by grouping Activities into collections called Projects. Each Project has the following attributes:

Unique name.
Start date.
Target completion date.
Anticipated dates of significant completion milestones.
A list of all the Activities assigned to the Project (Component Tasks).
A list of the Component Tasks that have been completed since the Project's start date, as well as related statistics (such as the total amount of time that has been expended so far on completed Component Tasks, and the percentages of completed v. remaining Component Tasks).

A list of the remaining Component Tasks and related statistics (such as the total amount of time that completion of the remaining Component Tasks is expected to require).

Ophanim employs this model even for types of Activities that are not commonly grouped into Projects by task management software. When appropriate, a series of routine Activities can be combined into a Project by using gamification to provide the actor with a more engaging desired outcome. For example, rather than simply presenting an Activity calling for the actor to don safety equipment every day at the beginning of the first Sked, Ophanim might place 40 such Activities into a two-month-long Project named "Achieve Perfect Safety." The actor thereby perceives each Component Task as a step in a process to avoid injury.

The statistics that Ophanim displays to the actor as the Project moves to completion reinforce the sense of progress. Rewarding the actor upon successful completion of the Project also can help to transform the actor's experience from a series of unconnected routine Activities into an integrated process.

Ophanim uses Challenges to provide Rewards to actors. Challenges are not necessarily Project specific. Rather, a specific Challenge can consist of completion-related Activities across various active Projects. For instance, a Challenge might provide a Reward if the Actor completes 10 tasks in a single day.

Ophanim software is different from existing task management software in advantageous ways. These advantages can be illustrated in the context of a deployment to operate a logistic warehouse, as the software transforms the routine manual Activities that characterize warehouse work into longer-term Projects. The software also makes it possible for the warehouse operator to employ workers with a wide range of abilities, including workers who are not normally employed in this type of work due to their non-traditional ways of processing information. Although this is a specific implementation of an Ophanim Ecosystem, conceptually it is similar to any other implementation in that there are multiple server processes operating and multiple actors (both human and non-human) interacting with those processes and performing routine Tasks.

Accordingly, FIGS. 47-53 are illustrative diagrams for activity list, lenses, and gamification features for the cloud-based system and method to track and manage objects, as noted above. In FIGS. 47-53, the following tables describe the various components of the system and method.

| FIG. | Element | Description |
| --- | --- | --- |
| 47 | 4701 | Lens Settings - how Lenses are applied to users |
| 47 | 4702 | Start - Actor starts using software |
| 47 | 4703 | User selector - Actor identified |
| 47 | 4704 | Lens selection - Server applies Lens |
| 47 | 4705 | Lens application - Server applies Lens settings |
| 47 | 4706 | Lens Render - how Lens affects Activity list |
| 47 | 4407 | Start - Actor starts using software |
| 47 | 4708 | Login - Actor signs in |
| 47 | 4709 | Lens application - Server applies Lens settings |
| 47 | 4710 | Activity list rendering - Activity list displayed to Actor |

| FIG. | Element | Description |
| --- | --- | --- |
| 48 | 4801 | User selector - Actor identified |
| 48 | 4802 | Lens selector - determines which Lenses are available to Actor |
| 48 | 4803 | Lens types - recommends Actor's Lens based on stored profile but allows alternate selection |
| 48 | 4804 | Save button - preserves Lens selection |
| 48 | 4805 | Cancel button - clears out Lens selection |

| FIG. | Element | Description |
| --- | --- | --- |
| 49 | 4901 | Start - Actor starts using software |
| 49 | 4902 | Login - Actor signs in |
| 49 | 4903 | Lens selection - Server identifies Actor and applies appropriate Lens |
| 49 | 4904 | Activity list rendering - Full Activity list with options displayed to Advanced Actor |
| 49 | 4905 | Activity list rendering - Full Activity list without options displayed to Normal Actor |
| 49 | 4906 | Activity list rendering - Partial Activity list displayed to Focused Actor |
| 49 | 4907 | Activity list rendering - Image Grid Activity list displayed to Visual Actor |

| FIG. | Element | Description |
| --- | --- | --- |
| 50 | 5001 | Advanced Lens - Full Activity list with options |
| 50 | 5002 | Regular Lens - Full Activity list without options |
| 50 | 5003 | Focused Lens - Partial Activity list |
| 50 | 5004 | Visual Lens - Image Grid Activity list |

| FIG. | Element | Description |
| --- | --- | --- |
| 51 | 5101 | Projects - List of Actor's active Projects |
| 51 | 5102 | Scoring - Actor's Score rises as Component Tasks are completed |
| 51 | 5103 | Score - Actor's current cumulative Score for all active Projects |
| 51 | 5104 | Project - Perfect Safety Project |
| 51 | 5105 | Project - Daily Pallet Sorting Project |
| 51 | 5106 | Project - Weekly Package Dispatch Project |

| FIG. | Element | Description |
| --- | --- | --- |
| 51 | 5107 | Project detail - Weekly Package Dispatch Project |
| 51 | 5108 | Project Score - Actor's current Score for Project |
| 51 | 5109 | Elapsed Time - time Actor has spent so far on Project |
| 51 | 5110 | Time Left - additional time Actor expected to spend to complete Project |
| 51 | 5111 | Tasks Left - number of Component Tasks Actor needs to perform to complete Project |
| 51 | 5112 | Completion Percent - Percentage of Component Tasks Actor has performed so far |
| 51 | 5113 | Component Tasks -List of remaining Component Tasks |

| FIG. | Element | Description |
| --- | --- | --- |
| 52 | 5201 | Challenges - List of Actor's current Challenges |
| 52 | 5202 | Challenge - uncompleted Challenge 07 |
| 52 | 5203 | Challenge - completed Challenge 13 |
| 52 | 5204 | Reward - Reward for completed Challenge 13 |
| 52 | 5205 | Challenge - uncompleted Challenge 23 |
| 52 | 5206 | Challenge - uncompleted Challenge 44 |
| 52 | 5207 | Challenge detail - uncompleted Challenge 07 |
| 52 | 5208 | Completion Percent - Percentage of Challenge 07 Actor has completed so far |
| 52 | 5209 | Objective - Description of goal of Challenge 07 |
| 52 | 5210 | Reward - Reward for completion of Challenge 07 |

| FIG. | Element | Description |
| --- | --- | --- |
| 53 | 5301 | Rewards - List of Actor's current Rewards |
| 53 | 5302 | Reward - first Reward |
| 53 | 5303 | Reward - second Reward |
| 53 | 5304 | Reward - third Reward |
| 53 | 5305 | Reward - fourth Reward |
| 53 | 5306 | Reward detail - Actor's Reward |
| 53 | 5307 | Reward image- Icon representing Actor's Reward |
| 53 | 5308 | Reward value - Actor-specific redemption value for Reward |

Figure 47:
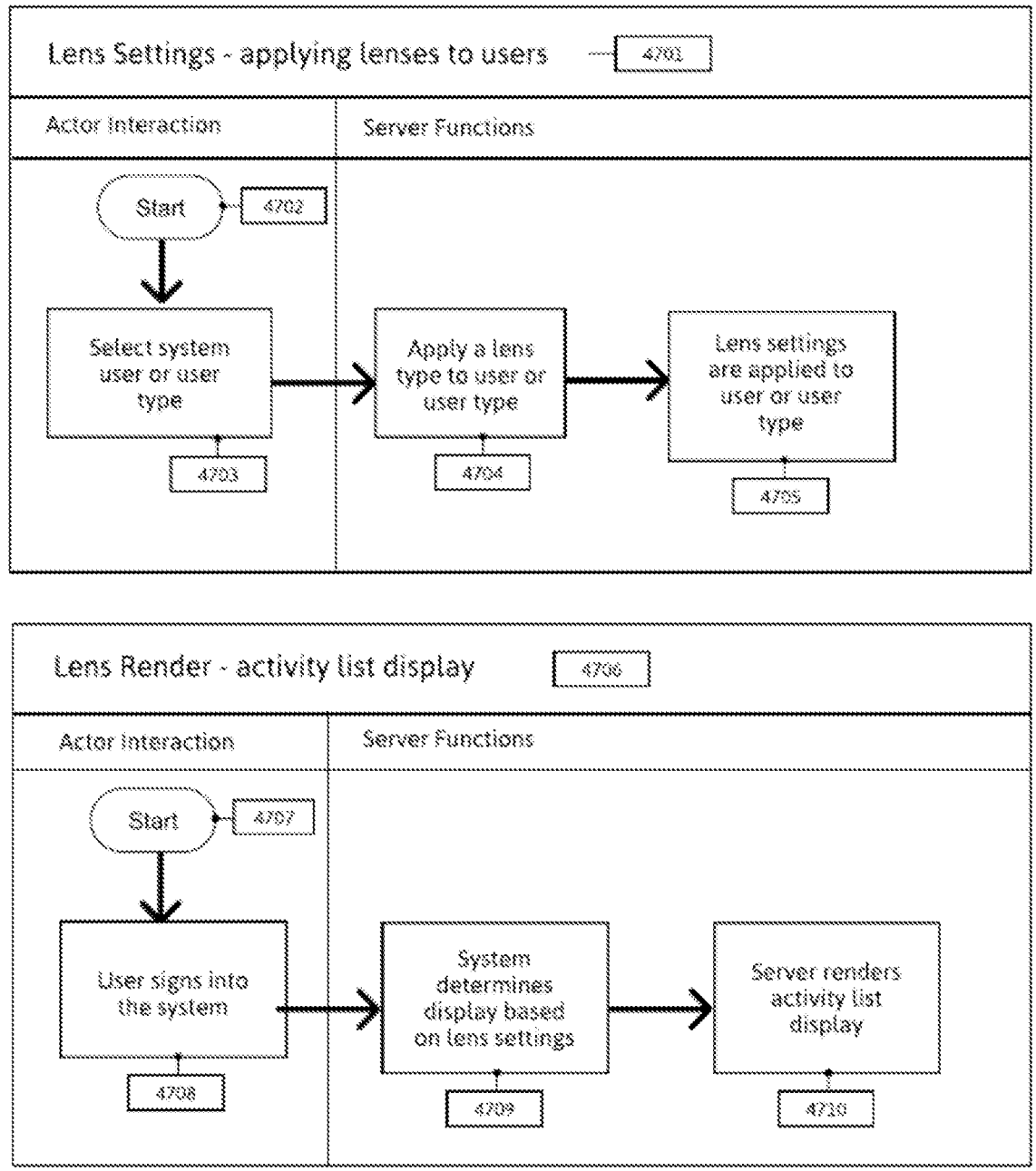
FIGS. 47-53 are illustrative diagrams for activity list, lenses, and gamification features for the cloud-based system and method to track and manage objects.

FIG. 47 shows how the appropriate Activity list is displayed to each actor. In FIG. 47, the system identifies the actor at steps 4701-4703. The system determines the appropriate Lens for the actor at step 4704. The system applies the Lens's settings at step 4705. The system renders the Activity list based on the applied Lens's settings at steps 4706-4710.

Figure 48:
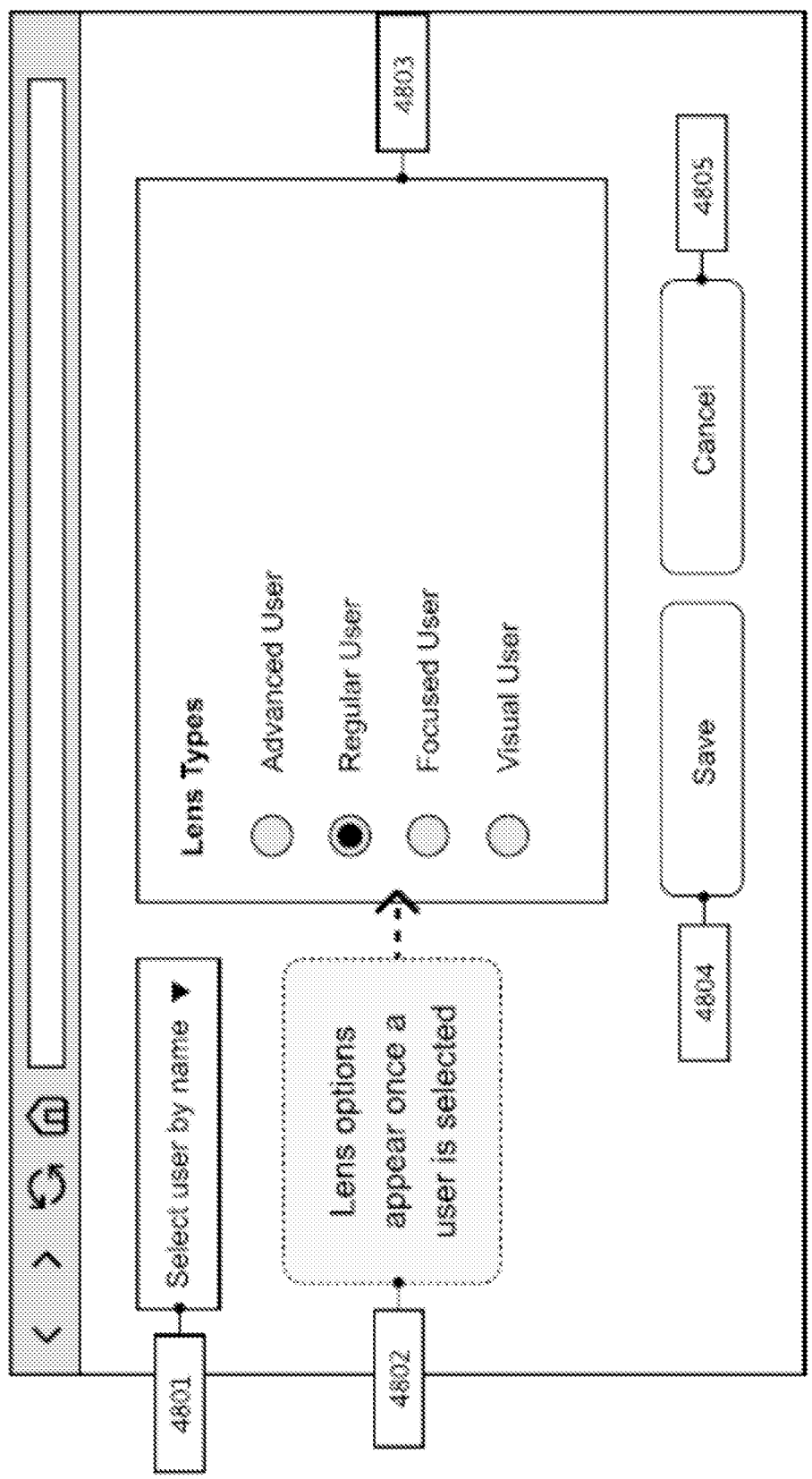

FIG. 48 shows how an actor can change a Lens. In FIG. 48, the system identifies the actor at step 4801. The system displays the Lens types that are available to the actor and the current Lens selected at steps 4802-4803. The actor can confirm the current Lens or select a different Lens and confirm that selection at steps 4804-4805.

Figure 49:
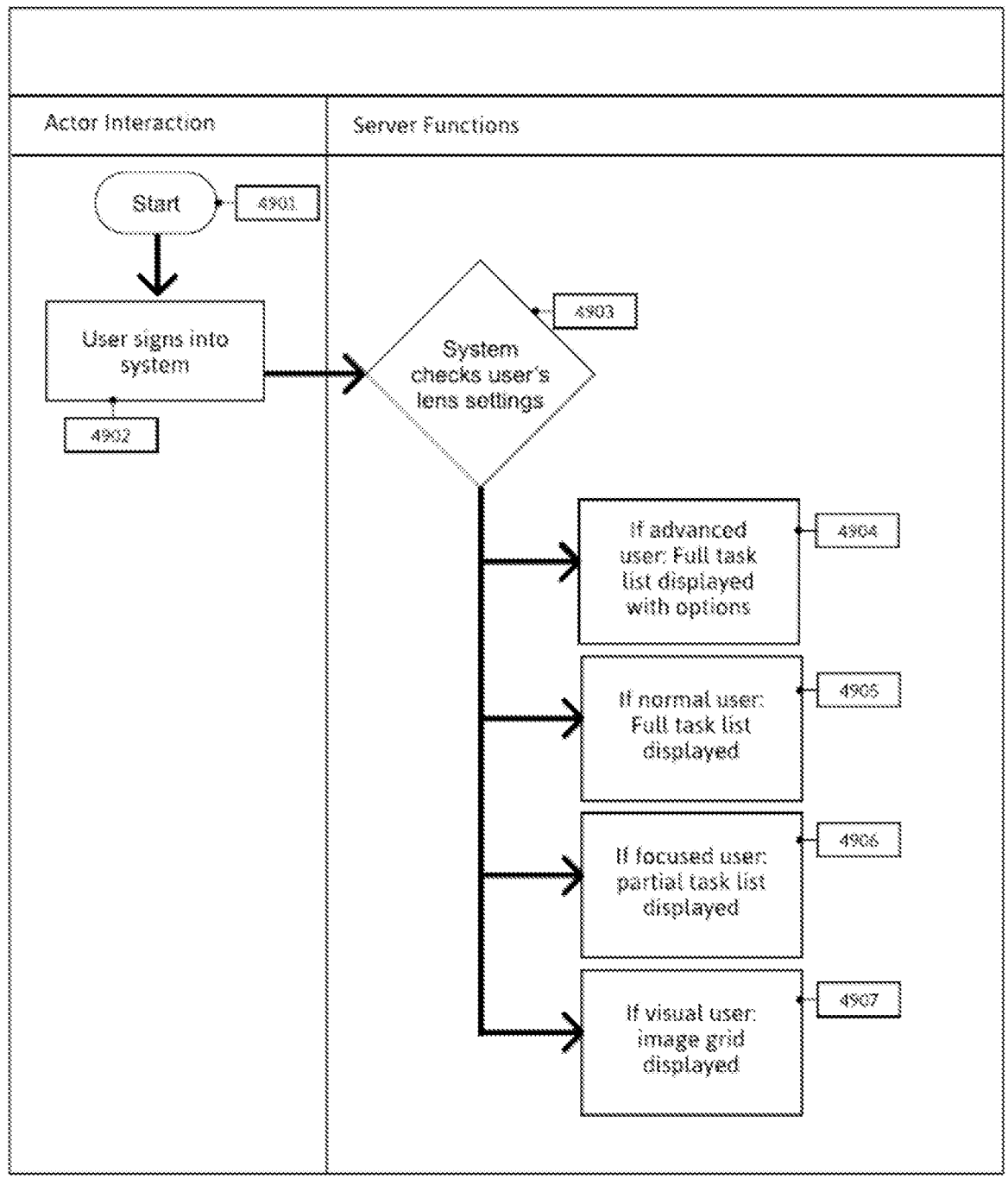

FIG. 49 shows the effect of different Lenses on the actor's Activity List. In this example, there are four possible Lenses corresponding to four types of users. In FIG. 49, after authentication steps 4901-4903, if the Actor is an advanced user, the system displays a full Activity list with options at step 4904. The options can include the ability to hide the steps needed to perform each task. If the Actor is a normal user, the system displays a full Activity list without options at step 4905. If the Actor is a focused user, the system displays a partial Activity list without options at step 4906. An example of a focused user is a worker who cannot process more than a handful of instructions at a time. If the actor is a visual user, the system displays an Activity list that uses images rather than text at step 4907.

Figure 50:
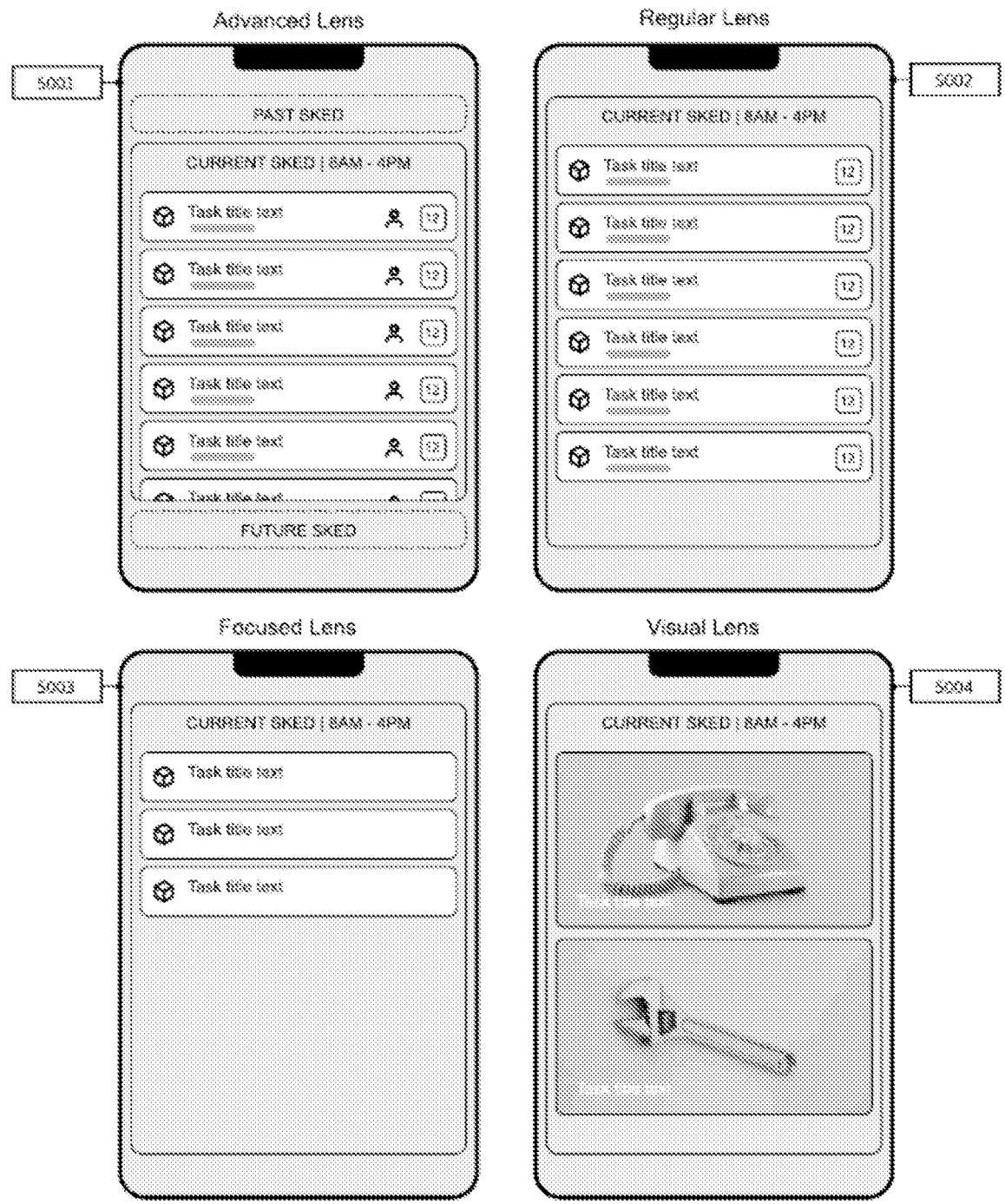

Accordingly, FIG. 50 shows examples of what these four Activity lists might look like when displayed on a smartphone. In FIG. 50, the displays can include the advanced lens display 5001, the regular lens display 5002, the focused lens display 5003, or the visual lens display 5004.

Figure 51:
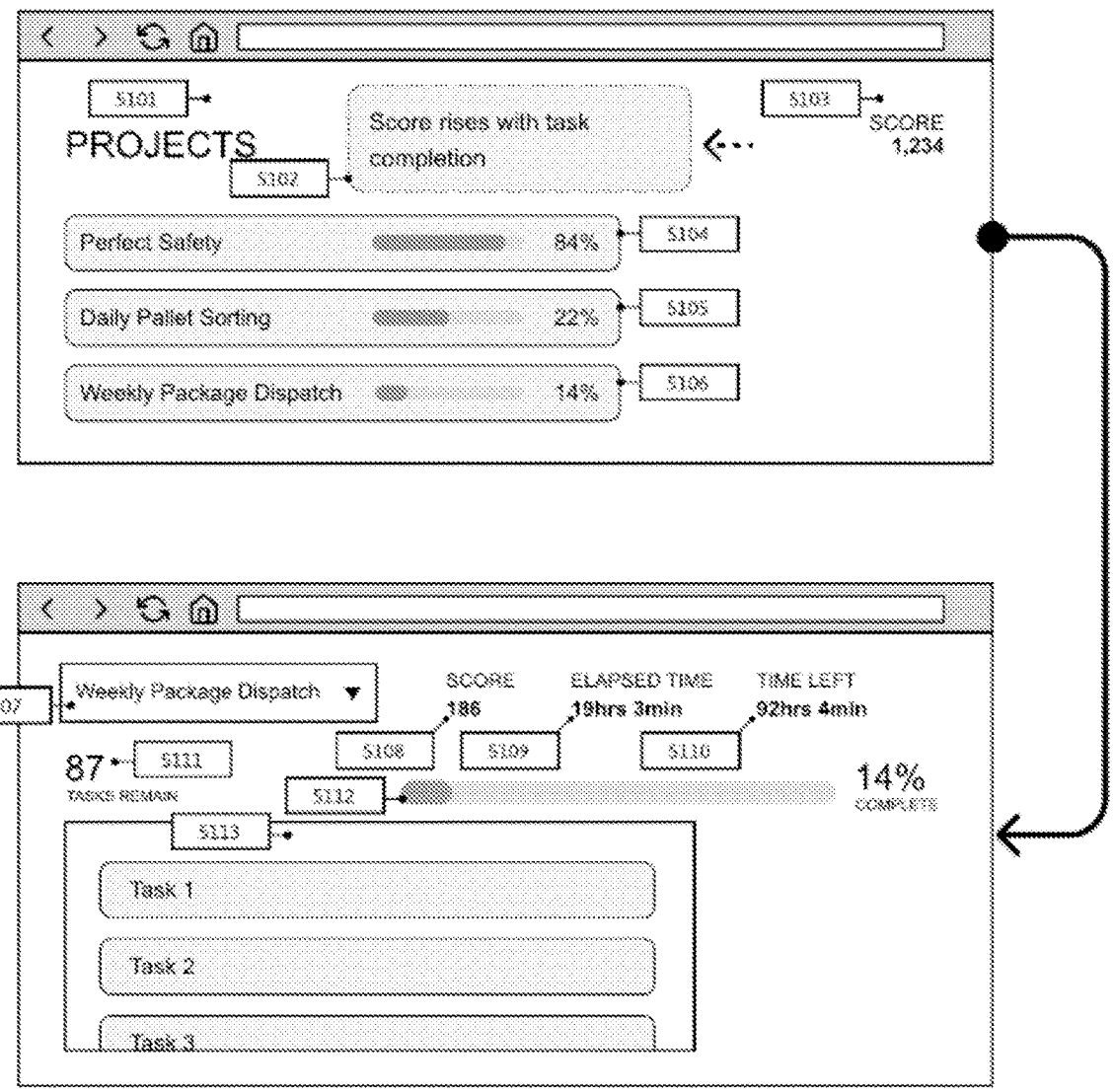

FIG. 51 shows how different Projects can be displayed to an actor working in a logistics warehouse. In FIG. 51, a summary display 5101 shows the actor's three current Projects 5104, 5105 and 5106, including the current completion percentage for each, as well as the actor's current cumulative score descriptions 5102 and score 5103. A detailed display 5107 shows information about the actor's Weekly Package Dispatch Project 5106, including: Current score 5108; Elapsed time 5109; Time left 5110; Number of Component Tasks remaining to be performed 5111; Current completion percentage 5112; and List of Component Tasks 5113 remaining to be performed.

Figure 52:
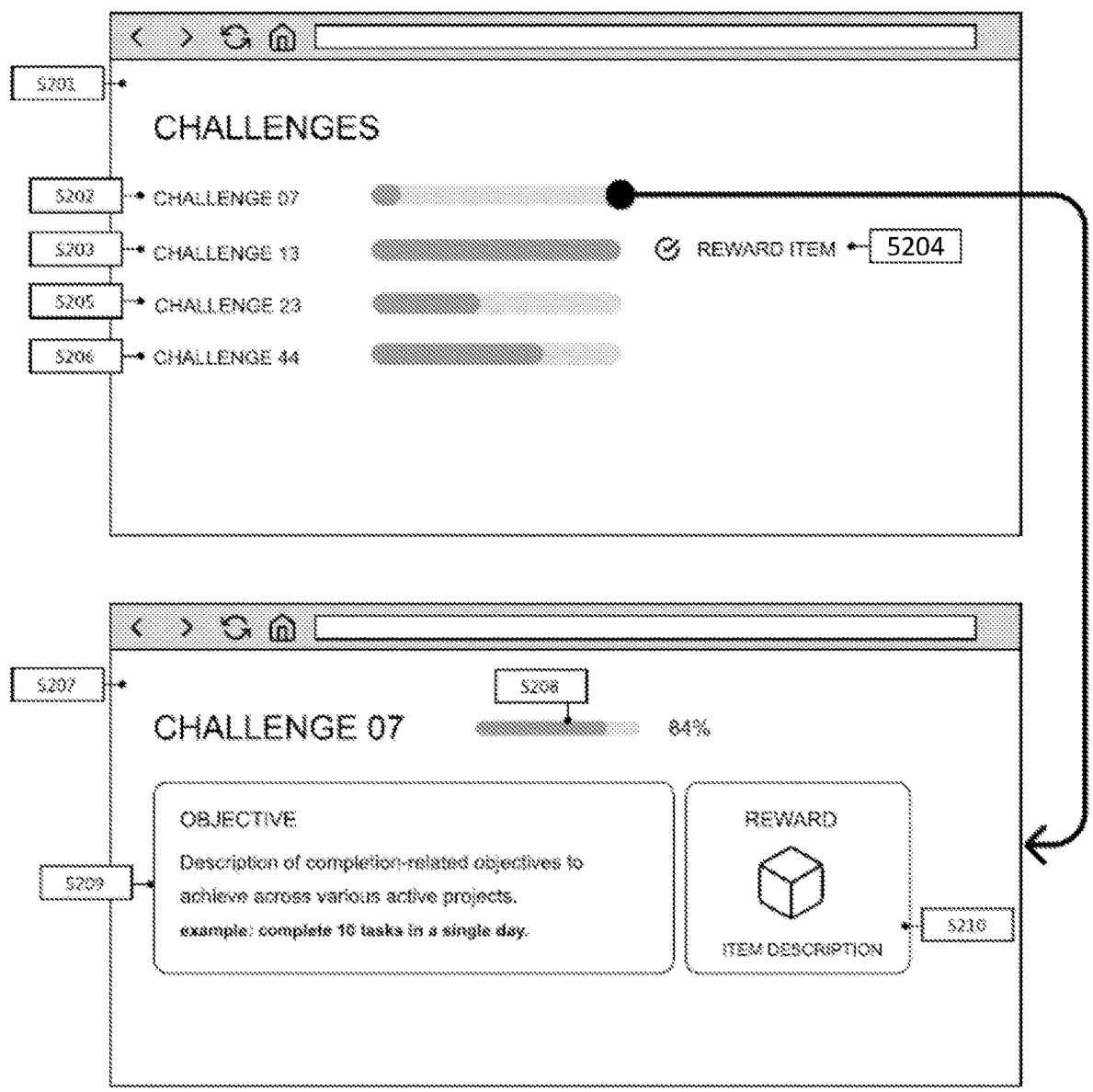

FIG. 52 shows how different Challenges might be displayed to an actor working in a logistics warehouse. In FIG. 52, a summary display 5201 shows the actor's four current Challenges 5202, 5203, 5205 and 5206, including the current completion percentage for each, as well as the actor's current cumulative score and Reward Item 5204. A detailed display 5207 shows information about the actor's Challenge 07 element 5202, including: the Challenge's objective 5209, the Challenge's completion percentage 5208, and the Challenge's Reward 5210.

Figure 53:
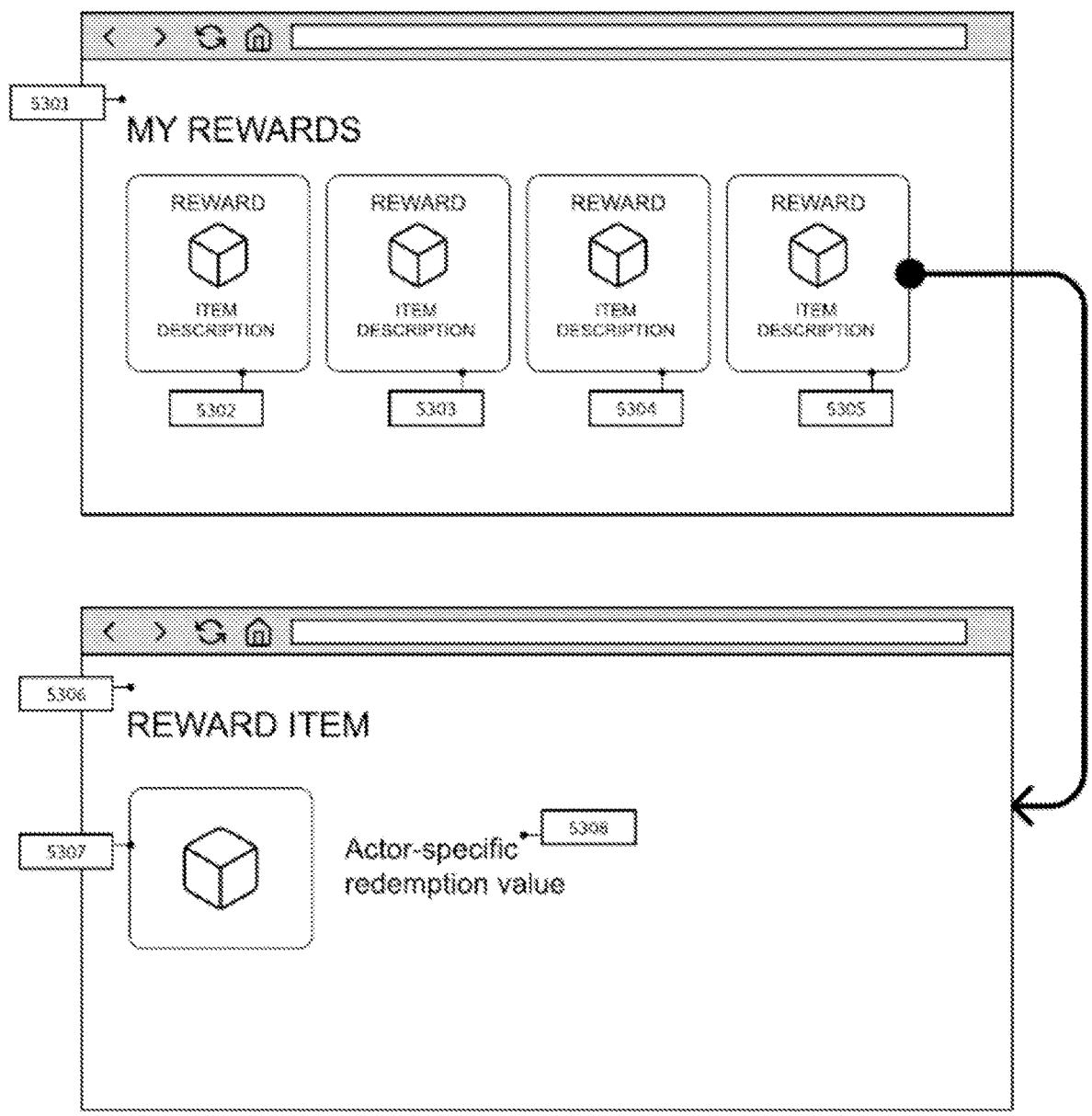

FIG. 53 shows how different Rewards might be displayed to an actor working in a logistics warehouse. In FIG. 53, a summary display 5301 shows the actor's four current Rewards 5302, 5303, 5304 and 5305. A detailed display 5306 shows information about one of the Rewards at 5307, including its actor-specific redemption value 5308.

Advantageously, the above-described system and method for automated time management of tasks performed by or at an entity, including an individual or a business enterprise, can tailor a format of information displayed to a user, and a speed and complexity used to present such information, based on the user's specific abilities and preferences. The system and method, advantageously, makes routine tasks engaging by grouping them into one or more collections with completion milestones and desired outcomes, and providing rewards for the successful completion of each collection.

The above-described devices and subsystems of the illustrative embodiments can include, for example, any suitable servers, workstations, PCs, laptop computers, PDAs, Internet appliances, handheld devices, cellular telephones, wireless devices, other devices, and the like, capable of performing the processes of the illustrative embodiments. The devices and subsystems of the illustrative embodiments can communicate with each other using any suitable protocol and can be implemented using one or more programmed computer systems or devices.

One or more interface mechanisms can be used with the illustrative embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, a combination thereof, and the like.

It is to be understood that the devices and subsystems of the illustrative embodiments are for illustrative purposes, as many variations of the specific hardware used to implement the illustrative embodiments are possible, as will be appreciated by those skilled in the relevant art(s). For example, the functionality of one or more of the devices and subsystems of the illustrative embodiments can be implemented via one or more programmed computer systems or devices.

To implement such variations as well as other variations, a single computer system can be programmed to perform the special purpose functions of one or more of the devices and subsystems of the illustrative embodiments. On the other hand, two or more programmed computer systems or devices can be substituted for any one of the devices and subsystems of the illustrative embodiments. Accordingly, principles and advantages of distributed processing, such as redundancy, replication, and the like, also can be implemented, as desired, to increase the robustness and performance of the devices and subsystems of the illustrative embodiments.

The devices and subsystems of the illustrative embodiments can store information relating to various processes described herein. This information can be stored in one or more memories, such as a hard disk, optical disk, magneto-optical disk, RAM, and the like, of the devices and subsystems of the illustrative embodiments. One or more databases of the devices and subsystems of the illustrative embodiments can store the information used to implement the illustrative embodiments of the present inventions. The databases can be organized using data structures (e.g., records, tables, arrays, fields, graphs, trees, lists, and the like) included in one or more memories or storage devices listed herein. The processes described with respect to the illustrative embodiments can include appropriate data structures for storing data collected and/or generated by the processes of the devices and subsystems of the illustrative embodiments in one or more databases thereof.

All or a portion of the devices and subsystems of the illustrative embodiments can be conveniently implemented using one or more general purpose computer systems, microprocessors, digital signal processors, micro-controllers, and the like, programmed according to the teachings of the illustrative embodiments of the present inventions, as will be appreciated by those skilled in the computer and software arts. Appropriate software can be readily prepared by programmers of ordinary skill based on the teachings of the illustrative embodiments, as will be appreciated by those skilled in the software art. Further, the devices and subsystems of the illustrative embodiments can be implemented on the World Wide Web. In addition, the devices and subsystems of the illustrative embodiments can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry and/or software.

Stored on any one or on a combination of computer readable media, the illustrative embodiments of the present inventions can include software for controlling the devices and subsystems of the illustrative embodiments, for driving the devices and subsystems of the illustrative embodiments, for enabling the devices and subsystems of the illustrative embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the illustrative embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present inventions can be distributed for better performance, reliability, cost, and the like.

As stated above, the devices and subsystems of the illustrative embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of illustrative embodiments, and implementations, the present inventions are not so limited, but rather cover various modifications, and equivalent arrangements, which fall within the purview of the appended claims.

What is claimed is:

1. A time management system for an entity, comprising:
a cloud-based server with a database, a website, and software;
a user device, including one of a smartphone, tablet, or PC, running an application with a gamified user interface (UI), providing data entry and display functions;
automated devices, including one of sensors, electronic switches, pumps, or hydroponic dosing devices, connected to the database, collecting and transmitting data or responding to commands;
an artificial intelligence (AI) engine monitoring entity-related objects and external conditions, tasking individuals or the automated devices based on status analysis, and providing operation management advice via cognitive reasoning; and
an automated time management framework within the AI engine, automating task trade-offs in response to unexpected events, including:
partitioning a day into one or more time blocks,
treating scheduled and added tasks during the one or more time blocks as a collection,
periodically balancing the one or more time blocks by comparing total labor minutes with time needed for uncompleted tasks,
calculating scores for the added and uncompleted tasks based on factors, including one of priority, movability, optionality, difficulty, and unpleasantness,
ranking the uncompleted tasks by respective scores thereof, and
balancing the collection by abandoning or moving the uncompleted tasks based on the rank thereof to a later of the one or more time blocks, and repeating the balancing of the collection until the one or more time blocks conclude,
wherein the AI engine applies a lens for an actor associated with the one or more time blocks, including:
inputting settings associated with the lens,
rendering a task list based on the settings, and
displaying lens types that are available to the actor and confirming current lens type selected by the actor.

2. The system of claim 1, wherein if the actor is an advanced user, the AI engine displays a complete task list with all available options, including an ability to hide steps employed to perform each task of the complete task list,
if the actor is an average user, the AI engine displays a complete task list without available options,
if the actor is a focused user, the AI engine displays a portion of the complete task list without available options, and
if the actor is a visual user, the AI engine displays one or more images associated with the complete task list.

3. The system of claim 1, wherein the AI engine displays a summary project display showing current projects of the actor, including a completion percentage thereof, a current cumulative score description and score associated with the current projects, and
the AI engine displays a detailed project display showing information about a selected project of the actor, including one of a current score, elapsed time, time left, number of component tasks remaining to be performed, current completion percentage, and a list of component tasks remaining to be performed, based on the selected project.

4. The system of claim 1, wherein the AI engine displays a summary challenge display showing current gamification challenges for the actor, including a completion percentage thereof, a current cumulative score description and reward associated with the current gamification challenges, and
the AI engine displays a detailed challenge display showing information about a selected challenge by the actor, including one of an objective of the selected challenge, a completion percentage of the selected challenge, and a reward associated with completing the selected challenge.

5. The system of claim 4, wherein the AI engine displays a summary rewards display showing current rewards of the actor associated with the current gamification challenges, and
the AI engine displays a detailed rewards display showing information about a selected reward of the current rewards, including an actor-specific redemption value for the selected reward.

6. A method for time management, comprising:
providing a cloud-based server with a database, a website, and software;
running with a user device, including one of a smartphone, tablet, or PC, an application with a gamified user interface (UI), providing data entry and display functions;
connecting to the database automated devices, including one of sensors, electronic switches, pumps, or hydroponic dosing devices, and collecting and transmitting data or responding to commands;
monitoring with an artificial intelligence (AI) engine entity-related objects and external conditions, tasking individuals or the automated devices based on status analysis, and providing operation management advice via cognitive reasoning; and
automating task trade-offs in response to unexpected events with an automated time management framework within the AI engine, including:
partitioning a day into one or more time blocks,
treating scheduled and added tasks during the one or more time blocks as a collection,
periodically balancing the one or more time blocks by comparing total labor minutes with time needed for uncompleted tasks,
calculating scores for the added and uncompleted tasks based on factors, including one of priority, movability, optionality, difficulty, and unpleasantness,
ranking the uncompleted tasks by respective scores thereof, and
balancing the collection by abandoning or moving the uncompleted tasks based on the rank thereof to a later of the one or more time blocks, and repeating the balancing of the collection until the one or more time blocks conclude,
wherein the AI engine applies a lens for an actor associated with the one or more time blocks, including:
inputting settings associated with the lens,
rendering a task list based on the settings, and
displaying lens types that are available to the actor and confirming current lens type selected by the actor.

7. The method of claim 6, wherein if the actor is an advanced user, the AI engine displays a complete task list with all available options, including an ability to hide steps employed to perform each task of the complete task list,
    if the actor is an average user, the AI engine displays a complete task list without available options,
    if the actor is a focused user, the AI engine displays a portion of the complete task list without available options, and
    if the actor is a visual user, the AI engine displays one or more images associated with the complete task list.

8. The method of claim 6, wherein the AI engine displays a summary project display showing current projects of the actor, including a completion percentage thereof, a current cumulative score description and score associated with the current projects, and
    the AI engine displays a detailed project display showing information about a selected project of the actor, including one of a current score, elapsed time, time left, number of component tasks remaining to be performed, current completion percentage, and a list of component tasks remaining to be performed, based on the selected project.

9. The method of claim 6, wherein the AI engine displays a summary challenge display showing current gamification challenges for the actor, including a completion percentage thereof, a current cumulative score description and reward associated with the current gamification challenges, and
    the AI engine displays a detailed challenge display showing information about a selected challenge by the actor, including one of an objective of the selected challenge, a completion percentage of the selected challenge, and a reward associated with completing the selected challenge.

10. The method of claim 9, wherein the AI engine displays a summary rewards display showing current rewards of the actor associated with the current gamification challenges, and
    the AI engine displays a detailed rewards display showing information about a selected reward of the current rewards, including an actor-specific redemption value for the selected reward.

11. A computer program product for time management, including one or more computer readable instructions embedded on a tangible, non-transitory computer medium and configured to cause one or more computer processors to perform the steps of:
    providing a cloud-based server with a database, a website, and software;
    running with a user device, including one of a smartphone, tablet, or PC, an application with a gamified user interface (UI), providing data entry and display functions;
    connecting to the database automated devices, including one of sensors, electronic switches, pumps, or hydroponic dosing devices, and collecting and transmitting data or responding to commands;
    monitoring with an artificial intelligence (AI) engine entity-related objects and external conditions, tasking individuals or the automated devices based on status analysis, and providing operation management advice via cognitive reasoning; and
    automating task trade-offs in response to unexpected events with an automated time management framework within the AI engine, including:
    partitioning a day into one or more time blocks,
    treating scheduled and added tasks during the one or more time blocks as a collection,
    periodically balancing the one or more time blocks by comparing total labor minutes with time needed for uncompleted tasks,
    calculating scores for the added and uncompleted tasks based on factors, including one of priority, movability, optionality, difficulty, and unpleasantness,
    ranking the uncompleted tasks by respective scores thereof, and
    balancing the collection by abandoning or moving the uncompleted tasks based on the rank thereof to a later of the one or more time blocks, and repeating the balancing of the collection until the one or more time blocks conclude,
    wherein the AI engine applies a lens for an actor associated with the one or more time blocks, including:
    inputting settings associated with the lens,
    rendering a task list based on the settings, and
    displaying lens types that are available to the actor and confirming current lens type selected by the actor.

12. The computer program product of claim 11, wherein if the actor is an advanced user, the AI engine displays a complete task list with all available options, including an ability to hide steps employed to perform each task of the complete task list,
    if the actor is an average user, the AI engine displays a complete task list without available options,
    if the actor is a focused user, the AI engine displays a portion of the complete task list without available options, and
    if the actor is a visual user, the AI engine displays one or more images associated with the complete task list.

13. The computer program product of claim 11, wherein the AI engine displays a summary project display showing current projects of the actor, including a completion percentage thereof, a current cumulative score description and score associated with the current projects, and
    the AI engine displays a detailed project display showing information about a selected project of the actor, including one of a current score, elapsed time, time left, number of component tasks remaining to be performed, current completion percentage, and a list of component tasks remaining to be performed, based on the selected project.

14. The computer program product of claim 11, wherein the AI engine displays a summary challenge display showing current gamification challenges for the actor, including a completion percentage thereof, a current cumulative score description and reward associated with the current gamification challenges, and
    the AI engine displays a detailed challenge display showing information about a selected challenge by the actor, including one of an objective of the selected challenge, a completion percentage of the selected challenge, and a reward associated with completing the selected challenge.

15. The computer program product of claim 14, wherein the AI engine displays a summary rewards display showing current rewards of the actor associated with the current gamification challenges, and
    the AI engine displays a detailed rewards display showing information about a selected reward of the current rewards, including an actor-specific redemption value for the selected reward.

* * * * *